Figure 1:
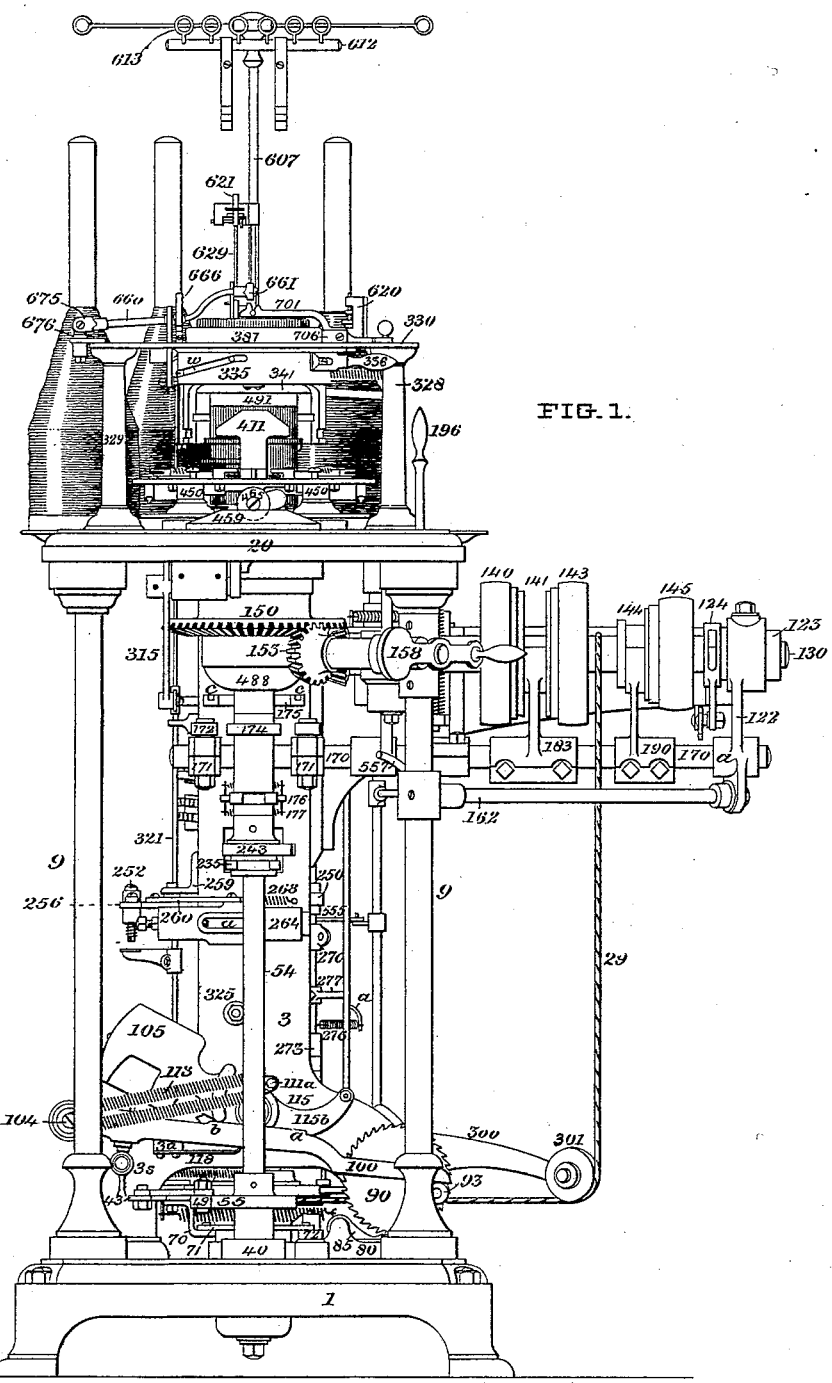

No. 632,872. Patented Sept. 12, 1899.
F. LASHER & C. S. BEACH.
KNITTING MACHINE.
(Application filed June 23, 1890.)

(No Model.) 30 Sheets—Sheet 3.

WITNESSES:
J. Ma. Cloward
Ed Donnelly

INVENTORS:
FRANK LASHER.
CHARLES S. BEACH.
by Franklin Scott, Atty.

No. 632,872. Patented Sept. 12, 1899.
F. LASHER & C. S. BEACH.
KNITTING MACHINE.
(Application filed June 23, 1890.)
(No Model.) 30 Sheets—Sheet 4.

WITNESSES:

INVENTORS:
FRANK LASHER,
CHARLES S. BEACH.
by Franklin Scott, Atty.

No. 632,872. Patented Sept. 12, 1899.
F. LASHER & C. S. BEACH.
KNITTING MACHINE.
(Application filed June 23, 1890.)
(No Model.) 30 Sheets—Sheet 5.
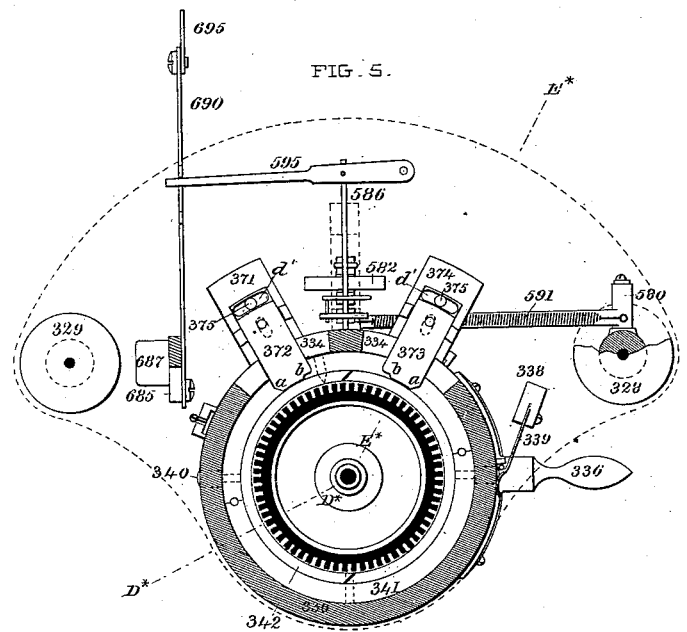
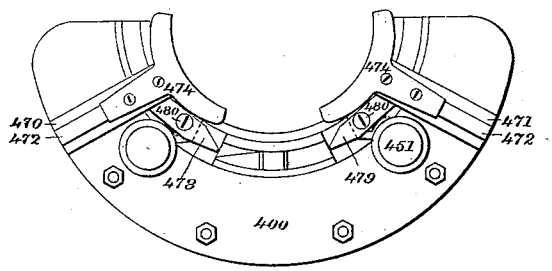
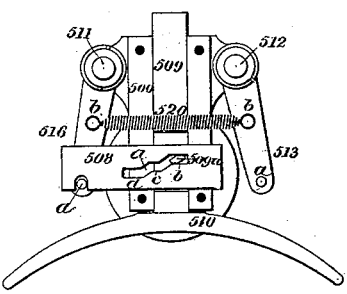
WITNESSES:
Jm a Cloward
Ed Donnelly
INVENTORS:
FRANK LASHER.
CHARLES S. BEACH.
by Franklin Scott, Atty.

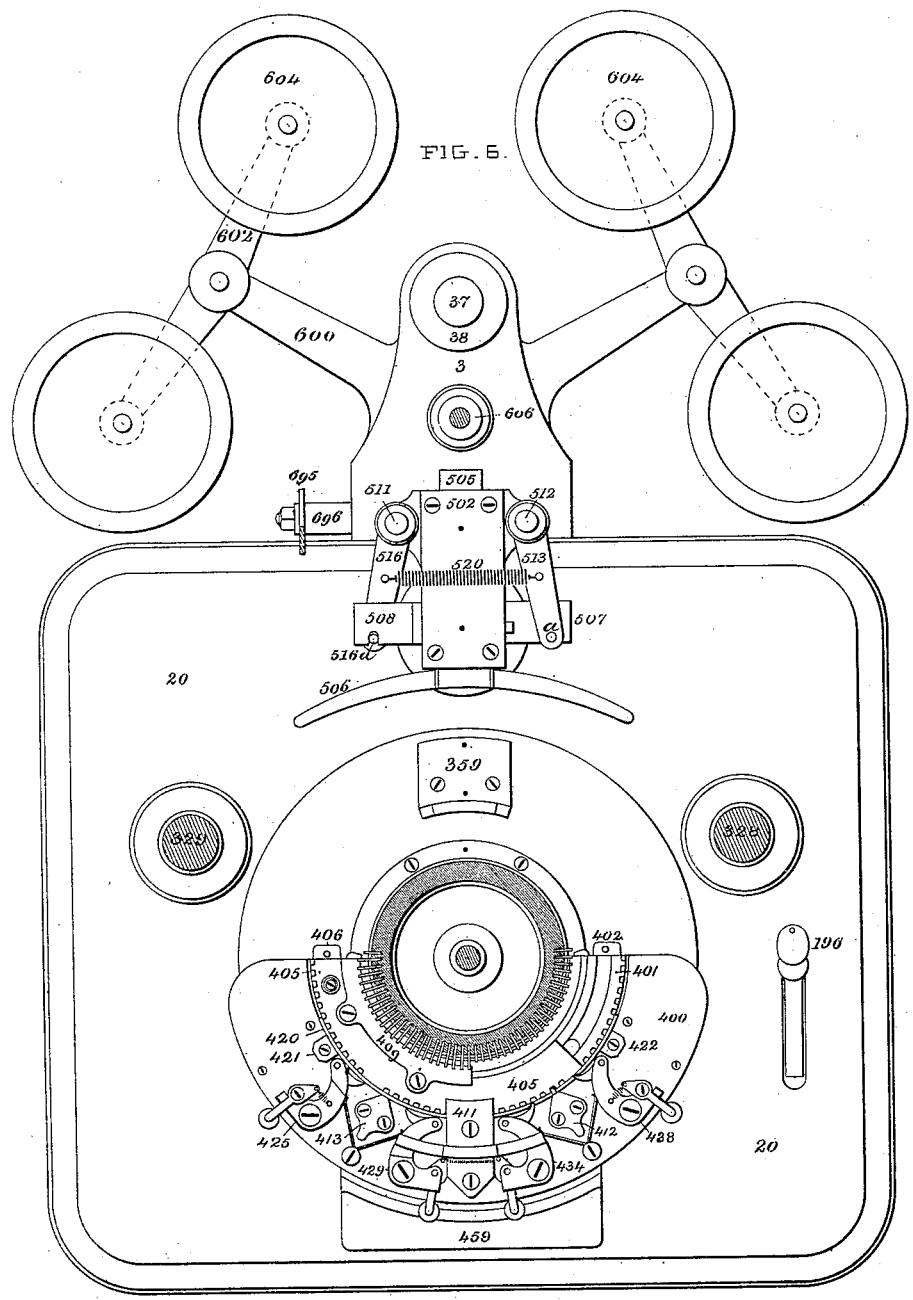

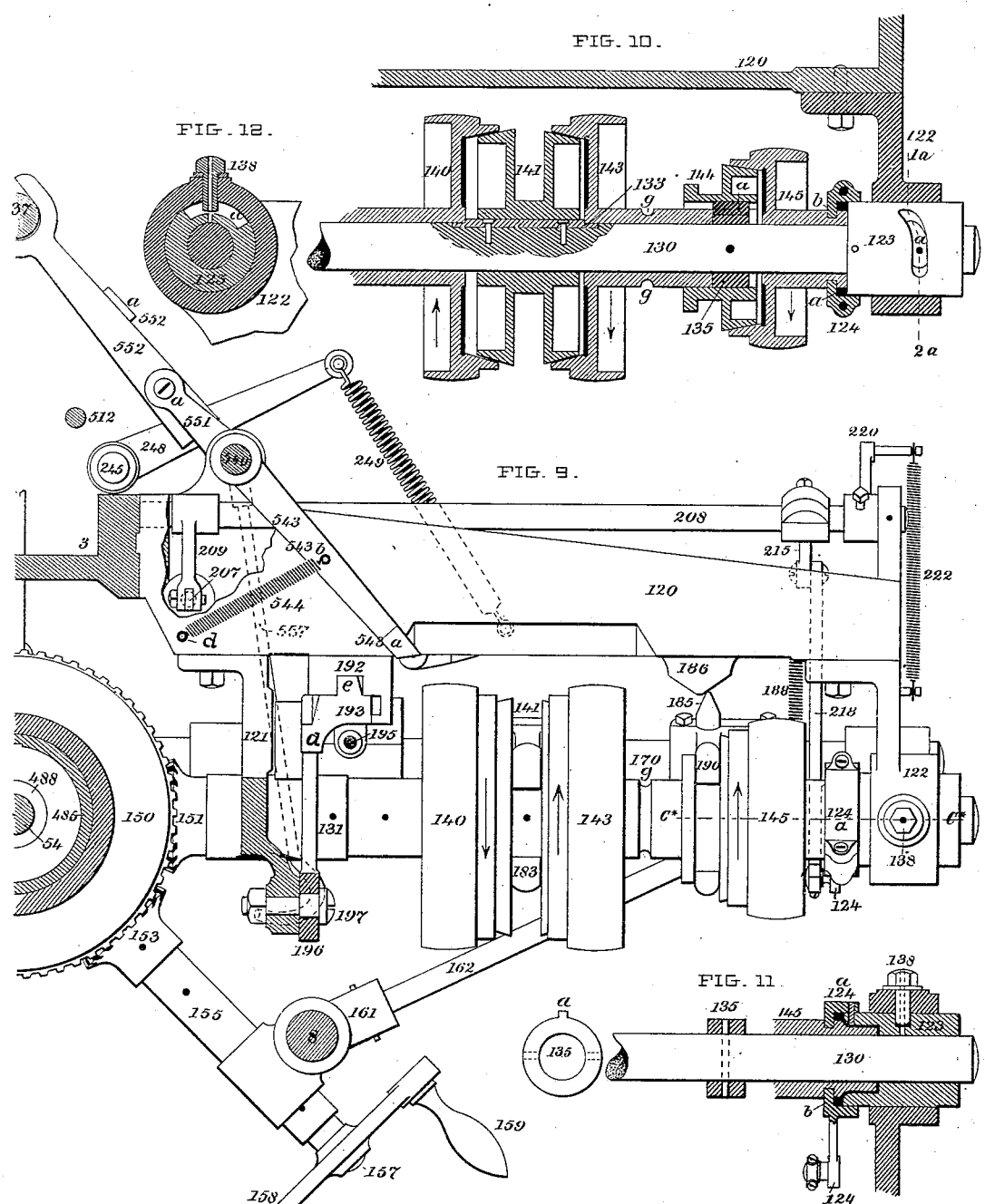

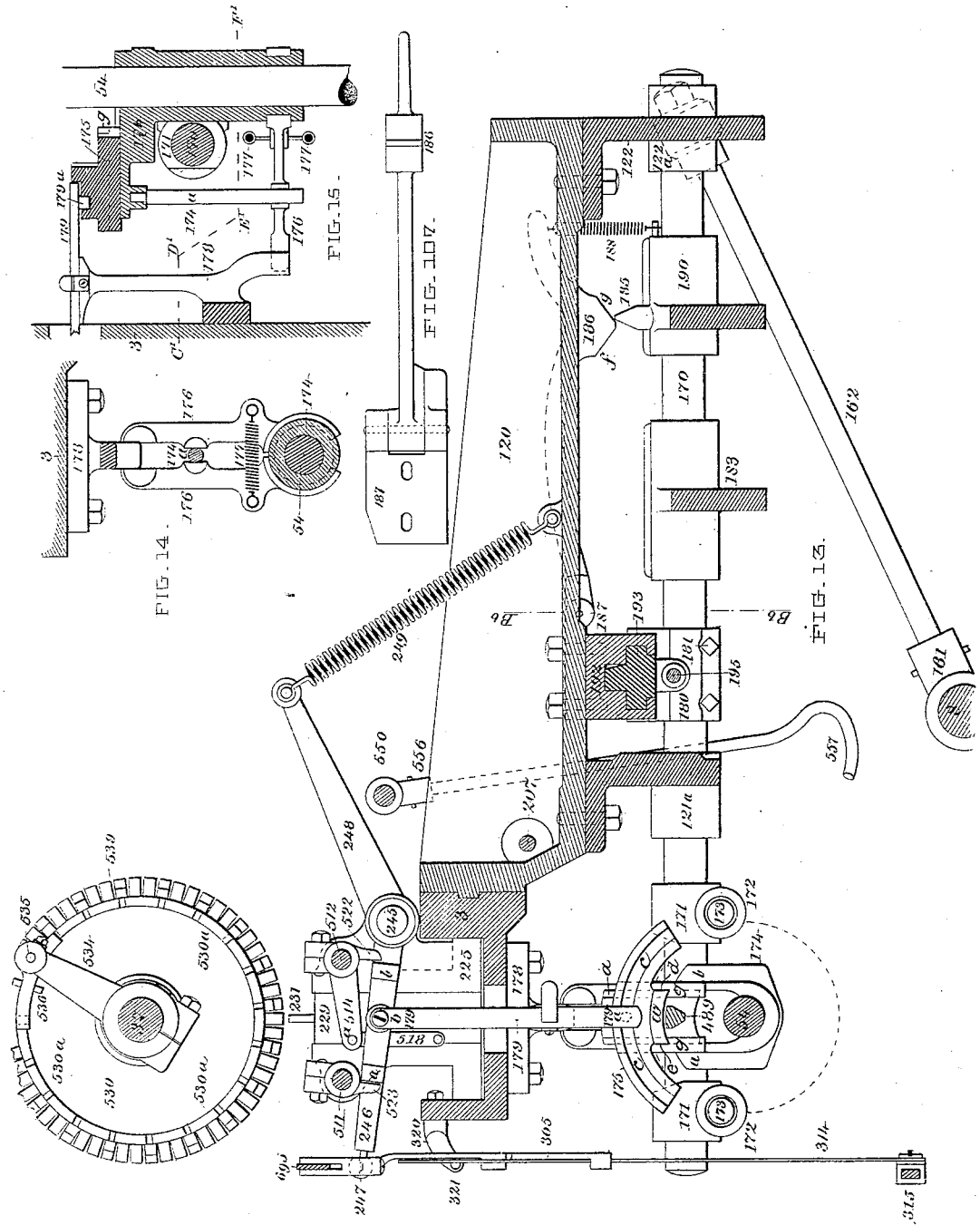

No. 632,872. Patented Sept. 12, 1899.
F. LASHER & C. S. BEACH.
KNITTING MACHINE.
(Application filed June 23, 1890.)
(No Model.) 30 Sheets—Sheet 9.
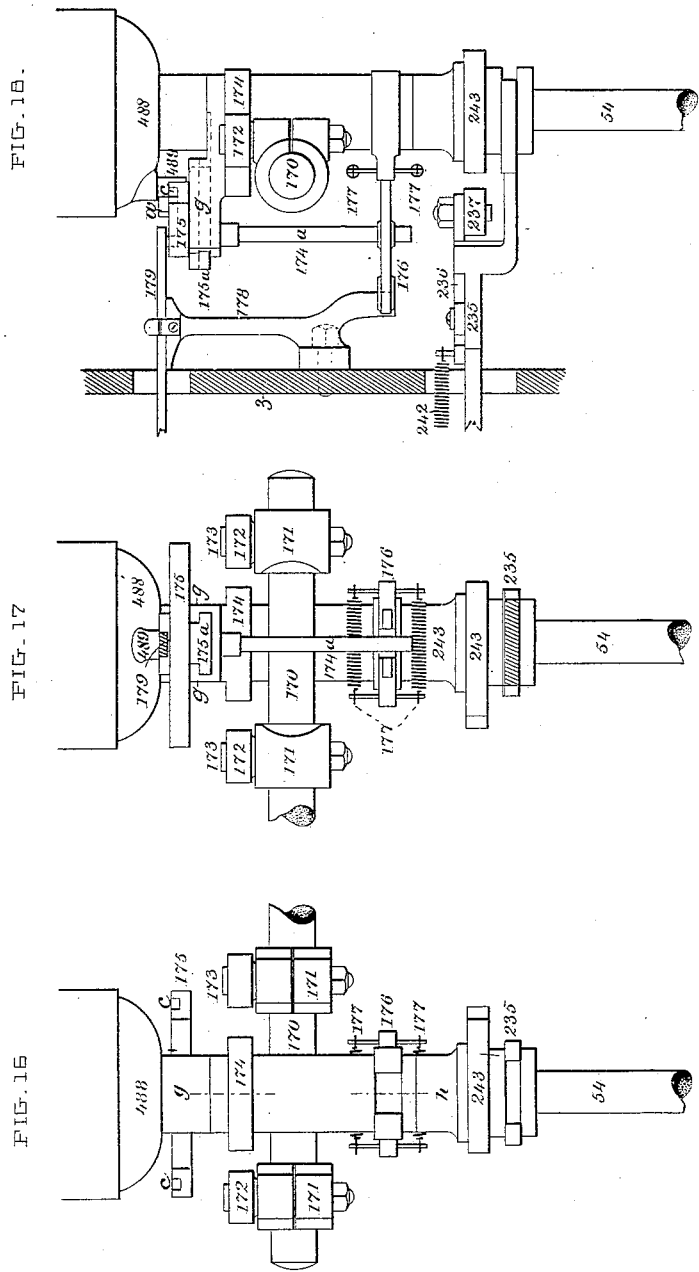
WITNESSES:
J. M. a. Cloward
Ed Donnelly
INVENTORS:
FRANK LASHER.
CHARLES S. BEACH.
by Franklin Scott, Atty.

No. 632,872. Patented Sept. 12, 1899.
F. LASHER & C. S. BEACH.
KNITTING MACHINE.
(Application filed June 23, 1890.)
(No Model.) 30 Sheets—Sheet 10.
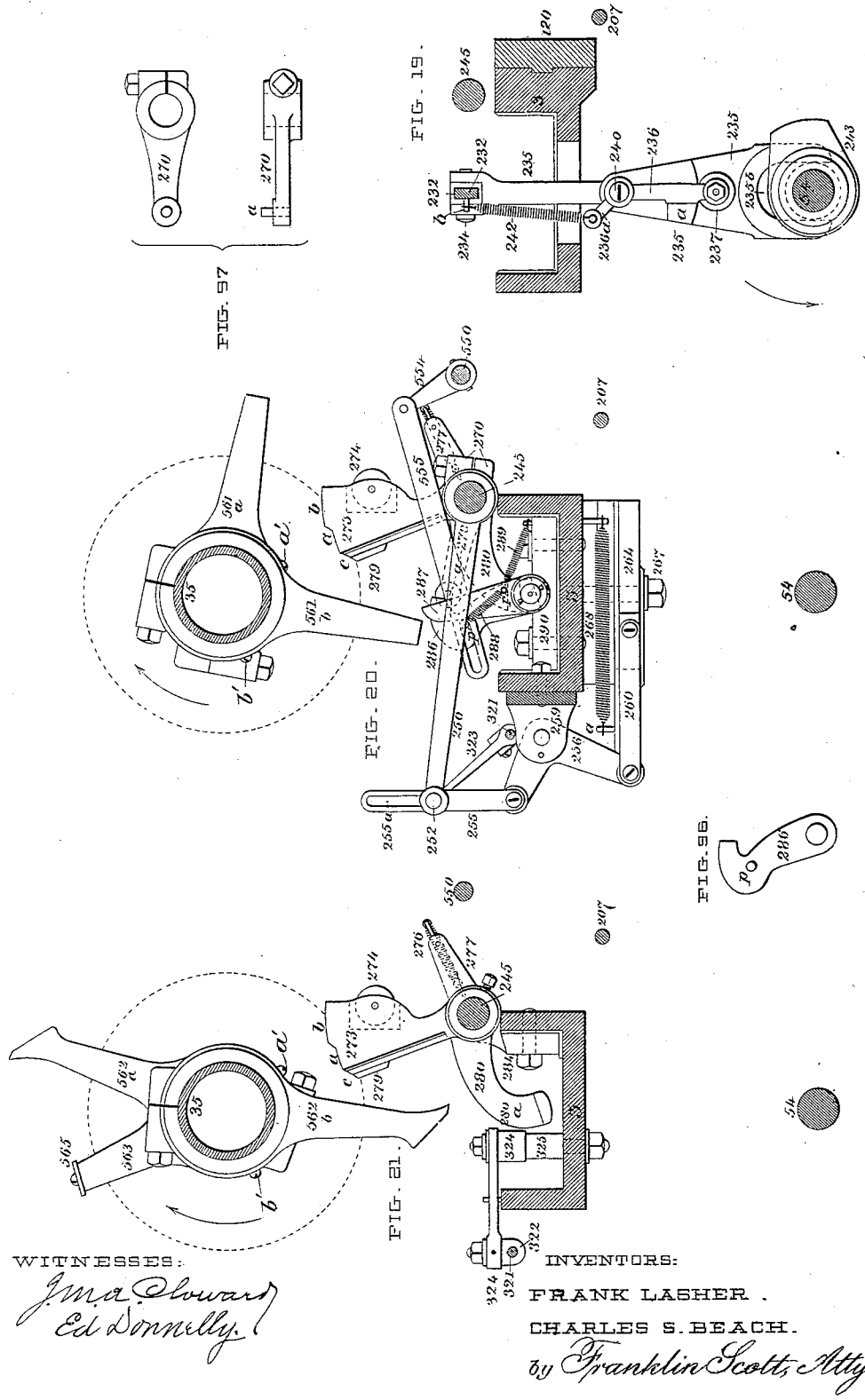
WITNESSES:
J. M. A. Howard
Ed Donnelly
INVENTORS:
FRANK LASHER.
CHARLES S. BEACH.
by Franklin Scott, Atty.

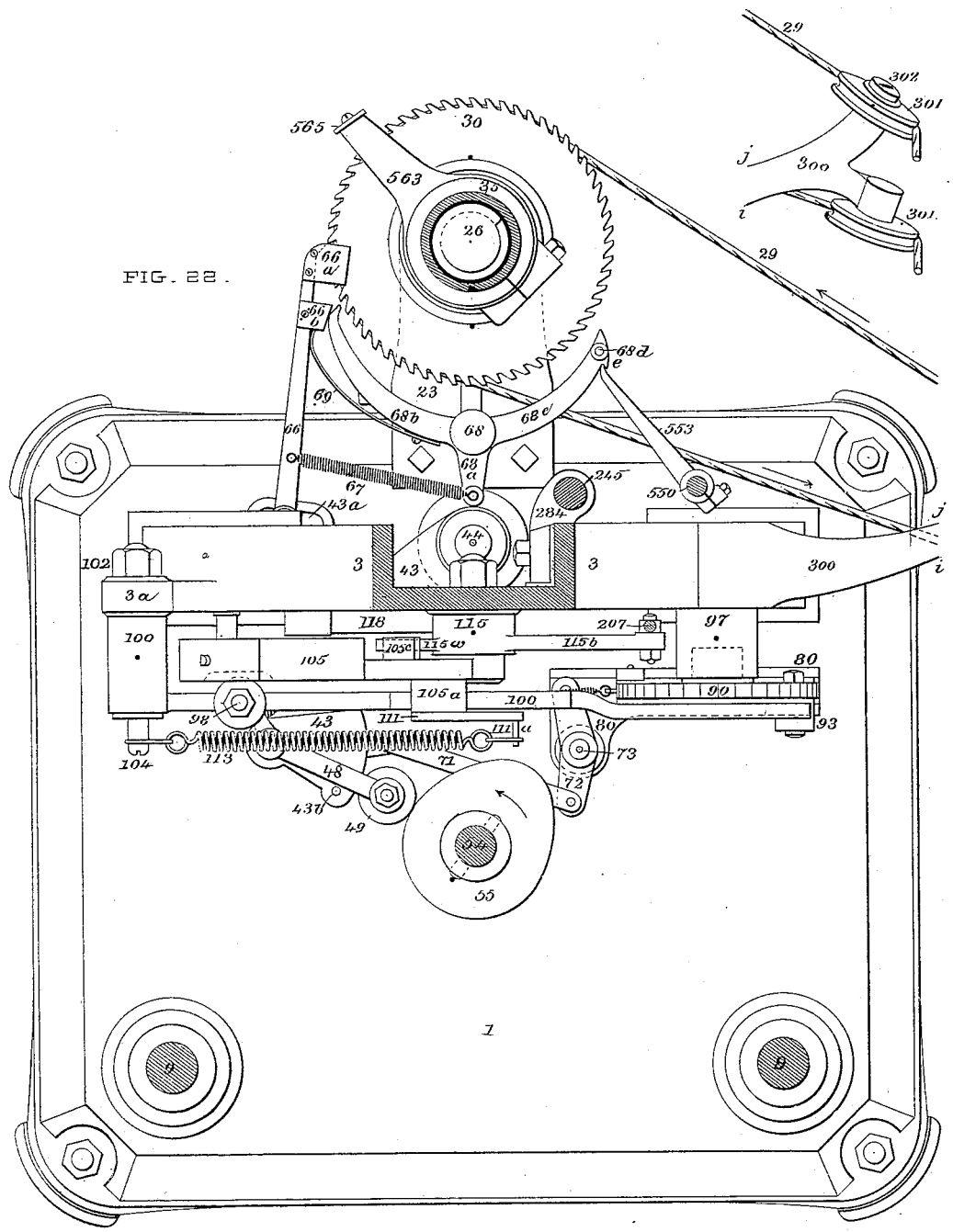

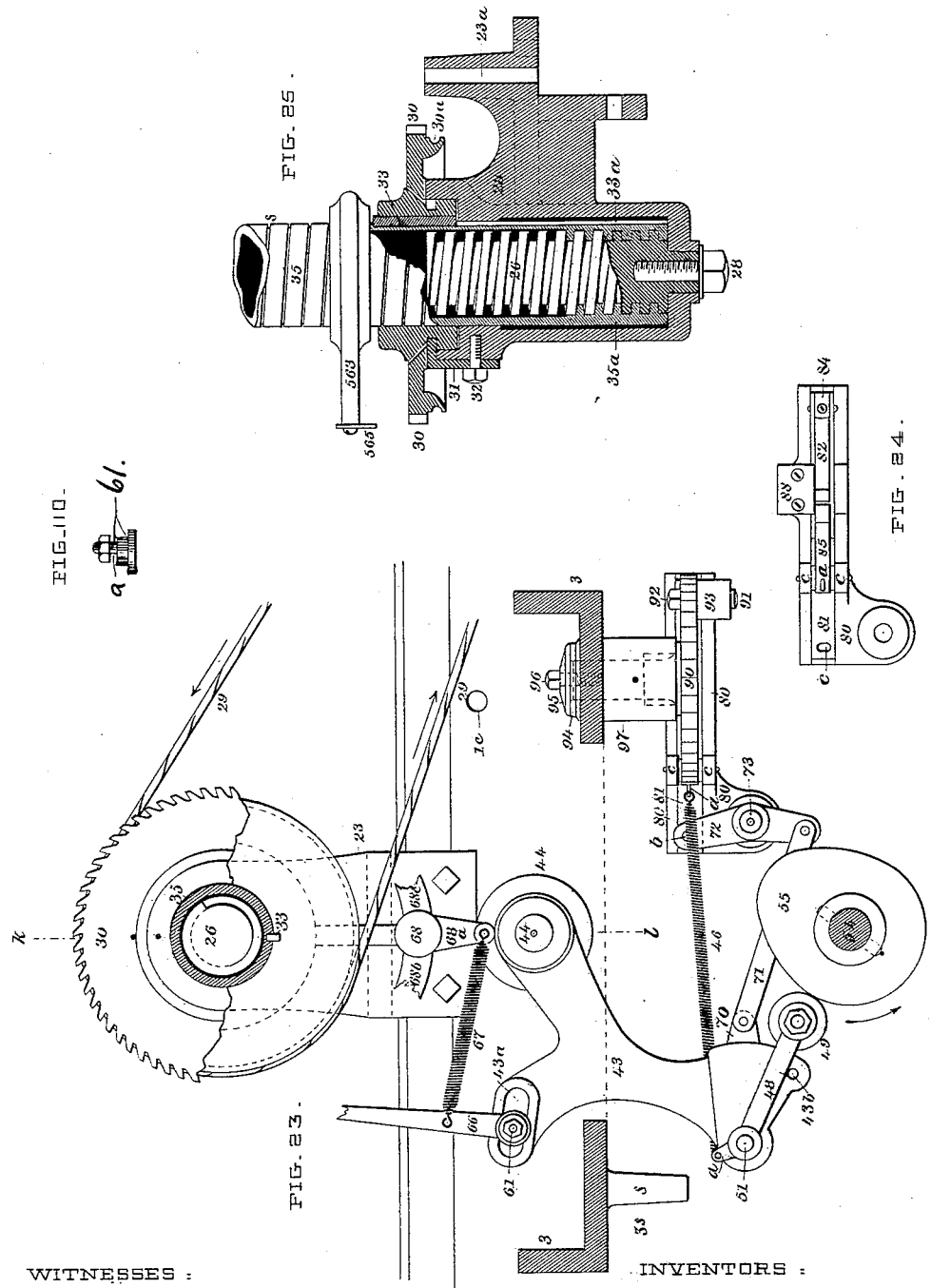

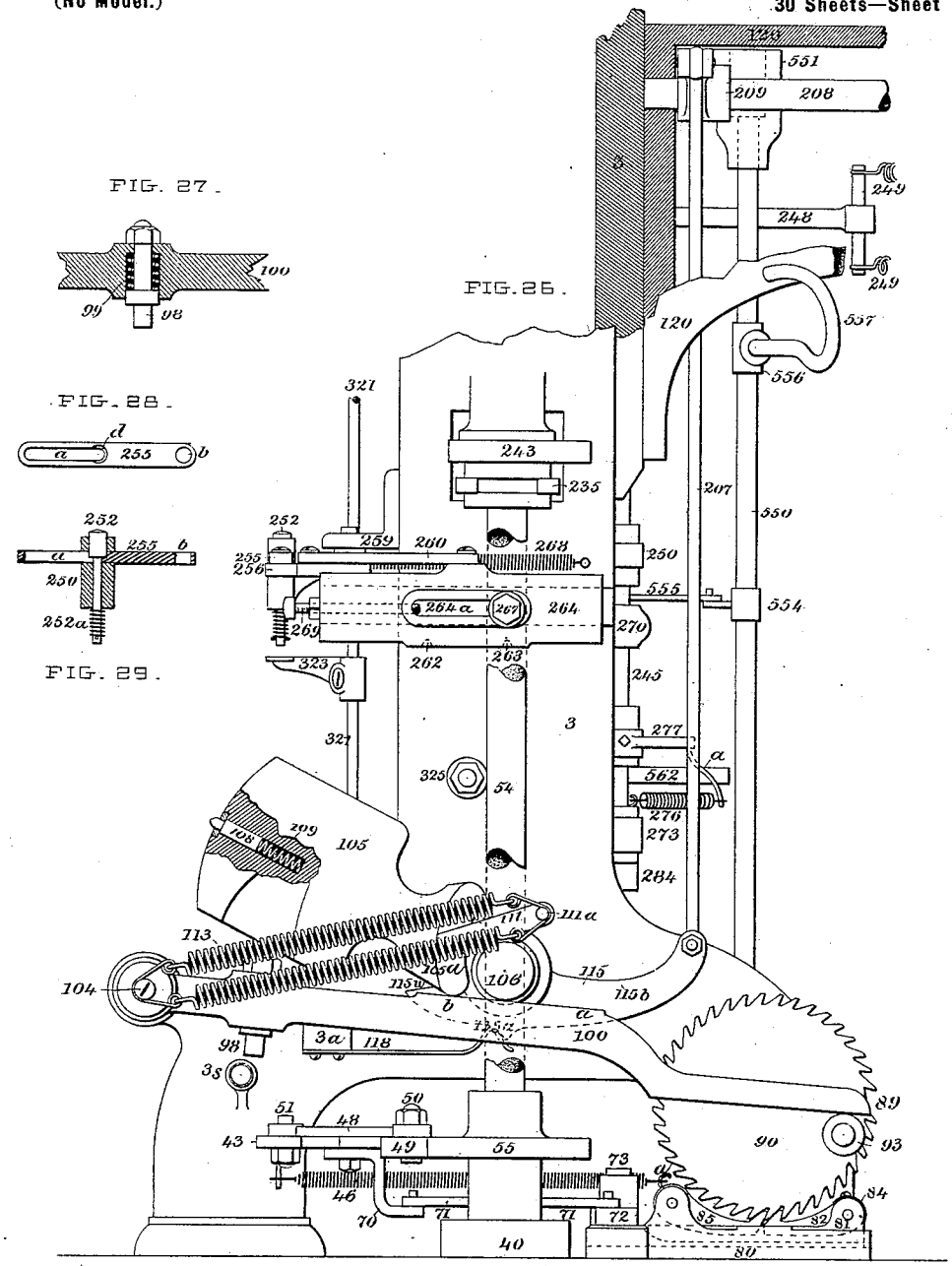

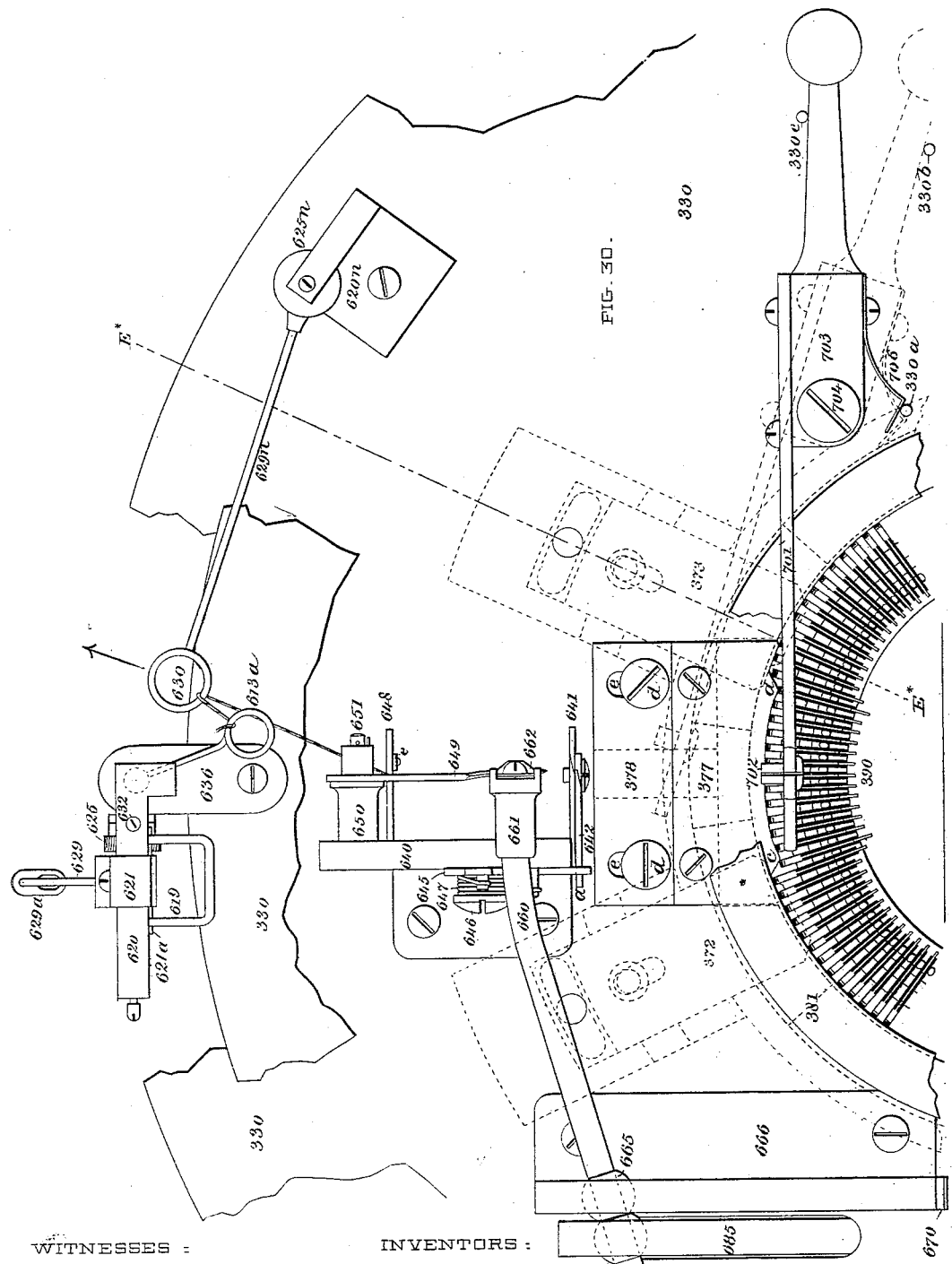

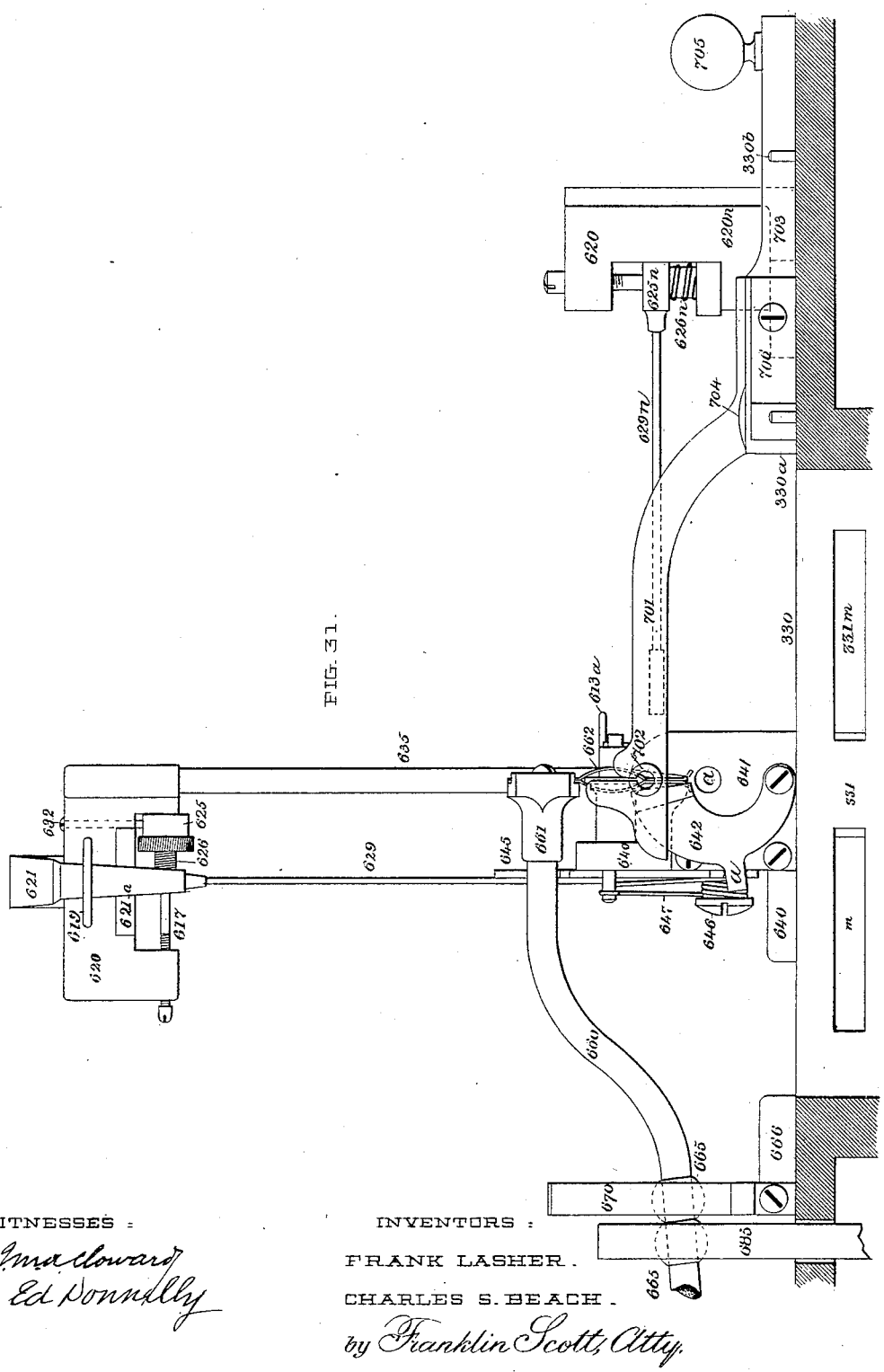

No. 632,872. Patented Sept. 12, 1899.
F. LASHER & C. S. BEACH.
KNITTING MACHINE.
(Application filed June 23, 1890.)
(No Model.)  30 Sheets—Sheet 16.
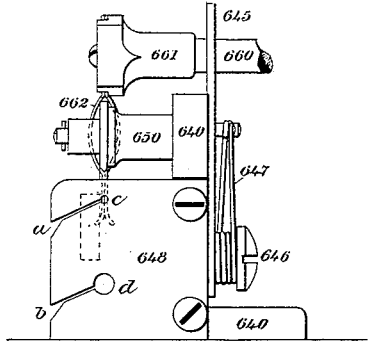
FIG. 35.
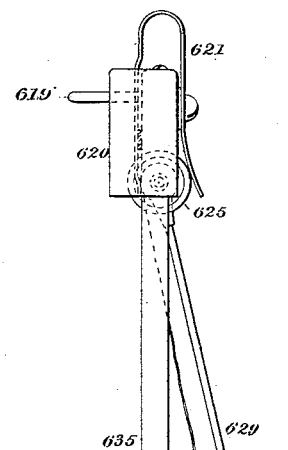
FIG. 32.
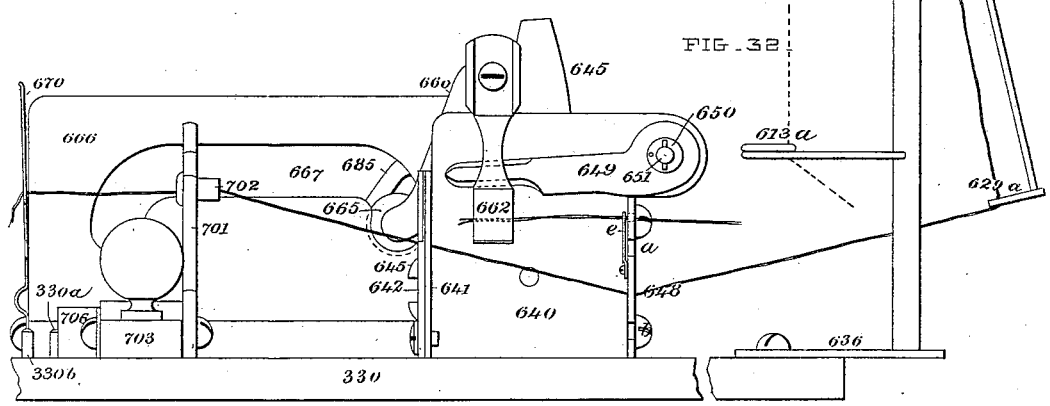
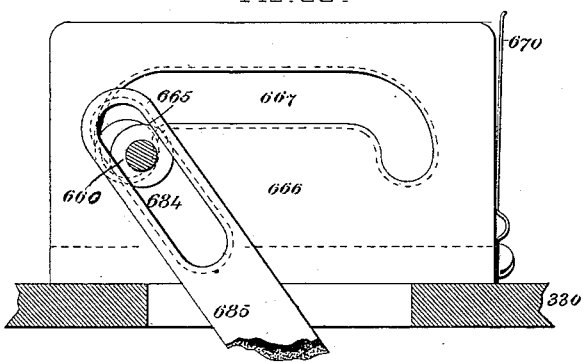
FIG. 33.
FIG. 34.
WITNESSES:
J. M. A. Cloward
Ed Donnelly
INVENTORS:
FRANK LASHER.
CHARLES S. BEACH.
by Franklin Scott, Atty.
THE NORRIS PETERS CO., PHOTO-LITHO., WASHINGTON, D. C.

No. 632,872. Patented Sept. 12, 1899.
F. LASHER & C. S. BEACH.
KNITTING MACHINE.
(Application filed June 23, 1890.)

(No Model.) 30 Sheets—Sheet 18.

WITNESSES:
J. M. A. Cloward
Ed Donnelly

INVENTORS:
FRANK LASHER.
CHARLES S. BEACH.
by Franklin Scott, Atty.

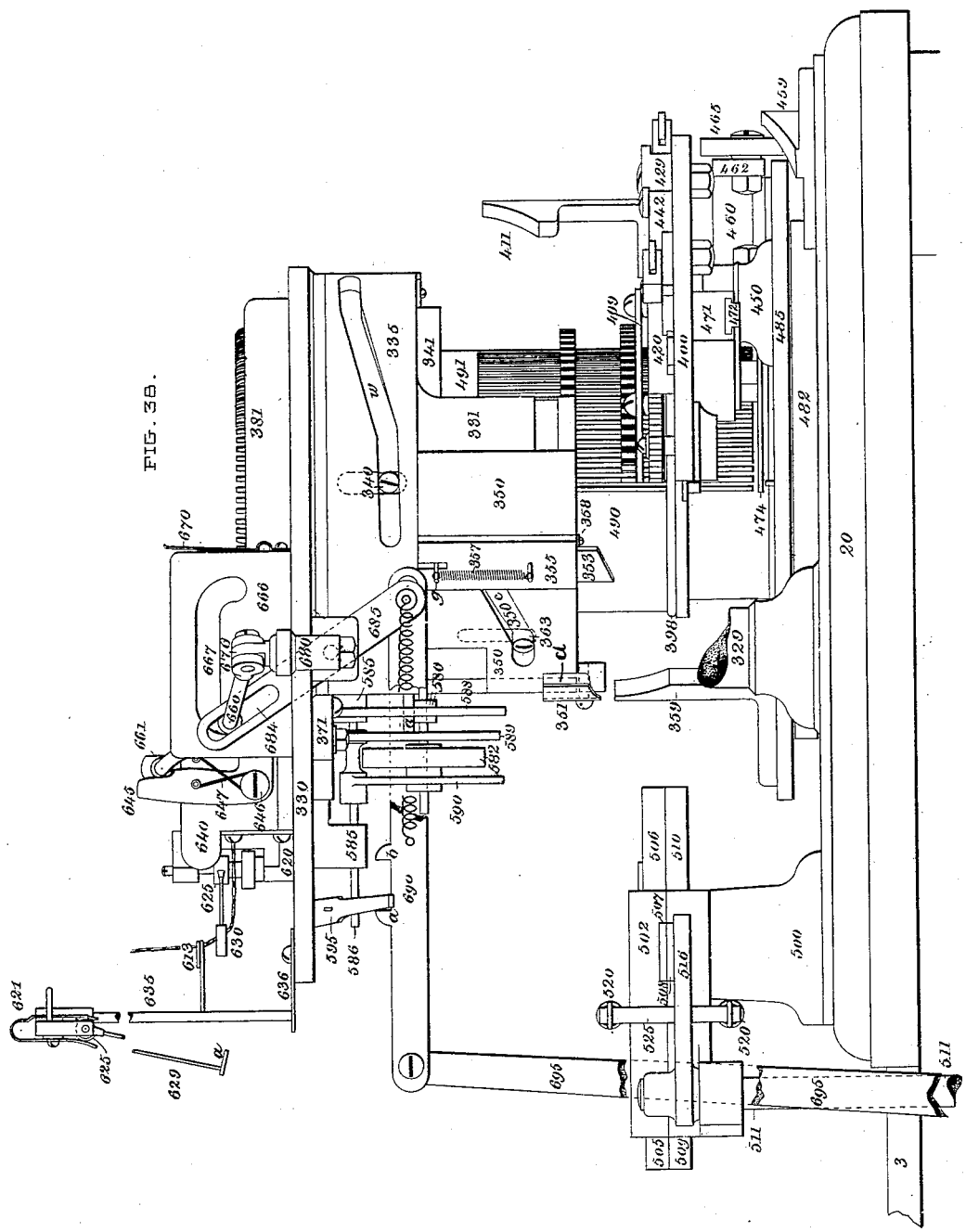

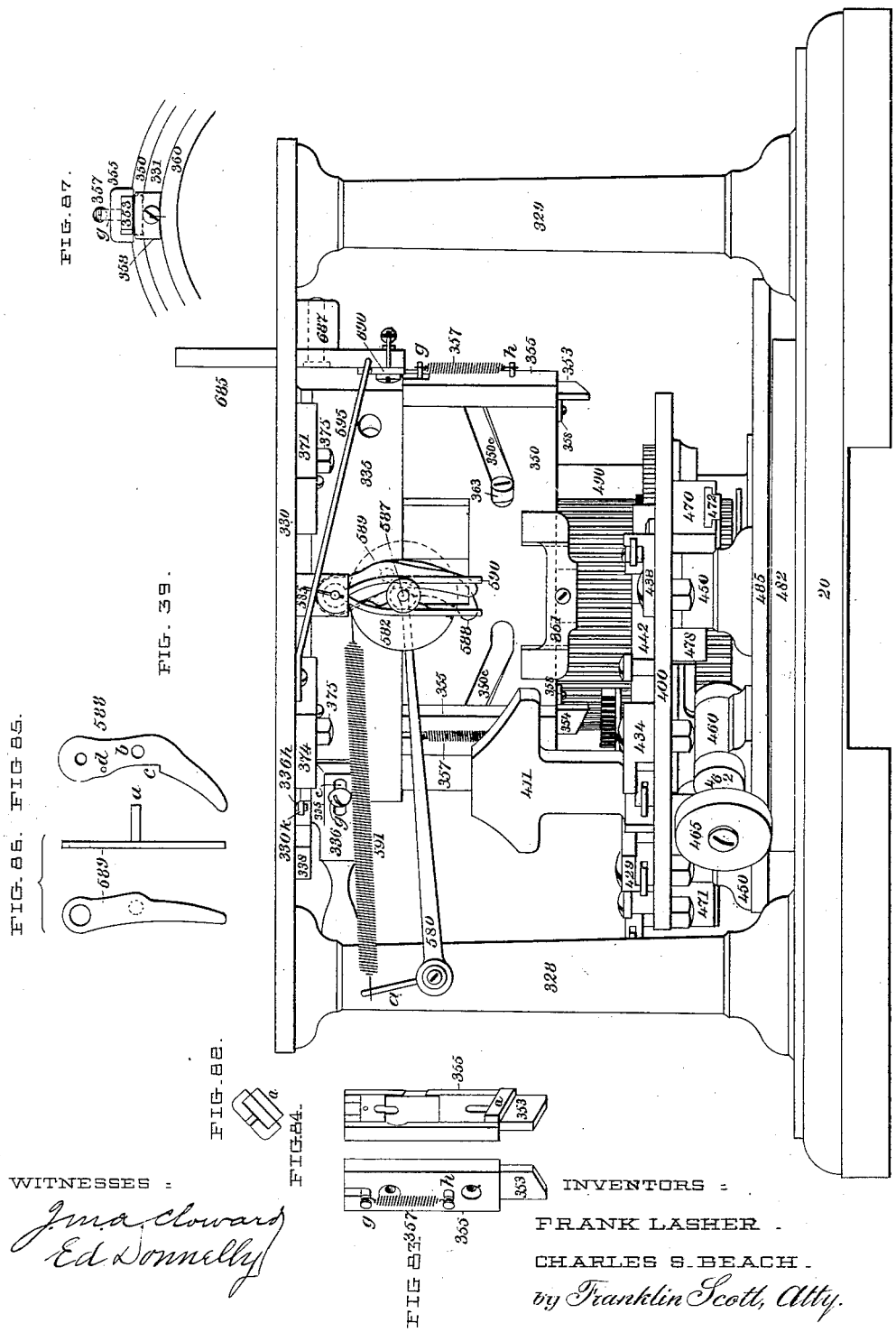

No. 632,872. Patented Sept. 12, 1899.
F. LASHER & C. S. BEACH.
KNITTING MACHINE.
(Application filed June 23, 1890.)
(No Model.) 30 Sheets—Sheet 21.
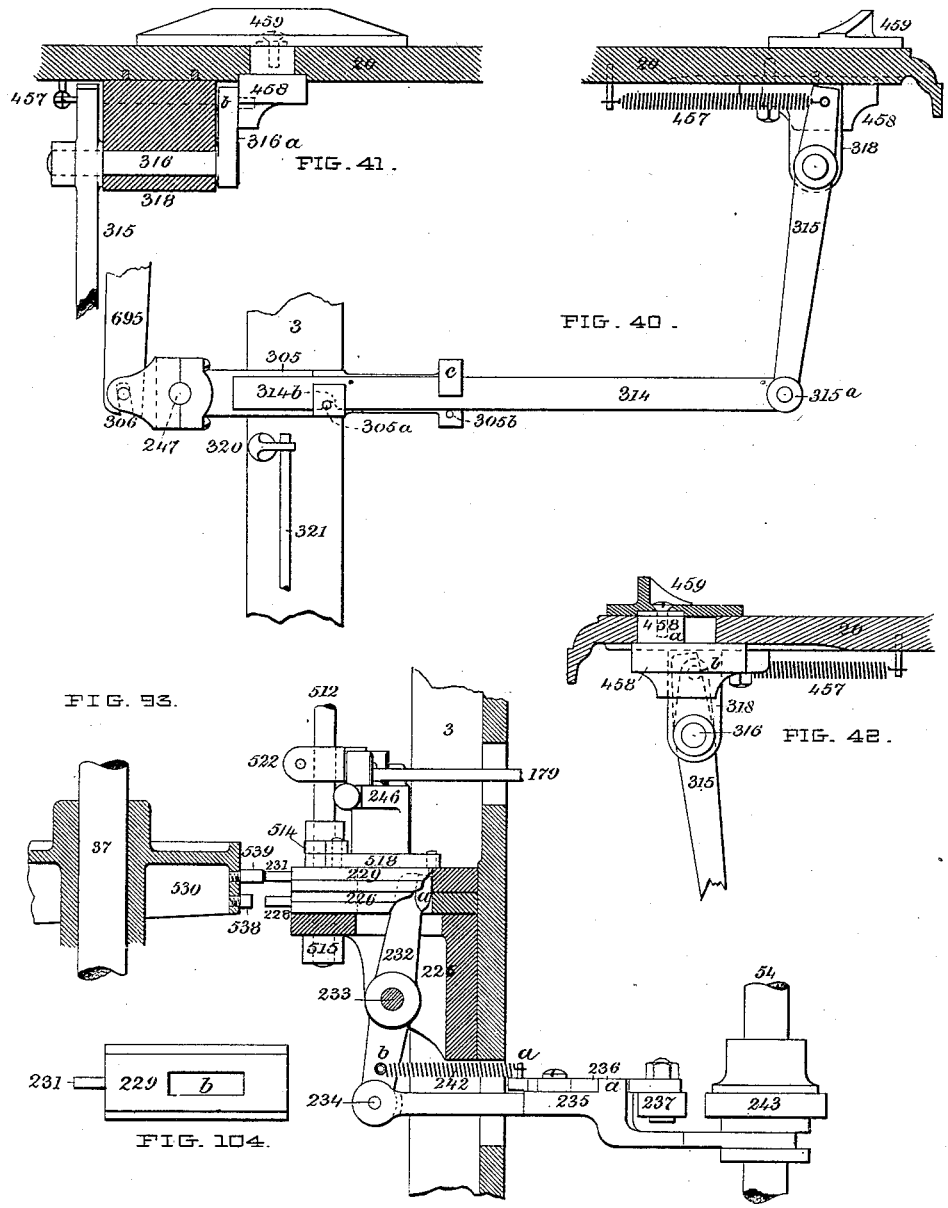
WITNESSES: INVENTORS:
FRANK LASHER,
CHARLES S. BEACH.
by Franklin Scott, Atty.

No. 632,872. Patented Sept. 12, 1899.
F. LASHER & C. S. BEACH.
KNITTING MACHINE.
(Application filed June 23, 1890.)
(No Model.) 30 Sheets—Sheet 22.
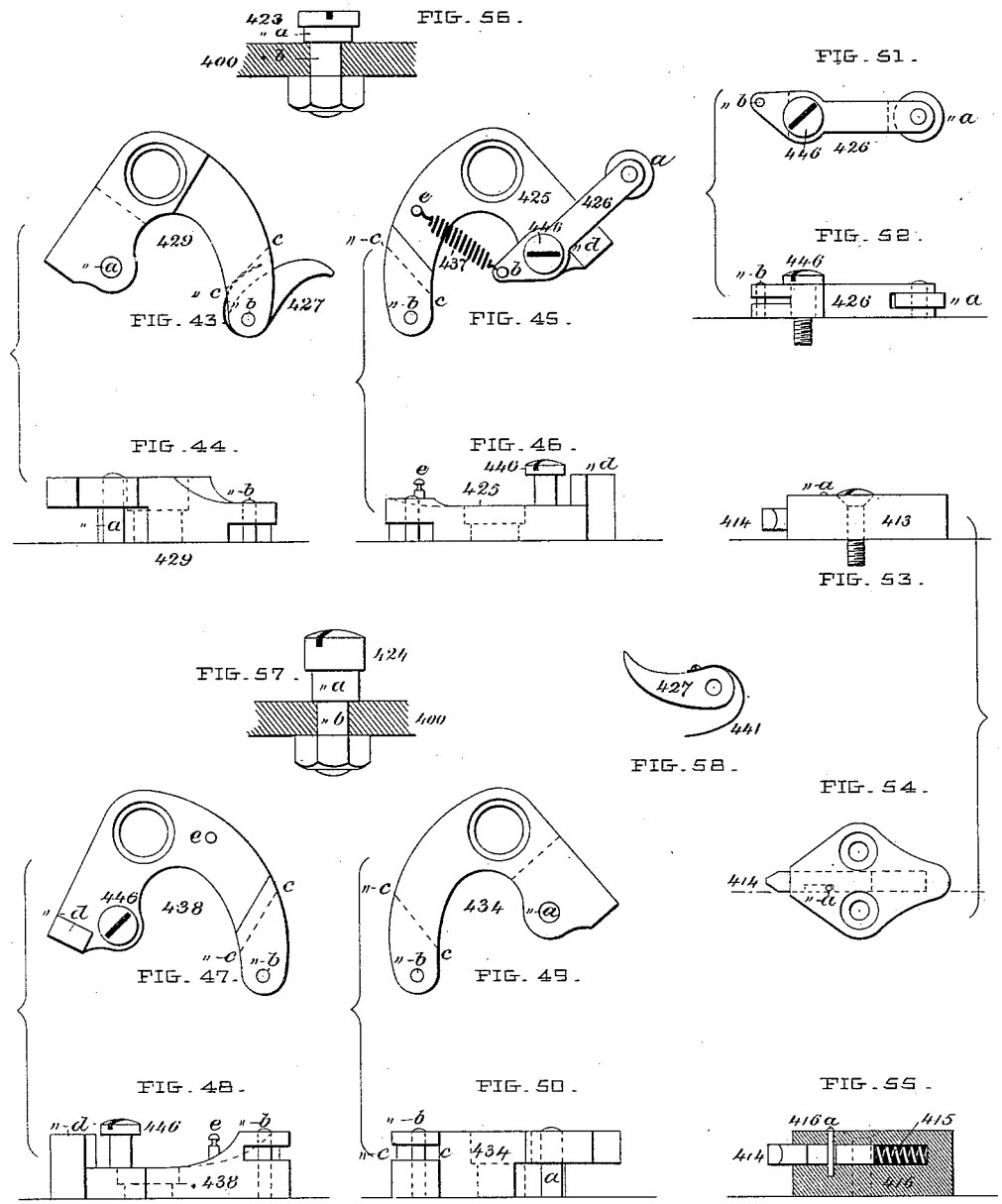
WITNESSES:
J. M. Cloward
Ed Donnelly
INVENTORS:
FRANK LASHER.
CHARLES S. BEACH.
by Franklin Scott, Atty.

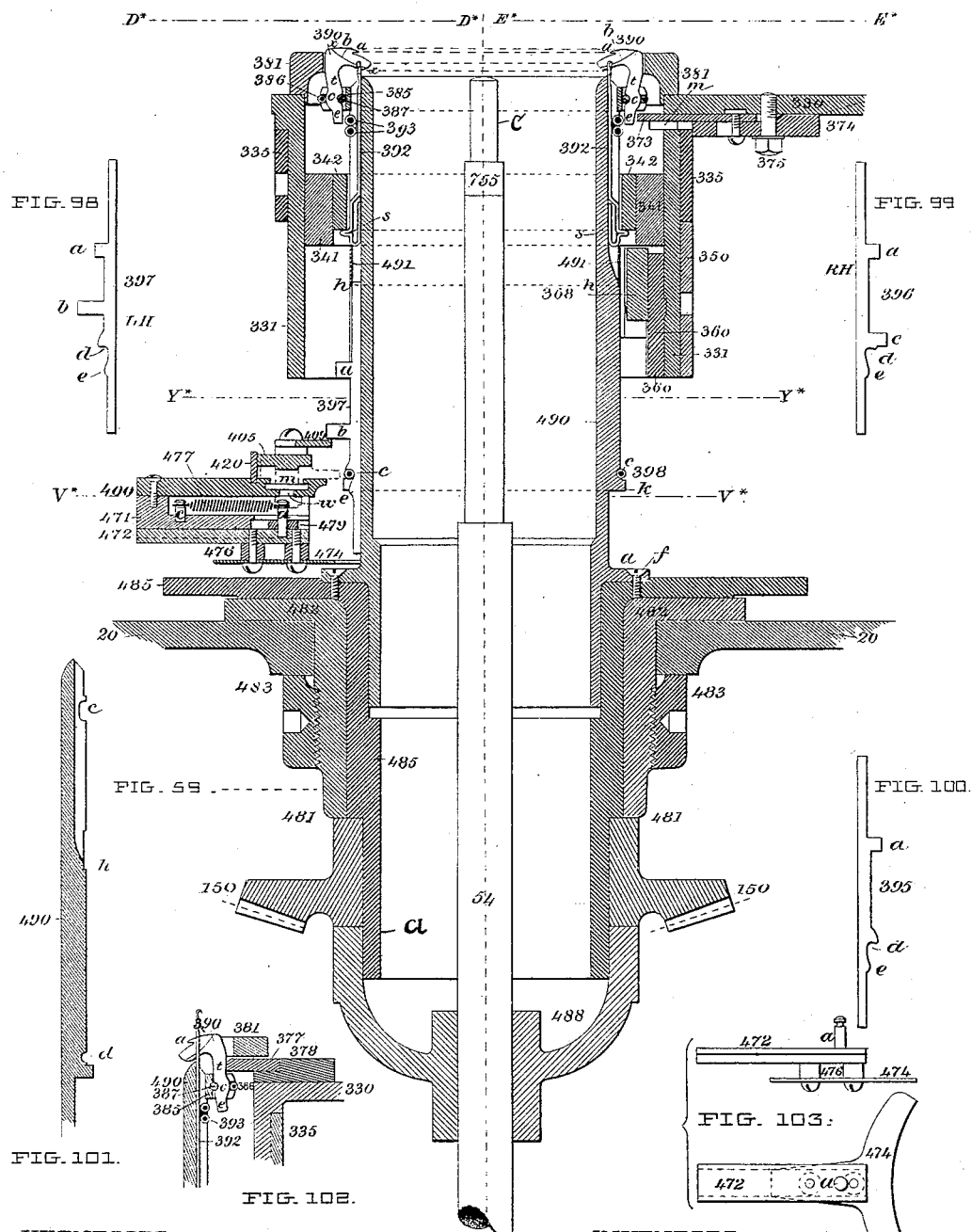

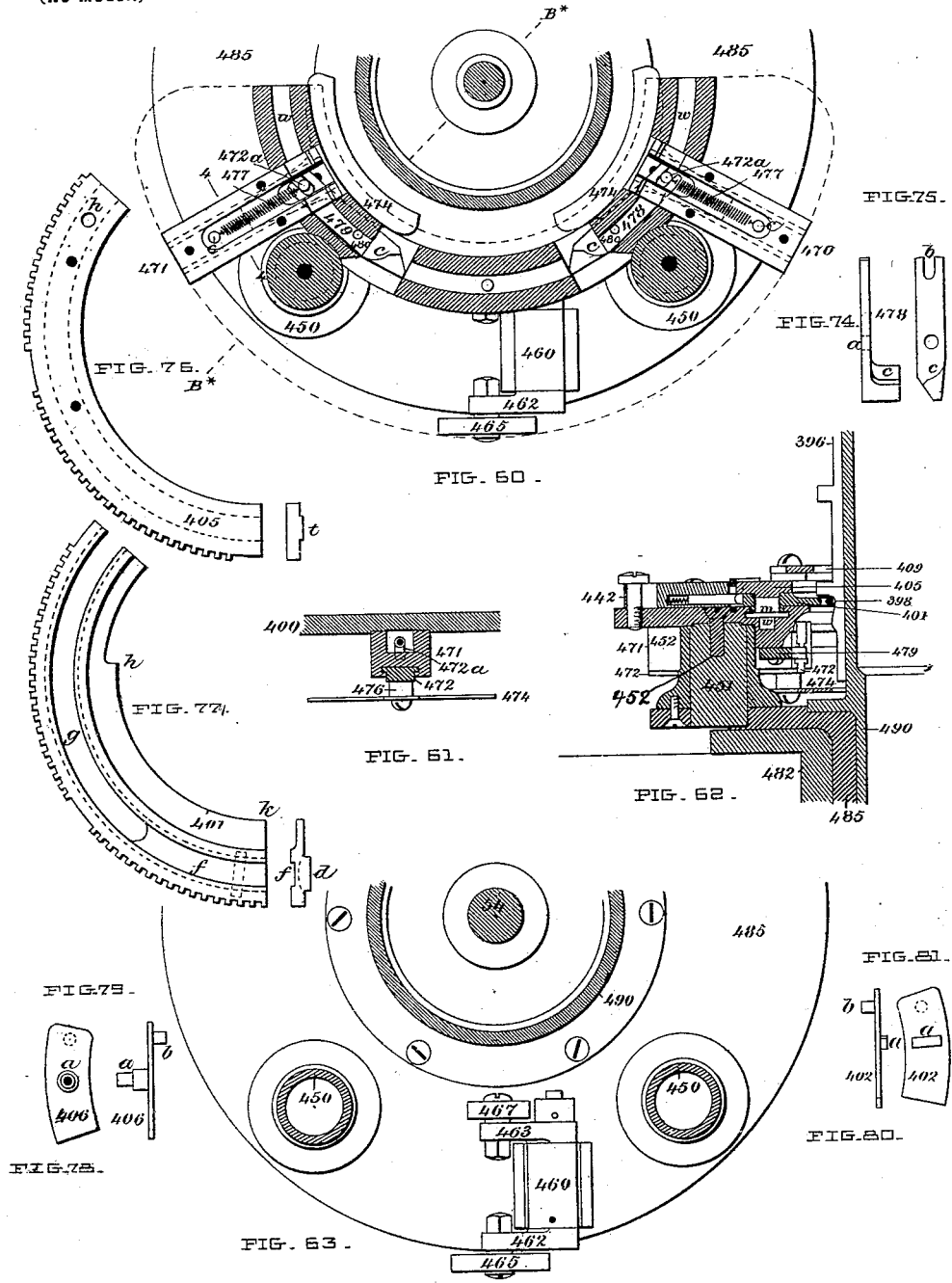

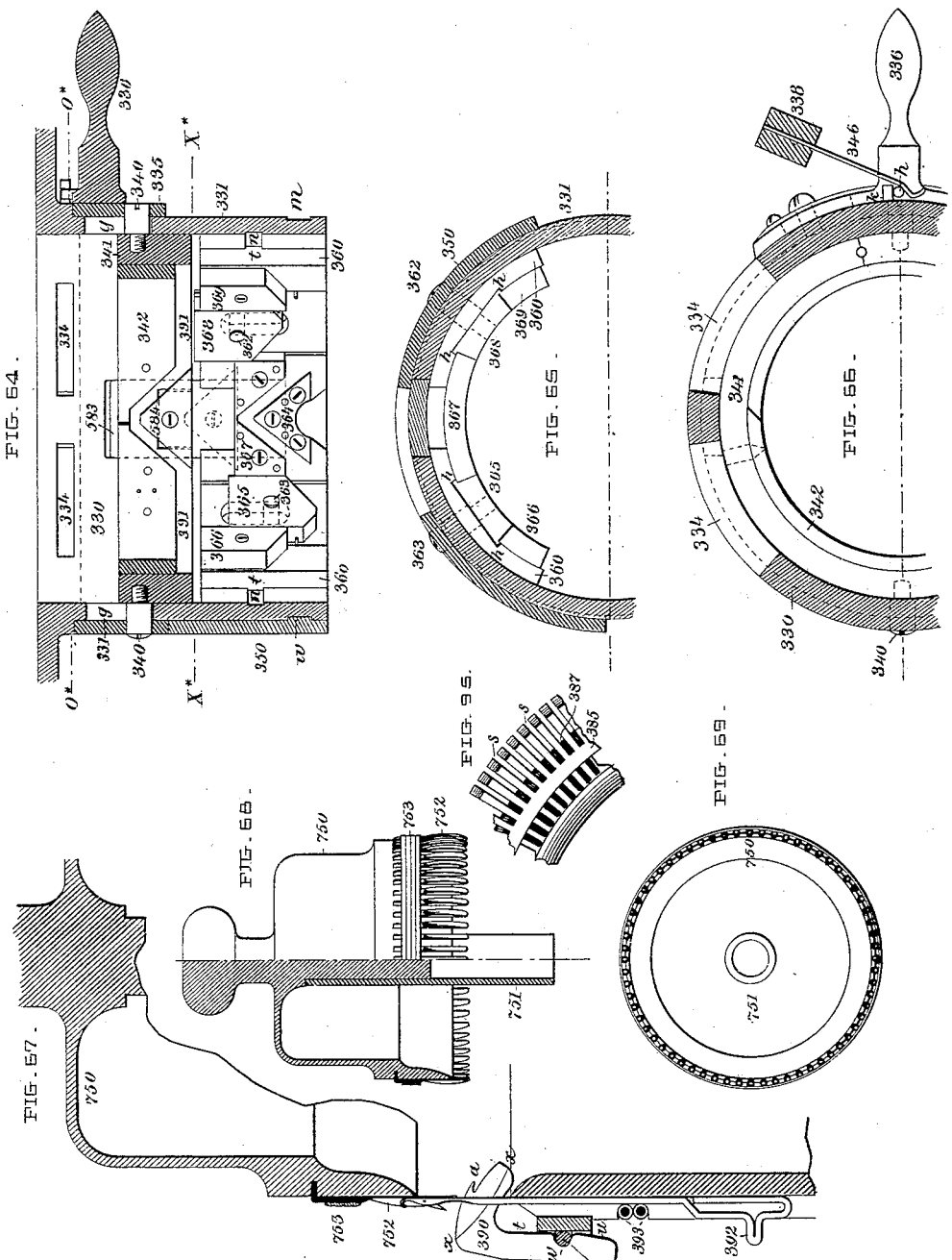

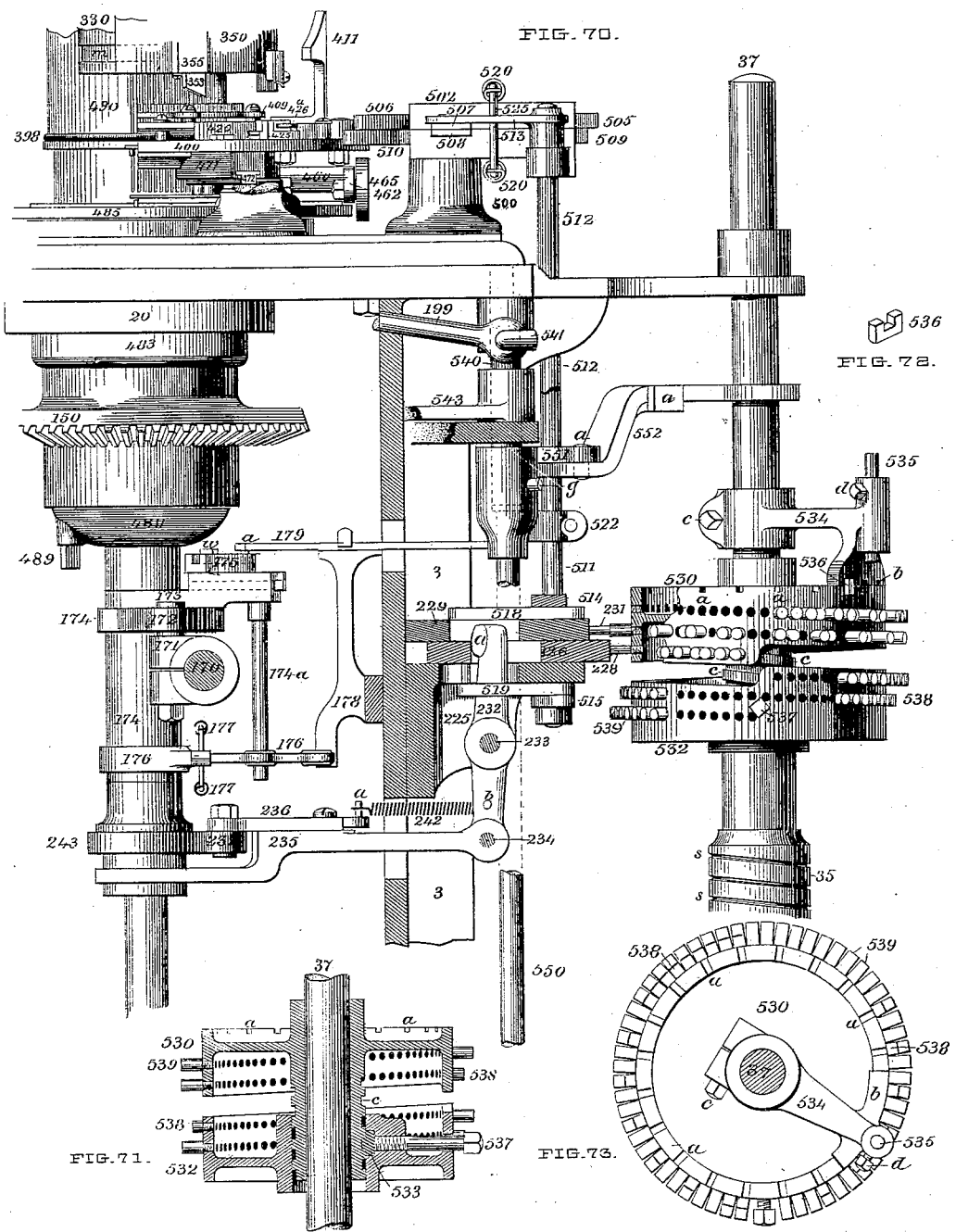

No. 632,872. Patented Sept. 12, 1899.
F. LASHER & C. S. BEACH.
KNITTING MACHINE.
(Application filed June 23, 1890.)
(No Model.) 30 Sheets—Sheet 27.
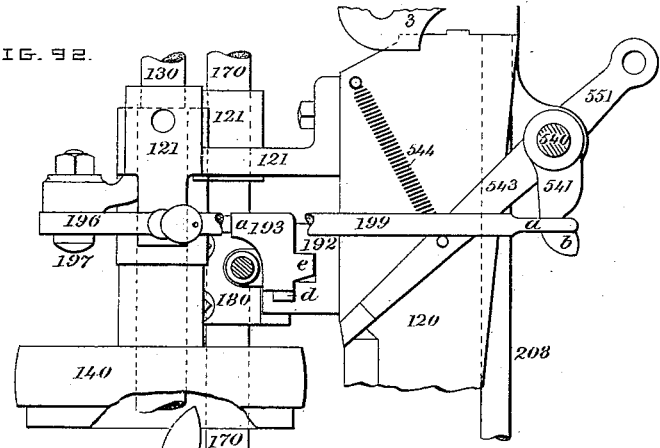
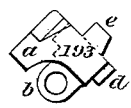
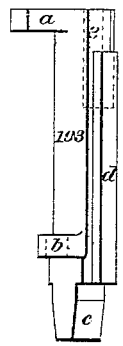
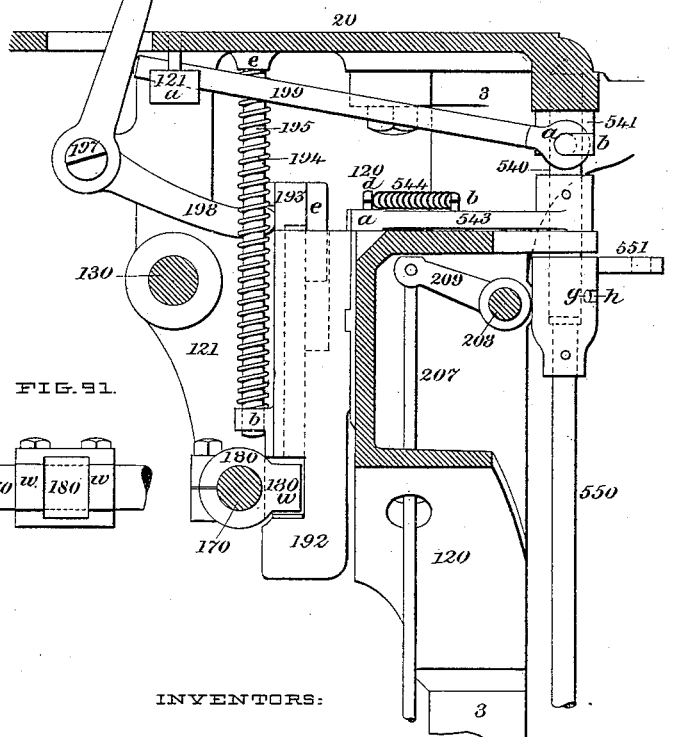
WITNESSES:
Sylvester Shaffer
Ed Donnelly
INVENTORS:
FRANK LASHER;
CHARLES S. BEACH,
BY Franklin Scott, ATTORNEY.

No. 632,872. Patented Sept. 12, 1899.
F. LASHER & C. S. BEACH.
KNITTING MACHINE.
(Application filed June 23, 1890.)

(No Model.) 30 Sheets—Sheet 28.

WITNESSES:
Sylvester Shaffer
Ed Donnelly

INVENTORS:
FRANK LASHER,
CHARLES S. BEACH,
BY Franklin Scott, ATTORNEY.

THE NORRIS PETERS CO., PHOTO-LITHO., WASHINGTON, D. C.

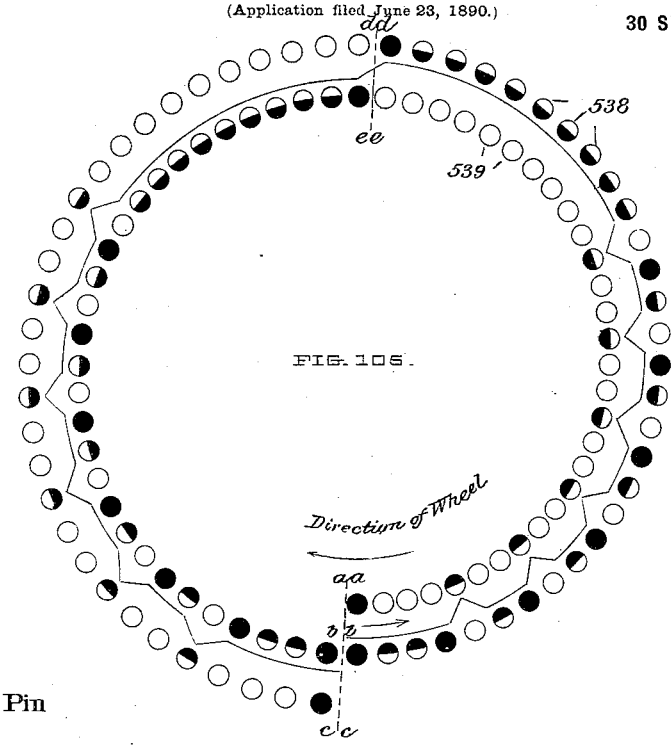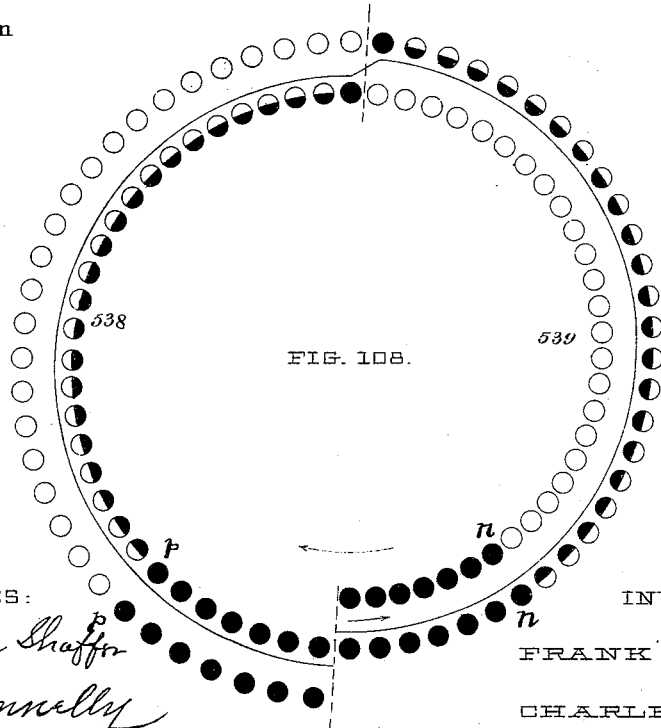

No. 632,872. Patented Sept. 12, 1899.
F. LASHER & C. S. BEACH.
KNITTING MACHINE.
(Application filed June 23, 1890.)

(No Model.) 30 Sheets—Sheet 30.

WITNESSES:
Sylvester Shaffer
Ed Donnelly

INVENTORS:
FRANK LASHER.
CHARLES S. BEACH.
by Franklin Scott, Atty.

UNITED STATES PATENT OFFICE.

FRANK LASHER AND CHARLES S. BEACH, OF BENNINGTON, VERMONT, ASSIGNORS TO THE LASHER STOCKING COMPANY, OF SAME PLACE.

KNITTING-MACHINE.

SPECIFICATION forming part of Letters Patent No. 632,872, dated September 12, 1899.

Application filed June 23, 1890. Serial No. 356,502. (No model.)

*To all whom it may concern:*

Be it known that we, FRANK LASHER and CHARLES S. BEACH, citizens of the United States, residing at the town of Bennington, in the county of Bennington and State of Vermont, have invented certain new and useful Improvements in Knitting-Machines; and we do hereby declare that the following is a full, clear, and exact description of the same.

The machine is designed to knit the class of goods commonly known as "half-hose," and it belongs to that class in which the needle-cylinder revolves and is equipped with latch-needles. It is particularly adapted to knit the style of stockings described in United States Letters Patent No. 271,338, granted to Frank Lasher and dated July 17, 1883.

The principal features of invention embraced in its organization are, first, novel devices for handling the main and splicing threads; second, novel mechanism for effecting the rotary reciprocating motion of the needle-cylinder in the process of fashioning the heel and toe; third, novel appliances for narrowing and widening in the process of fashioning the heel and toe; fourth, novel apparatus for changing the rate of speed from regular to fashioning knitting; fifth, mechanism to stop the machine at the completion of a stocking and return the pattern-wheel to its proper starting position; sixth, mechanism for knitting into the back and sole of the heel of the stocking short supplemental courses for the purpose of giving the heel greater fullness and elasticity.

Reference is made to the accompanying drawings, in which—

Figure 2:
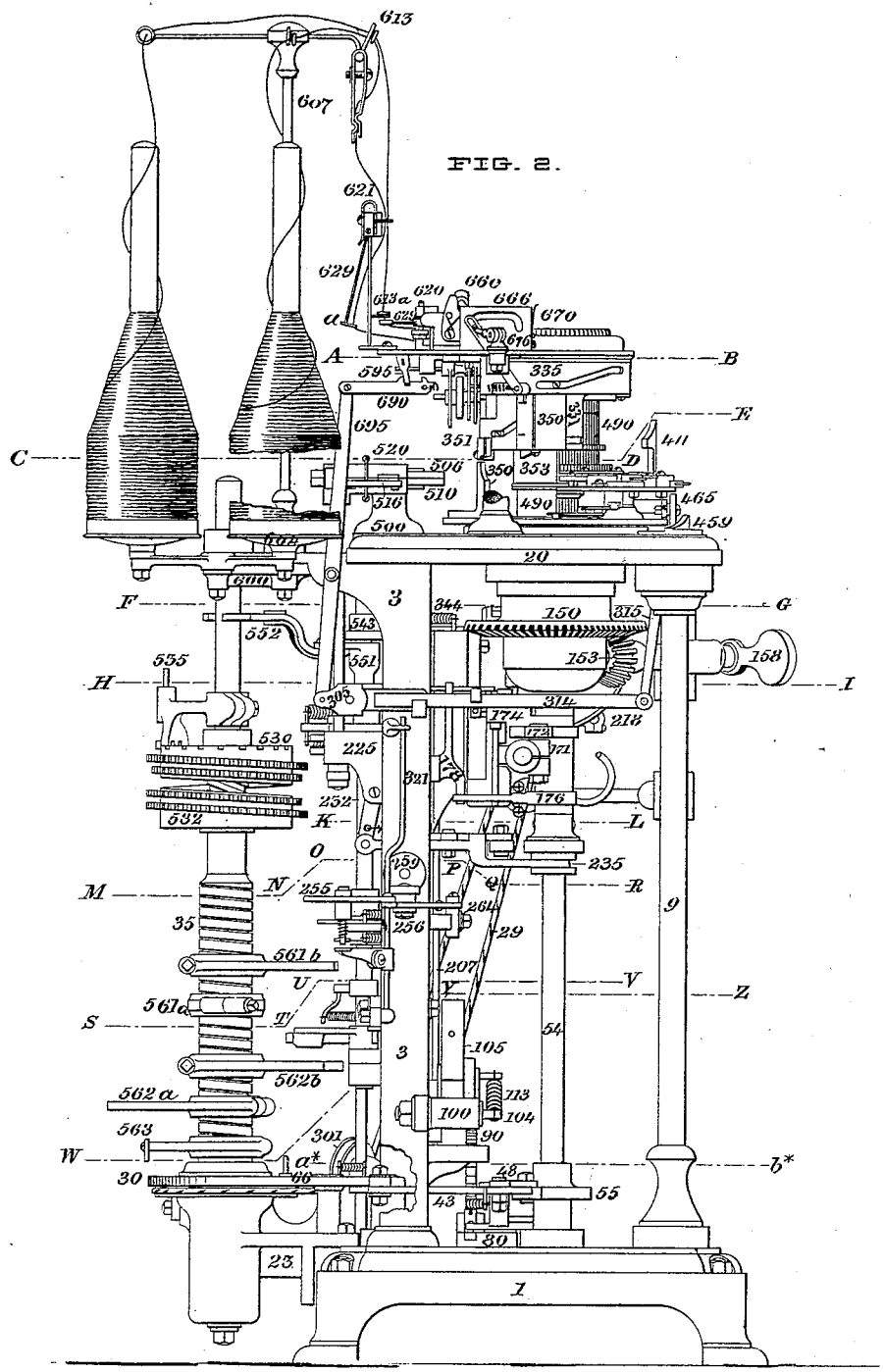
Figure 3:
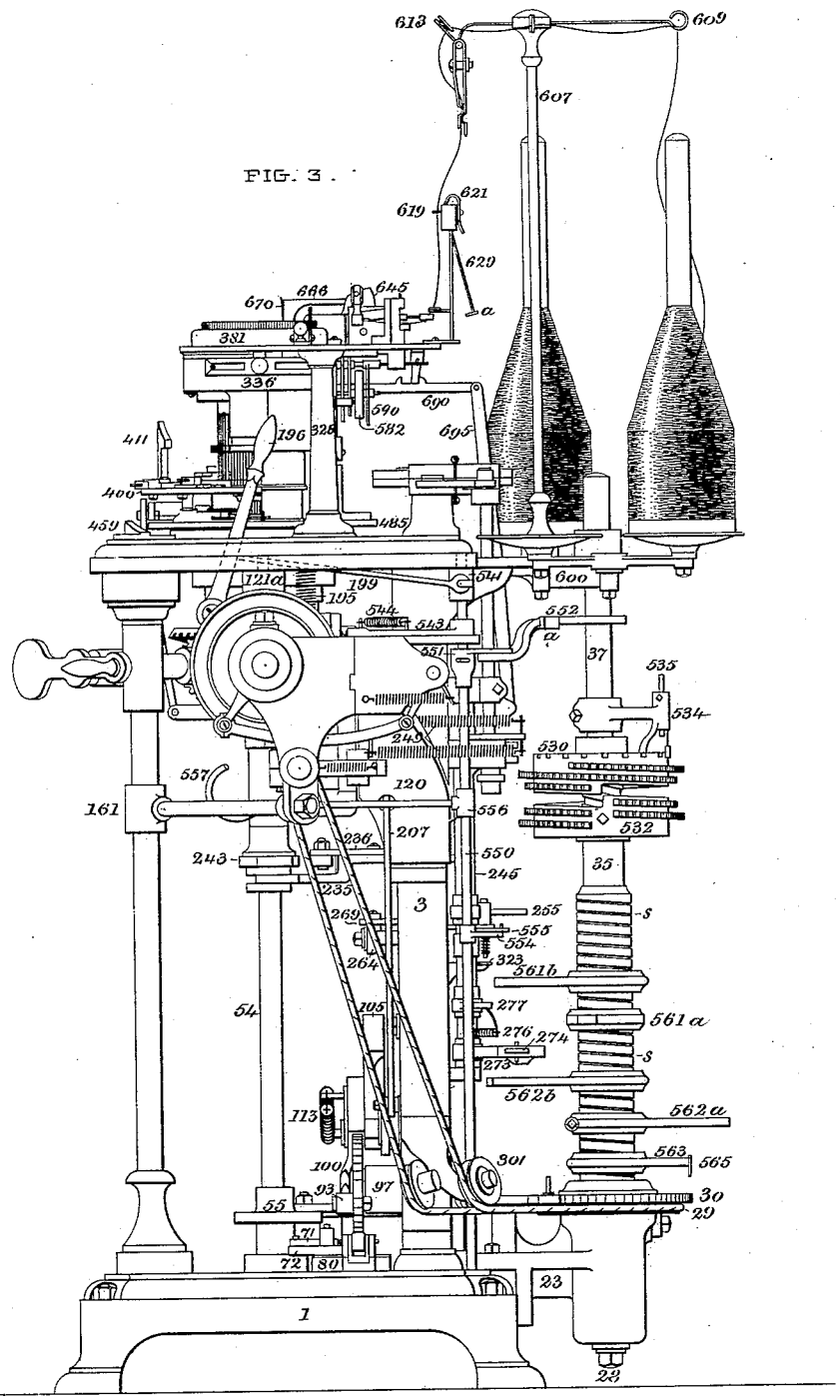
Figure 4:
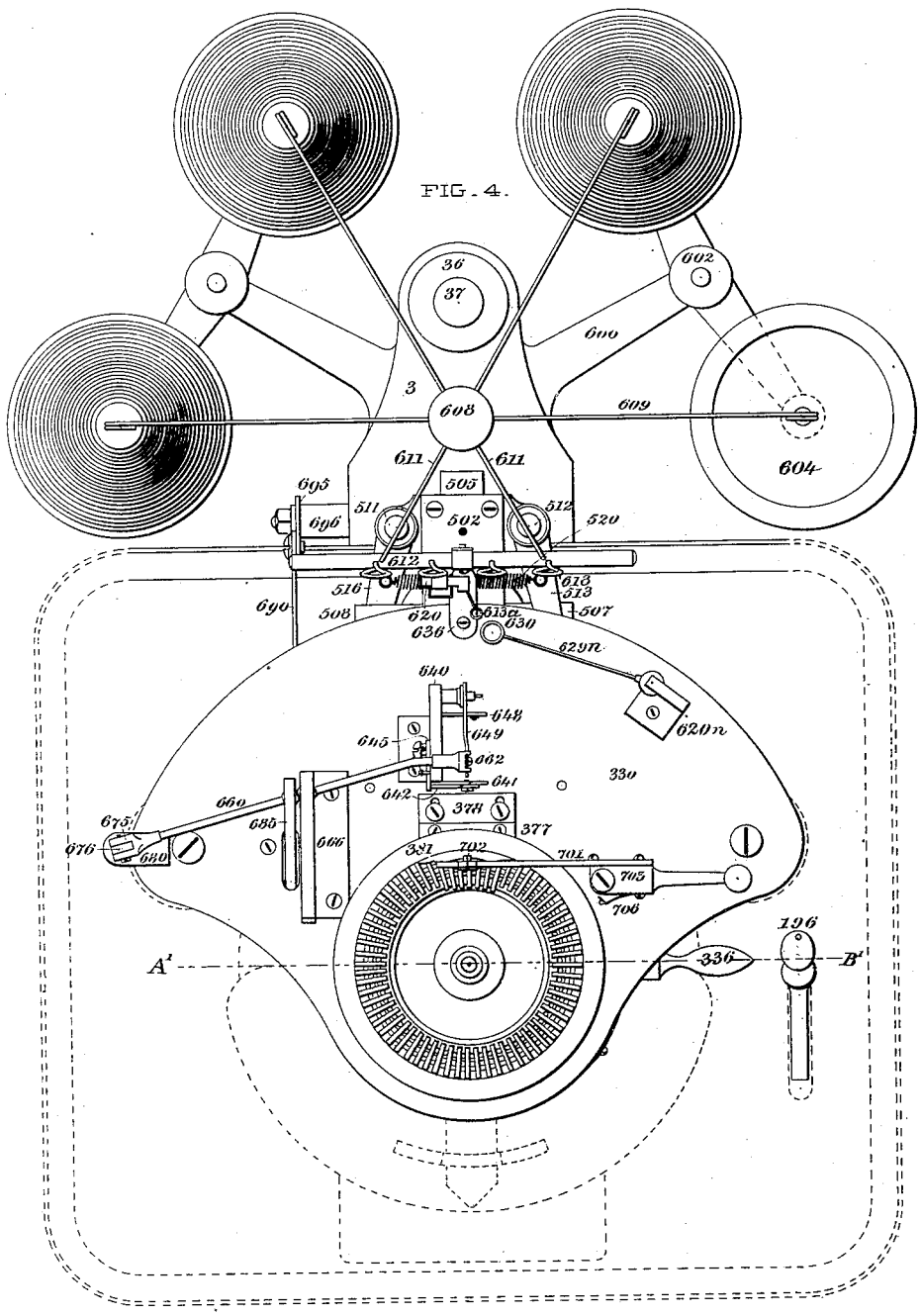
Figure 36:
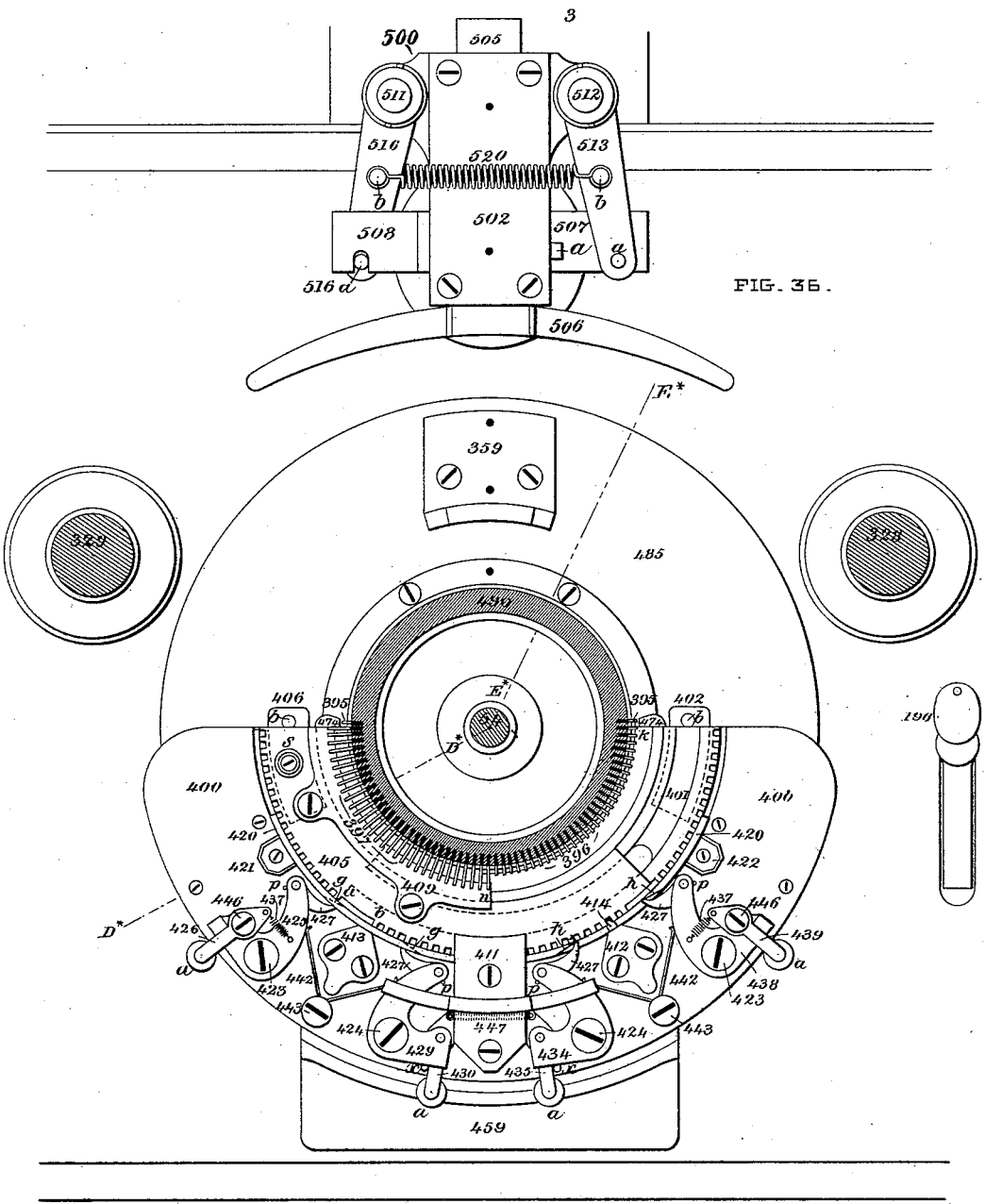
Figure 37:
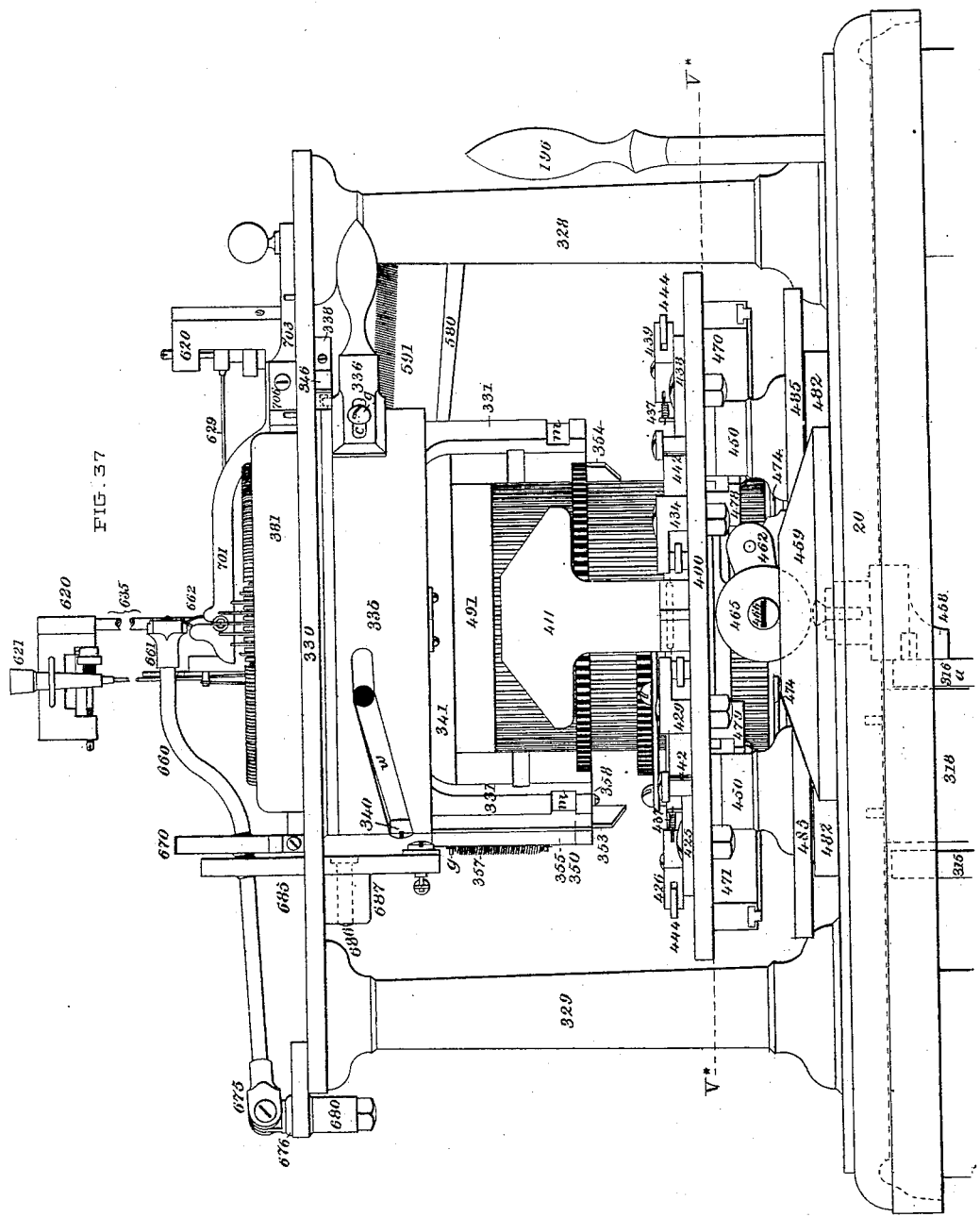
Figures 94, 109:
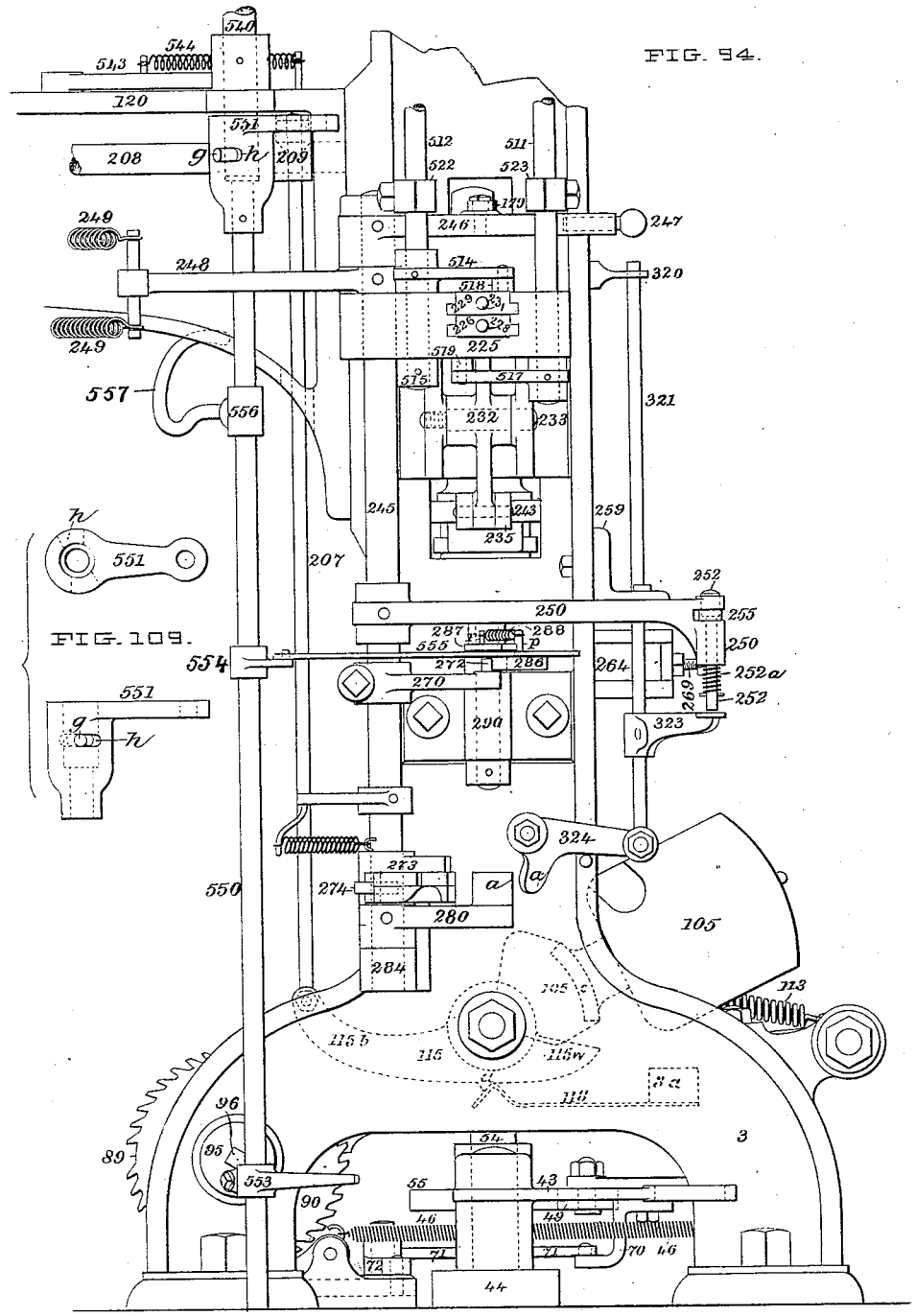
Figure 106:
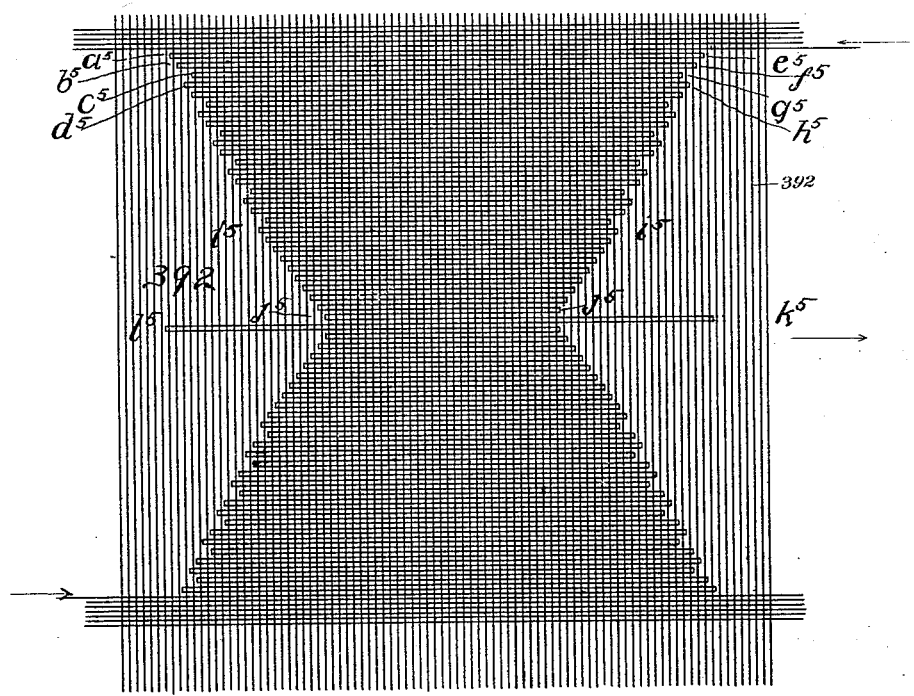

Figure 1 is a front elevation of the machine with all parts in the positions they occupy at the completion of the stocking, the stocking having just been run off the needles and the pattern-wheel nearly returned to the starting position. Fig. 2 is an elevation of the left side of the machine. Fig. 3 is an elevation of the right side of the machine, the pattern-wheel being about one-half a turn above the starting position. Fig. 4 is a plan of the top of the machine, including everything above the plane shown by the section E D C of Fig. 2 and at the back part, the spool-stand, and such of the framework as would come into view immediately above the plane at F. Fig. 5 is a transverse horizontal section through the needle-cylinder, taken on the line A B of Fig. 2, and shows in plan the parts between planes A B and C D E. Fig. 6 is a top plan of a horizontal section taken on the line C D E of Fig. 2 and shows those parts between sections C D E and F G. Fig. 7 is an inverted plan of the lifting-plate for heel and toe fashioning, shown just below D of Fig. 2. Fig. 8 is a top plan of the slide-stand shown in Fig. 2 at 500 with the cap and upper cam-slide removed. Fig. 9 is a top plan, on the section F G of Fig. 2, of the right half of Fig. 1 and shows the main driving-shaft, with pulleys, gears, and the supporting-knee on which they are mounted. Fig. 10 is a horizontal section taken through the center of the main driving-shaft and knee, shown in plan in Fig. 9. Fig. 11 is a vertical longitudinal section of the outer bearing of the main driving-shaft, taken at $C^*$ of Fig. 9. Fig. 12 is a vertical transverse section through the main driving-shaft, taken on the line $1^a$ $2^a$ of Fig. 10. Fig. 13 shows a top plan of the shifting-rod, reversing-gear, and pattern-wheel as exposed below a section taken on the line H I of Fig. 2. Fig. 14 is a detail horizontal section taken on the line C' D' E' F' of Fig. 15 and shows the straddler and its springs. Fig. 15 is a vertical section taken on the line $g$ $h$ of Fig. 16 and shows the detail of the reversing mechanism, which is otherwise shown in Figs. 16, 17, and 18. Fig. 16 is a front, 17 a back, and 18 an end, elevation as seen from the left of the reversing mechanism included in Fig. 2 between the planes H I and K L and in front of the back standard 3. Fig. 19 is a horizontal section on line K L of Fig. 2, showing the detail of the fork connection and the cam on the central shaft for withdrawing the pattern-slides. Fig. 20 is a horizontal section on line M N O P Q R of Fig. 2 and shows those parts immediately below the plane of section and some included in the next lower section to better show their connection. Fig. 21 is a horizontal section on the line S T U V of Fig. 2, showing only those parts included between it and the next lower section. Fig. 22 is a horizontal section on the line W X Y Z of Fig. 2 and shows everything below it and above the floor. Fig. 23 is a horizontal section on the line a* b* of Fig. 2, omitting the front standards, and shows the gear for actuating the pattern-shaft and the devices for raising the weight which changes the speed in shifting from plain knitting to fashioning, and vice versa. Fig. 24 is a detail plan of a part of Fig. 23. Fig. 25 is a detail fore-and-aft vertical section of a part of what is shown in Fig. 23, taken on the line k l of that figure. Fig. 26 is a broken front elevation of that part of the machine below the line K L and down to the top of the base, Fig. 2, and shows a face view of the devices for raising, holding, and tripping the weight which changes the speed. Figs. 27, 28, and 29 are details of parts appearing upon the same sheet. Fig. 30 is a top plan of those parts appearing directly above the line A B of Fig. 2 and shows, on an enlarged scale, the devices for handling the main and extra threads. Fig. 31 is a front elevation of the parts shown in plan in Fig. 30. Fig. 32 is a detail right-side elevation of the extra-thread-carrier guide and its actuating-lever. Fig. 33 is a left-side elevation of the ball-guide stand in which the thread-carrier ball-guide works. Fig. 34 is a left-side elevation of the thread-guide and shear-stand. Fig. 35 is a back elevation of the same. Fig. 36 is an enlarged plan view of the heel-and-toe-fashioning gear. Fig. 37 is a front, Fig. 38 a left-side, and Fig. 39 a back, elevation of the parts directly employed in the knitting, and all are situated above the table. Fig. 40 is a left-hand side elevation of the unhooking device and sliding cam for raising the lifting-plate. Fig. 41 is a front, and Fig. 42 a right-side, view of part of the same. Figs. 43 to 58, both inclusive, are details of the various parts of the fashioning mechanism. Fig. 59 exhibits two vertical semidiametrical sections of the needle-cylinder taken on the lines D* D* and E* E* of Figs. 30 and 36 and shows in connection with the cylinder a portion of the knitting apparatus. Fig. 60 is a plan, partly in horizontal section, taken on the line V* V* of Figs. 37 and 39 and shows in part the jack-lifting apparatus. Fig. 61 is a transverse vertical section through the pick-up-slide guide, taken on the line 4 4 of Fig. 60. Fig. 62 is a vertical section on the line B B of Fig. 60, cutting the cylinder, lifting-plate, slide-stand, and guide-plug. Fig. 63 is a partial plan of the front half of the cylinder-flange, as shown in Figs. 1, 2, and 3, with the lifting-plate removed. Fig. 64 is a vertical section of the top plate, taken on the line A A, Fig. 4, and shows the needle-raising cam, drawdown ring, and jack-race, with its various cams, &c. Fig. 65 is a transverse section taken on line X X of Fig. 64. Fig. 66 is a transverse section taken on line O O of Fig. 64. Fig. 67 is a vertical section of the transferring device shown in Fig. 68 and shows a portion of the cylinder with a needle in position as in the act of transferring. Fig. 68 is the transferring device in quarter vertical section. Fig. 69 is a bottom view of Fig. 68. Fig. 70 is a side view, partially in broken section, of the principal parts involved in the fashioning process. Fig. 71 is a view of a diametrical section of the pattern-cylinder. Fig. 72 is a perspective view of the key which locks the stop-lug on the pattern-wheel. Fig. 73 is a plan view of the top of the pattern-wheel. Figs. 74 and 75 are respectively side and top views of the right-hand pick-up lever, as seen at 478 in Fig. 60. Fig. 76 is a plan of the upper, and Fig. 77 is a plan of the lower, fashioning-rack, which are shown in position in Fig. 36. Figs. 78, 79, 80, and 81 are respectively plan, edge, and edge and plan views of the left and right hand rack-dogs which actuate the pick-up lever 478. Figs. 82, 83, and 84 are detail views of the jack-race, shifter-lugs, and lug-guides found at 353, 354, and 355 in Fig. 39. Figs. 85 and 86 are views of the suspender-catch and unhooking-lever, respectively, used for controlling the cam-slide 583. Fig. 87 is a bottom view of the lugs and lug-guides shown in Fig. 84. Fig. 88 is an elevation of the lever and connections for starting and stopping the machine. Figs. 89 and 90 are respectively top and side views of the stop-drop, which is shown in position in Figs. 88 and 92. Fig. 91 is a face view of a stop-clamp which is attached to the shipping-rod for the drop 193 to play in. Fig. 92 is a plan view of parts shown in Fig. 88. Fig. 93 is a fore-and-aft vertical section through the pattern-wheel and the main standard of the machine, showing the devices for working the pattern-slides. Fig. 94 is a rear elevation of the main standard and its principal appurtenances. Fig. 95 is a plan view of a detached broken section of the top edge of the needle-cylinder. Fig. 96 is a plan view of locking-hook 286. Fig. 97 is a plan and edge view of the locking-arm on the rock-shaft 245. Figs. 98 and 99 are views of the left and right hand needle-jacks. Fig. 100 is a view of the outside jack in the series of which there are two. Fig. 101 is a detached sectional view of the top of the needle-cylinder. Fig. 102 is a detail showing the construction and adjustment of the stitch-holders. Fig. 103 is a plan and edge view of one of the pick-up slides. Fig. 104 is a top view of one of the pin-slides which form a part of the pattern mechanism. Fig. 105 represents in scroll style a scheme for pegging up the pattern-wheel to fashion a heel. Fig. 106 is an analytical diagram showing the number and relative arrangement of the courses of stitches in forming a heel after the scheme shown in Fig. 105. Fig. 107 is a face view of the clutch-tightening lever 186. Fig. 108 represents in scroll style a scheme for pegging up the pattern-wheel to fashion a toe. Fig. 109 is a top and side view of the female member of the socket-coupling at the top of rock-shaft 550. Fig. 110 is a detail of stud 61, showing means for adjusting the length of pawl 66.

*Explanation of lettering on the drawings.*—
In designating the several parts of this machine we have been compelled to deviate from the usual practice of giving a separate character to each particular detail of the various parts, and instead have given to each member a definite number, and the details of that member are usually marked with a small letter. This becomes necessary on account of the small scale to which some of the drawings have been made, the diminutive size of the details precluding the use of a numeral or character of more than a single stroke. The system is illustrated in Figs. 43 and 45, which show two of the fashioning bell-cranks, one marked 429 and the other 425, the subordinate details being marked "a, b, c, d," &c., and whenever these details are referred to in the specification the detail letter is usually coupled with the number of the piece to which it belongs—$429^b$, $425^d$, &c.

In describing the parts of the machine the plan will be followed as nearly as possible of taking up and describing in order the several parts which coöperate to produce a given function, irrespective of adjacent or collateral parts, tracing the parts consecutively from the point of the application of the power to the point of the performance of the given function.

All the operative parts of the machine are mounted on the base 1. Upon this base are erected two supporting-columns 8 and 9 in front, and a main standard 3 in the rear. These support a table 20, upon which is erected a portion of the heel and toe fashioning apparatus, and a bush 482 is let into the center of the same, in which the needle-cylinder is journaled. A rear projection 600 carries the bobbin-stand and part of the yarn-guides. A laterally-projecting bracket 120 is attached to the back standard 3, which carries the driving-shaft 130 and a clutch shifting-rod 170 and some other parts of the stopping and starting apparatus. At the back side of the base the bracket 23 is attached, in which the pattern screw-shell is centered. On the back side of the standard 3 the slide-bracket 225 is attached, which carries the slides that coöperate with the pins on the two sections of the pattern-wheel.

*The driving apparatus.*—This is well shown in Figs. 9, 10, 11, 12, and 13. It consists of the driving-shaft 130, which runs in bearings in the journal-brackets 121 and 122, which are attached to bracket 120. At its inner end it carries the driving-pinion gear 151, the hub of which runs against bracket 121, and on the opposite side of said bracket the collar 131, whereby endwise movement of the shaft is prevented. In the bracket 122 the pulley-shifting bush 123 is fitted, so as to turn and slide simultaneously. Its endwise-sliding motion is obtained by the coöperation of the helical slot $123^a$, Figs. 10 and 12, cut in the bush, with the stud 138, which passes through the bush-bearing in said slot. Its rolling movement is imparted by means of the bush-arm 124, the upper end of which encircles the bush $124^a$ and is pinned to it, so that when the arm is swung it causes the bush to turn in its bearings. Bush-arm 124, where it encircles the bush, is fitted with an annular flange $124^b$, which takes into a necking in the hub of the quick-speed driving-pulley 145, so that when the bush is turned pulley 145 is slipped along in one direction or the other on the shaft 130. This pulley 145 is the one provided for rapid work in knitting the straight parts of the leg and foot of the stocking, and being smaller in diameter than those provided for the fashioning-work it drives the machine much faster than it is possible to run the fashioning devices. Its rim is internally coned, as shown, so as to coöperate with a driving-clutch 144, which also has a sliding movement over the end of the hub of the pulley 143 and the clutch-collar 135, which collar is fast on shaft 130. It is necked, as shown, for the reception of the driving-clutch fork 190, by which it can be shifted independently of pulley 145. Its rim is coned to fit the interior of pulley 145, thus making a cone clutch, both members of which have an axial sliding movement. This feature possesses special advantages, as will be seen further on. The middle part of the shaft 130 is fitted with a feather 133, over which the double-cone clutch 141 is fitted to slide. This double cone is designated as a switch-clutch because it effects the reversal of motion of the needle-cylinder in the to-and-fro motions of the same in knitting the heel and toe. It is fitted to coöperate with the direct-acting clutch-pulley 143 and the retro-acting clutch-pulley 140, both of which, independent of clutch movements, revolve freely on the driving-shaft. Pulleys 140 and 143 are internally coned to fit the cone faces of the switch-clutch, but are belted to run in opposite directions, pulley 143 running in the same direction as the driving-pulley 145, while the other one runs in the opposite direction. The switch-clutch has a very limited movement and is shifted by a fork 183. This is called a "switch-fork" to distinguish it from fork 190, which is called a "clutch-fork." Shaft 130 carries bevel-pinion 151 at its inner end, as before stated, which engages with the bevel-gear 150 on the lower part of the needle-cylinder, from which various constant and intermittent movements are through sundry devices imparted. Independent of the main driving-shaft, a supplemental bevel-pinion 153 on the auxiliary shaft 155 is provided for the purpose of turning the cylinder forward and back, as may be required in making repairs or in transferring a "rib" to the needles on the cylinders. This is controlled by a balance-crank 158 159 and is under the control of the operator.

*The transfer apparatus.*—This consists of the device upon which the stitches of the stocking top or rib are first run on and from which they are thence tranferred to the needles of the machine. It is used in connection with a post or stud erected in the center of the needle-cylinder. Its construction and use may be deduced from an inspection of Figs. 59, 67, and 68. As it forms the subject-matter of United States Letters Patent No. 478,613, dated July 12, 1892, it is only referred to here in a general way for the purpose of explaining the nature and use of certain parts of the machine, the functions of which would not be entirely clear without such reference and explanation. Fig. 68 shows substantially the form and construction of the transferrer. It is a short cylinder 750, closed at the top, which is provided with a knob-handle for convenience in use and with a central socket 751, which is of sufficient length to receive the top of the shaft 54$^c$, Fig. 59, over which it closely fits. When inverted over the top, the bottom of the socket rests on the shoulder of the shaft 54 or on the top of a distance-thimble 755, which is fitted to slip over the stud 54$^c$ and is used for the purpose of vertical adjustment of the quills of the transfer device in reference to the needles of the cylinder. When in position, the quills 752 come exactly over the needles of the cylinder, so that when by the operation hereinafter described the needles are successively raised they will enter the quills under the stitches, as seen in Fig. 67, and when they are drawn down the stitches will be transferred to the needles and the transfer device can then be removed.

To set the machine preparatory to starting it, the handle 557 is swung to the right, Figs. 3, 9, 20, 22, and 94, for the purpose of releasing all connections with the pattern-shaft 35 to 37, so that the same can be run down to its lowest position preparatory to commencing the knitting of the leg. Handle 557 is attached to the vertical rock-shaft 550, to which is also attached the arms 554, Figs. 3 and 20, and 553, Figs. 22 and 94. Arm 553 coacts with catch 68$^c$ of the oscillating detent-arm 68, and by throwing it into engagement therewith, as in Fig. 22, the opposite end 68$^b$, to which the spring 69 is attached, will impinge against the inside edge of pawl 66 upon the block 66$^b$ and in rear thereof and throw said pawl out of engagement with ratchet 30, so that shaft 35, to which ratchet 30 is attached, will then descend under the influence of the belt 29, which connects it with the driving-shaft. This belt is adjusted to slip in the groove 30$^a$, Fig. 25, of the ratchet 30 when the pawl 66 is in active engagement with the ratchet 20. The spring 69 is attached to the detent-arm 68$^b$ for the purpose of securing a yielding contact between that arm and pawl 66. This is necessary on account of the hooking shape of the teeth of ratchet 30, which might hold pawl 66 engaged at the moment arm 68$^b$ should disengage it from the ratchet if an unyielding contact between arm 68$^b$ and pawl 66 was relied upon. To the arm 554 the link 555 is attached. This link is slotted at one end, as shown in Fig. 20, and works in connection with a pin $p$, which projects from the upper side of the hook 286. This hook is journaled in a bearing 290, Fig. 94, and is of the shape seen in Fig. 96. It is fitted to hook onto a pin $a$ of the arm 270, Fig. 97, which is an appendage of the rock-shaft 245. Above the hook 286 the latch 287 is pivoted upon the same center. The latch and hook are connected by a retractile spring 288, and hook 286 is also connected by spring 289, Fig. 20, with the main frame, so that by its retraction the latch and hook are both normally drawn around toward shaft 245. When arm 270 is swung around so that its pin $a$ is out of engagement with hook 286, the latch 287 and hook 286 are prevented from turning too far toward shaft 245 by hook 286 bringing up against pin $a$ of arm 270, as shown in Fig. 20. Thus by the swing of the handle 557, as above noted, the connection 555 will push hook 286 out of engagement with pin $a$ on arm 270, thereby releasing rock-shaft 245 and leaving it free to be drawn around by springs 249, connected with arm 248 at or near its top, which operation sets all the parts of the machine ready for plain knitting except the pawl 66 and detent 68, and these are set by the last descending revolution of shaft 35, which carries the inclined plate 565 on arm 563, Fig. 22, around to the point where it catches the pin 68$^d$ and by pulling catch $e$ of arm 68$^c$ out of engagement with the catch-arm 553 releases spring 67, which by retraction instantly throws the pawl 66 and detent 68$^b$ into engagement with ratchet 30 ready for action.

*The starting devices.*—These consist of the hand-lever 196, Fig. 88, pivoted at 197 on bracket 121, having arm 198, which works under lug 193$^a$ of the drop-stop 193. (Seen in elevation in Fig. 90.) This drop-stop is a vertical slide having a wedge-shaped bottom end, (seen at 193$^c$.) It plays in vertical ways shown in plan in Fig. 9 and in horizontal section in Fig. 13. The wedge at the bottom is fitted to work in or between two jaws or cheek-pieces 180$^w$ 180$^w$, Fig. 91, of the stop-clamp 180. This stop-clamp is bolted rigidly to the clutch-shifter rod 170. The jaws are separated by an interval somewhat wider than the thickness of the wedge 193$^c$, to the end that when the wedge drops only one of its inclines shall impinge against one of the cheeks of the clamp at the same time and then barely disengage the driving from the driven member of the clutch. Near the bottom of the wedge is a lug 193$^b$, through which the spring-guide 195 plays. This spring-guide is set in a boss 20$^e$, on the under side of the table, and the drop-spring 194 is coiled around it. The office of this spring is to force the drop-stop 193 forcibly down into position, so as to ship the shifter-rod 170 with all the clutches far enough in one direction or the other to break their engagement, but not far enough to effect a new connection nor far enough to carry knuckle 185 over the apex of the bevel faces $f$ and $g$ of lever 186, Fig. 13; but said lever remains in such relation to the shifter-rod 170 that when spring 188 is again brought into action the same clutch engagement will be reëstablished that was broken by the fall of the stop-drop.

At the back of the machine the vertical rock-shaft 540 is located, which has bearings at top and bottom in the table and bracket 120, respectively. It carries at its top an arm 541, Fig. 88, which is termed a "stopping-arm," from the end of which extends the push-rod 199. This rod is supported at its front end in the stirrup 121$^a$, and its front end lies in the path of the starting-handle 196. Just below arm 541 and rigidly attached to shaft 540 is the drop-releasing arm 543, Figs. 9 and 88. This swings just above the top of bracket 120, and the end 543$^a$ coöperates with a projecting lug 193$^e$ of the drop-stop, so that when the arm is swung around into position the end 543$^a$ will come under the bottom of the lug, thus supporting it. The retractile spring 544 is attached to the studs 543$^b$ of the arm and 120$^d$ of the bracket and acts to keep the arm 543 drawn toward the drop-stop.

The action of the machine is such, as explained hereinafter, that at the completion of a stocking the operative parts all revert to their proper positions to commence a new one, and bush 123 is left in its position nearest the center of the machine.

The rock-shaft 540 is connected with the rock-shaft 550 by means of the socket-coupling 551. This piece is firmly attached to the top of the shaft 550 and its top is bored to receive the bottom end of shaft 540. An elongated transverse slot 551$^h$ is made through both sides, in which the pin 540$^g$ can have limited rotary play. This pin projects from the shaft 540, and such pin and slot are provided to permit movement of the rock-shaft 540, as is frequently necessary in stopping or starting the machine, without disturbing the set of the lower member of the coupled combination, the shaft 550.

To start the machine, pull the hand-lever 196 toward the front of the machine, whereby the drop-stop 193 will be lifted, so that the arm 543 can be drawn by the spring 544 under the bottom of the lug $e$ of the drop-stop 193, against which it stops. This leaves the shifter-rod 170 under the sole influence of the retractile spring 188, which is termed a "clutch-tightening" spring and is attached to a pin connected with the clutch-fork 190 at one end, and the other end is attached to the end of the clutch-tightening lever 186. This lever is hung at the point 187 and under the action of the spring 188 is free to swing thereon. It is provided with two bevel-faces $f$ and $g$, which work against the corresponding faces of the knuckle-stud 185 and under the tension of spring 188 will throw the shifting-rod 170 either to the right or left, according as the knuckle-stud bears against the bevel $g$ or $f$. Spring 188 acts not only to throw the clutch members into engagement, but also to exert a constant tightening force while they remain so engaged. In starting the machine it acts to engage driving-clutch 144 with driving-pulley 145, which meet and engage in advance of the engagement of clutch-cone 141 with 143 when the parts are in position for straight knitting.

*Main-thread-carrying devices.*—The appliances for handling the yarn are shown in Figs. 2, 4, 30, 31, 32, 33, and 34 and incidentally in other figures. Provision is made for handling two or more threads, if necessary. The spool-stand 600 at the back of the machine is furnished with four spool-plates 604, capable of carrying a like number of spools or bobbins of yarn. Ordinarily a double thread is used for knitting the leg and foot of the stocking, to which an extra thread is added for the heel and toe. When a double thread is used, the two spools are set on the left-hand plates, so as to give the thread the most favorable run to the needles. In describing the parts the threads used in knitting the leg and foot will be called the "main" thread and the other the "extra" thread. The main thread is taken from the spool up through the eye at the end of the arm directly over the top of the spool to one of the eyes 613 on bar 612, thence through the friction-clamp, as seen in Fig. 3, or not, as circumstances may dictate, to the tension device shown in side elevation in Fig. 32, in front elevation in Fig. 31, and in plan in Fig. 30. This friction-clamp consists of a piece of thin spring metal doubled upon itself and bent to the form shown, so that the two blades oppose each other, and provided with a small clamping-screw for adjusting the pressure. This tension device consists of the standard 635, erected on the table 330, and carries the tension-head 620. To the back of the head the pinch-spring 621 is attached, which has a cross-bar 621$^a$, adapted to bear against the head 620, and under which the thread runs. Above this the guard 619 prevents the thread from getting out from under the pinch-bar 621$^a$. The lower end of spring 621 is bent so as to bear against the hub of the take-up arm 629 when that arm is thrown back, and when it is thrown forward its upper end will strike the point of the spring and crowd it away from the head 620, so that the yarn can run freely under the head. The head 620 is fitted with a pivot-shaft which carries the take-up arm 629. This arm is made to produce a retracting action on the thread to take up the slack which is drawn through by that part of the revolution of the needle-cylinder which is performed after the needles have all had their feed of yarn in the process of fashioning, as will appear farther on. On the return motion of the cylinder this slackness of the yarn would be knit into the web, and thus leave loops on the inside, and possibly holes, were it not for this take-up. This retracting of the take-up arm is performed by the coil-spring 626, the tension of which may be increased or otherwise regulated by the tension-nut 625, to which one end of the tension-spring is fast, the other end being connected with the swinging arm 629. The tension is regulated by turning the nut, and its position can be secured by a set-screw 632, which bears against the hub of the nut. From the guide 629$^a$ of the take-up arm the thread passes to the large opening 648$^d$ of the guide-plate 648, thence through the hole 641$^a$, the shear-blade 641, and the guide-eyelet 702 to the needles, as shown in Fig. 30. The spring-catch 670, attached to the ball-roll guide 666, is for the purpose of retaining the thread whenever it is necessary to break it for any purpose whatever.

*Apparatus employed in plain knitting.*— By "plain knitting" is meant the knitting that part of the stocking between the rib at the top and the point where the heel is commenced and that part of the foot between the heel portion and the point where the knitting of the toe begins. This embraces the needle-cylinder, its bearing in the table, the needles, the means for holding them on the cylinder, the needle-race, the stitch-holders, the guard-ring, which prevents the holders from shedding the stitches by falling too far back, and the cams for controlling the action of the stitch-holders. The needle-cylinder is made in two sections 485 and 490. The lower section 485 is virtually a tube provided at its top with a broad circular horizontal flange which carries various parts connected with the fashioning apparatus. The tubular part is fitted to revolve in a flange-bush 482, which is accurately fitted to a bore in the center of the table and is held in place therein by the nut 483. The tube is reduced in diameter opposite the bottom of the bush to take on the hub of the bevel-gear 150, the upper end of which meets the lower end of the bush and forms a running joint therewith. The lower end of 485$^a$ extends far enough through the gear 150 to take on the cylinder-bowl 488, which, as well as the gear, is rigidly attached to section 485. The upper portion of section 485 is counterbored to take in the bottom of the upper section of the needle-cylinder 490. This section is provided with a flange 490$^a$, by means of which it is firmly screwed to the flange of the lower section. This upper section is longitudinally grooved around its entire circumference from the point 490$^h$, Fig. 59, to the top for the reception of the needles, and two more than half that number of grooves extend down through to the line 490$^k$ for the reception of the jacks which come into action in the fashioning process. The cylinder is circumferentially grooved, as shown in the partial section in Fig. 101 at $c$ and $d$, for the reception of the spring-bands 393 and 398, which bands retain the needles and jacks in the grooves. It is also reduced at the top to form a seat for the stitch-holder bed 385 and on the line 490$^{h\ h}$ to form a seat for the band 491, which retains the top ends of the jacks when in position.

Latch-needles of the form seen in Fig. 59 at 392 are used in this machine. The race in which their shanks run is shown in elevation in Fig. 64 at 391. The walls of this race are formed by the bottom edge of the draw-down ring 342 and the upper edge of the needle-raising cam 584. This cam is located at the back side of the cylinder directly under the yarn-guide 702, as seen in Fig. 30. During the process of plain knitting this cam remains elevated, but during the process of fashioning it is dropped, as shown in the dotted lines. Rings 341 and 342 are practically an integral structure and are fitted to slide vertically inside of the tubular part of the top plate 330. Outside of tube 331 the cam-slot ring 335 is adjusted so as to slide or rotate circumferentially a limited distance. It is fitted with two cam-slots 335$^w$, Figs. 37 and 38, in which the pins 340 slide. These pins pass through vertically-elongated slots 331$^s$ in the tubular part of plate 330 and are screwed into the ring 341. Rotation of the ring 335 will therefore raise or lower the draw-down ring 342. The means provided for rotating this ring consist of the draw-down handle 336, which projects from a crescent-shaped saddle or section of a hoop, which is fitted to the surface of the shifting ring 335. The ends of this crescent saddle are each perforated with an elongated slot 336$^c$, through which the set-screws 335$^s$ pass and are screwed into the ring 335. These slots and set-screws provide for circumferential adjustment of the handle on the ring. A pin 336$^h$ is fitted in the top edge of the saddle, as seen in Figs. 39, 64, and 66, which when the ring is turned back strikes another pin 330$^k$, which is connected with the plate 330. For the purpose of holding the two stopping-pins in contact the knuckle-spring 346 is provided, which is seated in a base 338 and under the knuckle of which the pin 336$^h$ passes when the handle 336 is thrown back. The function performed by the slot-and-screw adjustment between the saddle and the ring is to regulate the length of the stitches. By setting the saddle around nearer the front of the machine the ring 335 will be forced farther around before pin 336$^h$ strikes pin 330$^k$, and as a consequence cam-slot 335$^w$ will draw down plug 340, connected with the draw-down ring 341, farther than when the saddle is set farther back.

*Stitch-holding apparatus.*—The stitch-holding apparatus is fully shown in Figs. 5, 30, 59, 64, 67, 95, and 102, but principally in Figs. 5, 30, and 59. These devices form the subject-matter of United States Letters Patent to Frank Lasher, No. 478,613, dated July 12, 1892. It consists of the stitch-holder bed 385, which is a ring turned up in the form shown in cross-section in Fig. 67, slotted transversely, as seen in Fig. 95, and circumferentially grooved, as shown, to receive the fulcrum-ring 387, on which the stitch-holding blades are pivoted and across which they oscillate. This bed is fitted around the top of the cylinder and tightly driven down, so as to be permanent. The stitch-holders themselves are of the form seen in Fig. 67 at 390. They are punched out from thin steel and are adapted to fit in the slots *s s* of the bed and swing freely therein. The sides of the top part of each blade are milled away down to the curved line *x x*, Fig. 67. This is for the purpose of making room for the yarn which passes over their top edges and down under the hooks of the needles. The inner edge of the blade is notched, as shown at *w*, Fig. 67, to make a bearing on the pivot-ring. As many blades are provided as there are needles, and they vibrate in the slots *s s*, (seen in Fig. 95,) the upper part playing between the needles, as seen in Fig. 30. The top edge of the stitch-holder is notched, as shown at 390ª in Figs. 59, 67, and 102, thus forming a hook the office of which is just before the needles rise to force the web back inwardly and away from the needles, so that when the needles rise in the grooves they will not split the stitches nor puncture the fabric. The tops of the stitch-holders are surrounded by the ring 381, which prevents them from falling back when they have passed beyond the influence of the cams, which give them their oscillating movement.

The provisions for oscillating the stitch-holders consist of one or the other of the fixed cams 372 or 373 and the cam 377. (Seen in Figs. 30 and 102.) As the natural tendency of the fabric after it leaves the needles is to force the head of the stitch-holder back into the position seen in Fig. 59 and keep it there, some device becomes necessary to crowd the head over inwardly in the formation of the stitch. For this purpose the cam-plate 377 is provided, which operates in conjunction with two other cam-plates 372 and 373, the relative positions of which are seen in Figs. 5, 30, 59, and 102. The cam-plates 372 and 373 are attached to the upper side of boxes 374 (shown in section in the right-hand upper part of Fig. 59 and in plan in dotted lines in Fig. 30) in recessed seats provided therein to receive them, and each has a bolt or pin by which it is fastened in its seat, which passes through an elongated slot in box 374, by means of which slot and pin or bolt the proximity of the working edge of the cam to the stitch-holder shanks is regulated. The boxes 371 and 374 are provided with transverse slots which are concentric with the cylinder, which are provided to effect circumferential adjustment, through which and by means of the bolt 375 said boxes are fastened to the under side of plate 330. Said plates perform similar functions, except that one is a right-hand and the other is a left-hand plate. The one used in plain knitting is 372, the other being used only in fashioning. The top plate 377 is centrally located with reference to the needle-raising cam 584, Fig. 64, and is attached by screws to the upper side of the adjustable cam-block 378, Fig. 30. This cam-block has two elongated slots 378ᵉ, through which the bolts 378ᵈ pass, by which said cam-block is firmly seated on the upper side of the table 330. These slots and bolts afford means for adjusting the working edge of the cam 377 toward or from the stitch-holders. Its vertical position is opposite that part of the back edge of the stitch-holder marked *t* in Fig. 102, and it is permanenly attached to the plate 378, as seen in Figs. 30 and 102. Its inner edge is fitted to the shape seen in Fig. 30, having its central portion projecting inwardly, as shown, the middle part of the projecting edge being concentric with the needle-cylinder, except that the outside corners *a* and *c* project inwardly slightly farther than the middle portion. The parts marked *a* and *c* are beveled, as shown, for the back edge of the stitch-holders to impinge against as they are carried around by the needle-cylinder. The lower cam-plates 373 and 372 are placed to the right and left of the middle plate and occupy a plane opposite that part of the back edge of the stitch-holder opposite the letter *e*, as seen in Figs. 59 and 102. Their location and attachment are more clearly seen in Fig. 5. Each of these plates 372 and 373 is held in a socket 371 and 374, respectively, and when fixed project inwardly through the openings 334 of the tubular part 331 of the plate 330. As the cylinder advances the body of the stitch-holder impinges against the leading corner of the top cam at 377ª, whereby the head of the stitch-holder is forced inwardly, the hooks 390ª carrying the top edge of the knit fabric in with them. This occurs just prior to the shank of the needles entering the ascent in the cam-race, as shown in Fig. 64. While the needles are rising in the needle-race to receive the feed-thread the stitch-holders are held steadily against the inner edge of the cam-plate 377, but after passing it the tails *e e e* of the stitch-holders strike against the leading beveled corner of 372 of the bottom cam-plate and are thereby brought into an upright position, as shown in Fig. 59. This movement withdraws the hook 390ª out from engagement with the upper row of stitches and lets the last previously-formed row of stitches down onto that part of the top edge of the stitch-holder head inside of the hook *a*.

*Devices for changing speed.*—During the process of knitting the leg and foot of the stocking the machine is driven by the driving-pulley 145. From this through the parts before described motion is transmitted to the central shaft 54, which runs on a step-bearing 40. Near the bottom of the shaft the cam 55 is fixed, which actuates the elbow 43. (Shown in Fig. 23.) This elbow transmits motion in two directions—first, to the speed-shifting weight through the connection 70, 71, 72, 81, 90, and 100, and, secondly, to the pattern-shaft 37 through pawl 66 and ratchet 30. As the weight first comes into action, its connections will be first described. The elbow 43 is pivoted at 44 and is fitted with a swing-bar 48, which carries a friction-roll 49, against which the cam 55 works. This swing-bar is pivoted at 51 and its swinging movement toward the cam is limited by the stop-pin 43$^b$. Its movement in the opposite direction is regulated by the action of the spring 46, which is attached to the tailpiece 48$^a$ of the bar. Beneath the elbow is attached a bent lug, of which the form is seen in Figs. 23 and 26 marked 70. This lug is connected by the cross-connection 71 with the clawker-lever 72. The latter is pivoted on stud 73 and its back end is fitted with a pin 72$^b$, which works in the elongated slot 81$^c$ (shown in Fig. 24) of the clawker-slide. This slide is shown in plan and side elevation in Figs. 24 and 26. It is adapted to slide in a slide-bed 80 and at its outer end carries the clawker 82, which is equipped with a spring 84 for keeping it up to its work in contact with the speed-shifting ratchet 90. Between two cheeks 80$^c$ 80$^c$ the detent 85 is pivoted. The office of this detent is to prevent the lever 100 from crowding the ratchet around backwardly when the roll 93 is rising and carrying the weight of the lever 100 with it. The detent is provided with a hook 85$^a$, over which the other end of the spring 46 catches. Thus it will be seen that the spring 46 virtually performs three functions. It pulls lever 43 up against the cam 55, it throws the swing-bar 48 back against its stop-pin 43$^b$, and it holds the detent 85 up to its work against the ratchet 90. The speed-shifting ratchet 90 is fitted with a shaft which extends through the boss 97 of the standard 3, as shown in Fig. 23. The back end of this shaft is bored to receive a tension-screw 96. The tension consists of a leather washer 94 and a metallic washer 95, which fit over the back end of the ratchet-shaft and are adjusted by screwing up the set-screw 96, which draws the ratchet against its shoulder on boss 97 and binds the cushion-washer 94 sufficiently between the washer 95 and the back side of the standard 3. The object of this tension is to prevent lever 100, which is always in contact with roll 93, when ratchet 90 has made a half-revolution from the position shown by its weight causing the ratchet to over run and so carry gap 89 of ratchet 90 beyond its proper position to effect a change of speed when weight 105 drops. On the front of the ratchet is a roller 93, which as the ratchet revolves carries the end of the weight-raising lever 100 up with it. The weight-raising lever 100 is pivoted on the stud 104, which projects from the front of the standard 3. It is furnished with a spring-pin 98, the detail of which is given at Fig. 27, which is adjusted to impinge against the stop-lug 3$^s$. The tension of the spring 99, Fig. 27, is adjusted to counterbalance the weight of the lever 100, so that no weight of said lever shall rest on the roller 93 in the last part of its descending movement.

The speed-shifting weight 105 is of peculiar construction and has several attachments which perform various functions. It is hung on the back standard 3 on the pivot-stud 106, about which it oscillates. On its face it has a projecting lifting-lug 105$^a$, which overhangs the lever 100. This lug is so constructed that when the lever 100 raises it to the limit of its movement weight 105 will be carried to a vertical position, where the other end of lug 105$^a$ will rest on the top edge of lever 100 and the spring-pin 108 will engage the notch 263 of the tilting slide 264. When the weight stands in this position, the pin 111$^a$ of the arm 111 will stand on dead-center or in line with the centers 104 and 106, so that the double spring 113, which connects 111$^a$ with 104, can exert no influence to tilt the weight 105 in either direction. While the weight 105 is locked in its elevated position, the ratchet 90 will have revolved to a point where the missing tooth, shown at 89, will stand against the tooth of the clawker 82, which will thus become inoperative while it so remains.

All the last preceding matter relates to the means provided for setting the weight 105 preparatory to its being tilted over one way or the other to ship the driving-pulley out of or into action. This is accomplished by the action of the following devices.

At the back of the base 1 a bracket 23 is attached, of which a vertical section, taken on a plane perpendicular to the front of the machine, is shown in Fig. 25. This bracket supports the pattern-shaft, which carries the pattern-cylinders, various arms, and other devices for coöperating with other appliances of the machine, the details of which are described farther on, for throwing into and out of action at predetermined times and stages of manufacture various groups of devices for effecting various functions. The fashioning-ratchet 30 slides on the screw-shell at the top of the bracket and is prevented from lifting by the L-shaped hook 31, which is bolted to the bracket, and its lip takes into the annular groove cut in the hub of the ratchet 30 for that purpose, as shown. Thus it will be seen that the forward step-by-step action of the pawl-and-ratchet 66 and 30 will gradually elevate the pattern-shaft, so that the various arms and cams attached to it may successively be brought into use in connection with the several devices which they are designed to actuate or control, as desired.

To secure accuracy of operation of pawl 66 on the ratchet 30, its length may be adjusted by loosening the nut on the stud 61 and turning the same in its seat in slot 43$^a$, whereby the position of the eccentric stud 61$^a$, on which the pawl 66 is pivoted, will be changed. A detail of this stud is shown in Fig. 110. The stroke of pawl 66 is fixed by the position in the elongated slot 43$^a$ of the stud 61, which can be shifted for that purpose.

While clawker 82 continues inoperative on ratchet 90, central shaft 54 through cam 55 and its connections with the pattern-shaft will have elevated the same in its spiral path until the shipping-arm 562$^b$ encounters the friction-roll of the swinging arm 273, Fig. 21, which is adapted to swing freely on the vertical rock-shaft 245, which, however, in its inoperative or dormant condition is drawn outwardly or back by the retractile spring 276, which connects it with arm 277 on rock-shaft 245. Further rotation of the pattern-shaft forces arm 273 around until the bevel 273$^c$ strikes the short arm 324$^a$ of the lifting-elbow 324, Fig. 94. Another step brings ledge 273$^a$ against arm 324$^a$, thus raising the elbow, which carries the vertical tripping-rod 321 with it a short distance. Attached to this rod is the vertical lifting-pad 323, so adjusted that when the rod is elevated the pad will carry up with it the spring-pin 252. This pin and its connections are shown in detail in Figs. 20, 28, 29, and 94. It is fitted to work vertically in the end of the tripping-arm 250 in the following manner: Tripping-arm 250 is attached to the vertical rock-shaft 245 and has an enlargement at its free end which is horizontally slotted, as shown, to receive the slot-link 255, which is fitted to slide therein longitudinally. The pin 252 has a head considerably larger than the body of the pin itself, and the cheek of the arm 250 over the slot is bored to allow the head to pass through it. The slot-bar 255 is slotted nearly half its length, as seen in Fig. 28, and the end of the slot nearest the middle of the piece is counterbored half-way through its thickness to receive the bottom of the head of pin 252, in which it rests. Pin 252 protrudes far enough through the tripping-arm to take on an expansion coil-spring 252$^a$, which is held in its position by a small pin passing through the bottom of pin 252. This spring exerts its force to hold the pin 252 down in the counterbore of the slot-bar, and when in that position it locks the slot-bar and the tripping-arm in a fixed position, as seen in Fig. 20, and slide 264 back in its left-hand position. When the pin 252 is raised by the first stage in the elevation of the tripping-rod 321, so as to raise its head out of the counterbore, the retractile spring 268 comes into action. This spring is attached at one end to the front of the back standard and at the other end to the pin 268$^a$ on the back of the tilting slide 264, as seen in Figs. 20 and 26. This slide has a horizontal movement on suitable ways to the extent of the length of the slot 264$^a$. The slot-pin 267 is screwed into the center of the back standard and works in the slot 264$^a$. On the side of the back standard is attached a bracket 259, which supports the bell-crank 256. This bell-crank is connected at one end with the slot-link 255 and at the other with the tilting slide-link 260, the other end of which is attached to the tilting slide 264, whence it appears that when the pin 252 is raised far enough to lift the head out of the counterbore in the slot-link 255 no obstacle remains to spring 268 pulling slide 264 over to the right, thereby giving a forcible push to the weight 105 in the same direction. The moment this occurs the pin 111$^a$ is thrown off dead-center, thus leaving the double spring 113 free to act, and as a consequence its force is added to the gravity of the weight and it falls with great force to the right. As it strikes it makes two contacts—one of the lug 105$^a$ against the striking-facet 100$^a$ of the weight-lifting lever 100, which has the effect of imparting an impulse forward to the lifting-ratchet 90 through the roller 93, whereby the clawker 82 is enabled to catch onto the tooth next back of the gap 89 preparatory to making another revolution of the ratchet, and the other of the lug 105$^c$ against the top edge of the speed-shifting lever 115 at or near 115$^b$, whereby the same descends, carrying with it the shifting connection 207, which through arm 209, rock-shaft 208, arm 215, connection 218, bush-arm 124, bush 123 and its connection with the hub of the main driving-pulley the same are slipped along until clutch 141 engages the pulley 143, at which moment driver 145 is thrown out of engagement with the main driving-clutch 144 and ceases to act as a driver. Beneath lever 115, Figs. 26 and 94, is located the spring 118. This is attached to a projection 3$^a$ of the main standard and has its free end shaped or bent, as shown, to coöperate with the knuckle $a$ on the under side of the lever 115. The spring operates to prevent any recoil of the parts after weight 105 has fallen. With this new driving connection motion is maintained in the same direction until another revolution of the needle-cylinder is made, when face 273$^b$, impinging against arm 324$^a$, forces it along, so as to give arm 324 another lift, thereby carrying tripping-rod 321 up until its top comes under the back end of connection 314, Fig. 40, and lifts it, thus releasing its engagement and allowing the retractile spring 457 to act and throw cam 459 into the path of roll 465, which in passing over cam 459 effects the lifting of plate 400 with all its appurtenances. Further movement of arm 273 causes its facet 279 to bear on lug $a$ of arm 280, fast on shaft 245, and forces said shaft around against the traction of springs 249, attached to arm 248, thereby disengaging lugs $a$ $b$ on arm 246 from lugs 522 and 523, which movement through connection 179, Fig. 13, throws lug $w$ into the path of revolution of lug 489 of the needle-cylinder, Figs. 18 and 70, whereby through cam 174 and friction-rollers 172 172, which are carried on the shifter-rod 170, that rod and its reversing double cam-clutch 141 is thrown into action and the continuous rotary movement of the cylinder is converted into a reciprocating movement. By the same movement the wag-shafts are released and pin 252 in the end of arm 250 is moved to the inner end of slot 255$^a$, when spring 252$^a$ draws the head of the pin into a recess 255$^d$ and finally throws bar 305 inwardly till its pin 305$^a$ again engages notch 314$^b$ in link 314, whereby the fashioning devices are thrown into action, at which stage of procedure the plain knitting ceases and a new line of operations is set up. The impact of lug 105$^a$ of the speed-shifting weight 105 in either direction against facets $a$ or $b$ of lever 100 is productive of the same result—i. e., it sets ratchet 90 in rotation by the means above described, which rotation continues until roller 93 has carried lever 100 to its highest elevation, at which stage the weight 105 will have been carried into a vertical position and locked by means of the spring-plug 108, engaging one or the other of the notches 262 or 263 of slide 264, so that the normal idle position of the weight is the upright position. The rock-shaft 208 remains in whichever position it may be left by the tripping of weight 105 until a subsequent tripping reverses the position. The office of spring 222 is, in a measure, to counterbalance the weight of arm 209 and rod 207.

As before stated, the first engagement of clutch 144 with pulley 145 was established by the action of spring 188 crowding the bevel 186 against the knuckle 185, so as to crowd the shifting rod 170, carrying the driving-clutch 144, into engagement with pulley 145. Further movement in the same direction was arrested by the pin 138 in the cam-slot 123$^a$ of the pulley-shifting bush 123; but by the rotation of the bush, as above described, the pulley 145 is slipped along on the shaft in the direction of disengagement with clutch 144, and at the same time under the influence of spring 188, acting through bevel-face 186, knuckle 185, and shifting rod 170, it is forced along in the same direction until the double clutch-cone 141 engages the pulley 143. At this point further movement of the shifting rod is checked, and the further rotation of bush 123 draws the pulley 145 off from cone 144, thus breaking their connection and leaving the main driving-shaft free to be driven by the pulley 143. The parts are so constructed that this distance is very small, and the strength of the spring 188 is abundant to effect this result. From this point the process of fashioning the heel commences.

*Heel-fashioning process.*—Preliminary to entering upon a description of the various details of the apparatus which come into play in fashioning the heel and toe of a stocking the fact should be impressed on the attention of the operator that, with the exception of the driving-gears, the needles, the grooves in which they slide, the stitch-holding devices, and the thread-guide 702, an entirely new combination of devices is brought into action by the forward rotation of the rock-shaft 245, which carries several attachments, notably the arm 246, which throws in the extra thread for knitting the heel and toe and also releases the rock-shafts, which act to throw the pin-slides toward the pattern-wheel, sets the slide, which locks the weight in its vertical position, and by its reverse action throws the same parts out of action, and, further, carries the connection which controls the oscillation of the needle-cylinder.

*Apparatus for handling the extra thread.*—In forming the heels and toes of stockings it is desirable to knit them with a firmer and heavier thread to provide against the excessive wear to which they are subjected than is used in the body of the garment, and therefore either a coarser single thread or a double thread is employed. This is taken from a bobbin in the rear and to the right of the machine, as seen in Fig. 3, whence it is taken up through the guide-eyes 609, 613, and 613$^a$, through the take-up ring 630, Fig. 4, to the slot-guide 648$^c$, Fig. 35, to the pincer-jaws 662, where it is grasped and held while the plain knitting is progressing.

As the needle-cylinder has a reciprocating movement in knitting the heel and toe, it becomes necessary to provide a take-up for the feed-thread. For this purpose the stand 620$^n$ is provided, which is practically a duplicate of the stand 620 before described. This stand is fastened to the top of the upper table 330, as shown in Figs. 30 and 31, and is fitted with a take-up arm 629$^n$, which is actuated by a coil-spring 626$^n$. The force of this spring is exerted so as to throw the ring 630 backwardly or in the direction of the arrow seen in Fig. 30.

The yarn in passing from the previously-described devices to the needles is carried through the guide-bush 702. This bush is slotted through its top, so that the thread can be lifted out or dropped in at will. It is mounted in a swinging arm 701, which is attached to the handle 703. This handle turns on a stud 704, which is screwed into the top of the table. The spring 706 is connected with this handle and is adjusted to act upon the pin 330$^a$, so that when the knuckle of the spring is on one side of the pin the bush will be held in its proper position to carry the thread to the needles, and when in the other position it will hold the bush back into the position shown in the dotted lines in Fig. 30. The object of this swinging movement is to get the arm and bush out of the way when a rib or top is being transferred to the needles. The arm is held in its normal working position against the stop-pin 330$^c$.

The following devices are provided for holding the extra thread during the process of knitting the foot and leg, delivering it to the needles at the commencement of the knitting of the heel and toe, cutting it at the completion of the heel or toe, and seizing the end of the extra thread and holding it ready for a repetition of the process.

A small hub or bracket 680 is attached to the edge of the top plate 330 on the left-hand side of the machine, Figs. 4 and 38, which is bored to receive the pivot-stud 676. To the top of this stud the thread-carrying arm 660 is pivoted by a joint, which permits it to swing in a vertical plane, so that the two make a universal joint, which permits movement of the thread-carrying arm in a direction both vertical and also toward the center of the needle-cylinder. This arm passes through two balls 665, one of which is carried in the top end of the lever 685, by which the arm is thrown, and the other is fitted to move in the ball-guide 667. At the end of arm 660 the pincer-head 662 is attached, which consists of two steel blades of the form seen in Figs. 31 and 32. They are of spring temper and bowed out in their middle part, as shown, so as to disengage the pincer-opener 649 after it has done its duty in opening the fingers preparatory to seizing the thread. The guide 667, in which the ball 665 runs, is of a form, as shown, to cause the arm at the initial part of its movement to rise vertically. As it does so it carries up with it the pincer-opener 649, which is adapted to turn freely on the pivot-stud 651, and thus the grip of the pincer-fingers on the thread is not released. The pivot-stud 651 is connected with the shear-stand 640, which is firmly bolted to the top plate of the machine. To the back side of this stand the thread-guide plate 648 is attached, which is fully shown in Figs. 32 and 35. It has two eyes 648$^d$ for the main thread and 648$^e$ for the extra thread. Both of these have slots opening to them from the edge of the plate, and the upper one is provided with an inside guard 648$^e$, Fig. 30, which prevents the thread from escaping from its proper course. On the front side of the shear-stand the stationary shear-blade 641 is attached. This is perforated with a large hole 641$^a$ for the main thread. To this blade the acting shear-blade 642 is pivoted, so that the vertical edges when open shall stand one on either side of the path of the extra thread as it passes to the needles. The swinging shear-blade has a lug 642$^a$, projecting from its outer edge, which works in the forked end of the shearing-elbow 645, as seen in Fig. 34. This elbow is pivoted to the side of the shear-stand by the bolt 646, which bolt also serves to carry the double-ended coil-spring 647. One end of this spring is connected with the upright part of the shearing-elbow and the other is attached to the stand 640. Its force is normally exerted to open the shear-blades. When the arm 660 makes its back throw, it strikes the top part of the elbow 645 and by forcing it backwardly causes the fork and lug 642$^a$ to be raised, thus bringing the cutting edges of the shear-blades together, so as to engage the extra thread which lies in their jaws the same moment it is grasped by the pincer-fingers. While the plain knitting is going on, the end of the extra thread is at rest, grasped between the pinching-fingers 662. When the fashioning commences, the arm 660 lifts in the guide 667 and, swinging toward the front of the machine, carries along with it the extra thread and lays it exactly in the gap of bush-eye 702 and between the cutting edges of the shears, which have been opened under the action of spring 647 for that purpose. The arm 660 then rests in the front depression of the ball-guide 667, the extra or splicing thread being drawn out of the grasp of the pincer-fingers by the traction of the knitting process and remains in such position until the fashioning process is completed, when it is thrown back by the same lever by which it was thrown forward, and as it approaches the rear limit of the back throw and begins to descend the spreading lips of the pincer-fingers meet the top edge of the pincer-opener 649, and as they continue to descend they are forced apart, and the extra thread lying directly beneath the gap thus made further depression of them brings the thread fairly between their jaws, so that when they have dropped out of the reach of the opener they spring together and seize the thread between them and hold it there until the time comes for a repetition of the same process. The same backwardly-descending movement of the arm 660 effects the seizure of the thread and also causes the back throw of the top part of the shearing-elbow 645 almost simultaneously to cut the extra thread, the seizure, however, very slightly anticipating the cutting.

The forward movement of the thread-carrying arm 660 is effected as follows: After the swinging arm 273 has been forced around until the facet 279 engages the ledge 280$^a$ on the arm 280 further swing produces rotation of the shaft 245, to which the main arm 246 is rigidly attached. (See Figs. 20 and 21.) This rotation commences one revolution after the tilting latch 305 and the latch connection 314 have been disconnected by the elevation of the rod 321, as hereinbefore described, and the arm 246 is ready to be swung toward the front of the machine. The rotation of the shaft 245 swings arm 246 toward the front, and the bottom of lever 695 is carried with it. The lever 695 is pivoted to the frame of the machine, as seen in Fig. 2, and is forked at its bottom end to work on a pivot-center in the rear end of connection 305, as seen in Fig. 40. It connects at its top end with the connection 690, which is attached to the oscillating lever 685. Lever 685 is pivoted to a stud, which is attached to the under side of the top plate 330. Its upper end is slotted, as shown in Figs. 33 and 38, for the ball-bearing 665, which slides on the arm 660. Thus the forward movement of the arm 246 effects a corresponding movement of the arm 660 through the last-described agencies. The arm 660 remains stationary, with the pincers overhanging the needle-cylinder, until the fashioning process has been completed, when the rock-shaft 245, being released by means hereinafter described, is by the retraction of the springs 249, which connect the arm 248 with the bracket 120, drawn around, so as to restore arm 246 to its former position, which movement at the same time and by the means described carries the thread-carrying arm 660 back to its normal position, where the pincers grasp the extra thread at the moment it is cut off, as before described.

*Pattern-shaft and attachments.*—The pattern-shaft, together with its various appurtenances and attachments, including the means for driving it, of imparting to it its vertical motion, of adjusting upon it the several arms which coact with the arms of the tripping-shaft and the main rock-shaft, the pattern-wheel, its construction and adjustment, and the means provided for running it back to its starting-point after the completion of the stocking, is shown in Figs. 2, 3, 9, 13, 20, 21, 22, 23, 25, 70, 71, 72, and 73.

Referring to Figs. 2 and 25, the leading features of the pattern-shaft can be made out. It consists of two sections, the upper or 37 and the hollow screw-shell portion 35. These parts are joined in about the middle of the shaft, the solid part being tightly fitted to the shell. The construction of the shell is seen in partial cross-section in Fig. 25. This shell is fitted to run on the screw-stud 26, which is seated in a chamber in the bracket 23. This bracket is attached to the back side of the base of the machine, as seen in the front and side elevations, and is fitted with a chamber, in the bottom of which the elevating screw-stud 26 is fitted and held by the bolt 28. The upper part of the bracket is counterbored to receive the hub of the driving-ratchet 30. The under side of this ratchet has a grooved pulley $30^a$, which carries the band 29, by which the same is driven from the similarly-grooved hub of pulley $143^g$, Fig. 10. The hub of this ratchet has an annular groove coincident with the upper surface of the bracket which receives the flange of the retaining-clip 31, which in turn is attached to the bracket by the bolt 32. The upward rotary movement of the pattern-shaft is effected by the ratchet 30 and the reverse motion by the band 29 driven by the pulley 143.

The screw-shell 35 is externally threaded, as seen at $35^s$, as a provision for facilitating the vertical adjustment of the arms $561^a$, $561^b$, $562^a$, $562^b$, and 563. This is effected by means of guide-screws $a'$ and $b'$, (shown in Figs. 20 and 21,) which are screwed into the hubs of the said arms and, passing through the same, the points enter the spiral groove or thread $35^s$. The adjustment is effected by loosening the clamping-bolt on the back side of each arm which clamps the two halves or cheeks of the hub about the screw-shell, and then turning the arm about the shell the points of the guide-screw will follow the threaded groove $s$, by which means the striking part of the arm will always be kept in its proper path to engage whatever part it is designed to coöperate with. The lower end of this shell is internally threaded for a limited portion of its length, as seen in the figure, so as to constitute a nut, which runs on the screw-stud 26. Thus rotation of the shell produces vertical movement of the shaft. The lower end of the shell is also longitudinally splined, as shown at $33^a$, for the reception of the feather 33, which is rigidly seated in the hub of the driving-ratchet 30. By these means the shell can be rotated by the ratchet and at the same time have a vertical movement over the feather.

Just above the union of the shell and the solid part of the pattern-shaft the pattern-wheel is located. The construction of this wheel is fully shown in Figs. 70, 71, 73, and 72. Practically it consists of two sections of a cylinder 530 and 532, the interior adjacent ends of which are finished on a helical line, the pitch of which agrees with the pitch of the screw-stud 26. The lower part of the hub of the upper section is provided with a screw-thread $530^c$, cut to the same pitch as the other screws mentioned, over which the hub of the lower section passes. Within the hub of the lower section a key 533 is fitted, which runs in the screw-thread $530^c$ and is held in position after adjustment by the set-screw 537. The design of the latter adjustment is to regulate the length of the interval between the finish of the heel and the beginning of the toe. The two sections are drilled with a helical row of holes for the reception of long and short pattern-pins 538 and 539, which coöperate with the pin-slides 226 and 229, as seen in Fig. 93, as will be more particularly described farther on.

Above the pattern-wheel is the arm 534, which carries the stop-lug 535. The lug 535 is adapted to engage the facet $552^a$ on the arm 552, as shown in Figs. 2 and 9. This engagement throws the driving-pulleys out of action and stops the machine at the completion of a stocking. Whenever the pattern-cylinder is changed or readjusted for a new style of goods, it becomes necessary to readjust the position of the stop-lug 535, so that it will engage the arm 552 at the proper time to stop the machine when the stocking is finished. To effect this object, the upper edge of the upper section of the pattern-cylinder is graduated into a number of equal intervals by the notches $530^a$, &c., which number is an aliquot part of the whole number of pins in the circumference of the pattern-cylinder. The arm 534 has an arc $534^b$, the under edge of which rides on the top edge of the upper section 530 and is flush therewith. The length of the intervals into which the under edge of this arc is divided should represent one pin on the pattern-wheel more or less than the intervals between the notches on the upper edge of the pattern-cylinder. Thus if there are eighty pins or holes in the whole circumference of the pattern-wheel and twenty notches in its upper edge each interval would correspond to four holes in the circumference of the pattern-wheel. Therefore the arc 534 should have its notches $534^b$ spaced to correspond either to intervals representing one hole more or one hole less than the number of holes represented by an interval between the notches in the upper edge of the pattern-wheel. This arrangement is on the principle of the vernier used on engineering instruments, and with very few parts enables one to get a large number of adjustments. In this case the pattern-wheel is graduated to sixty divisions, the top edge of the cylinder to twenty, and the arc to thirty, so that it is possible to get sixty adjustments. The arc and cylinder are held in adjustment by means of the key 536, which is fitted to be inserted in the gap which is formed when two opposite notches are brought into conjunction, as seen in Fig. 72. These parts are adjusted as follows: When the pattern-wheel has been set, the clamp-screw 534$^c$ is loosened, which allows the arm 534 to be slipped up or down on the shaft 37 or to be turned thereon. Then it is adjusted so that the stop-pin 535 will be in the right position to strike the facet 552$^a$ at the right moment to stop the machine. The key in then inserted, the arm slipped down, so that the two edges of the arc and cylinder shall be in contact, and the clamp-screw 534$^c$ is then tightened up. After this the pin 535 is raised or lowered, so that it will be at the right height to strike the facet 552$^a$ when the cylinder has attained its proper elevation after the completion of the toe of the stocking.

During the process of fashioning the stocking the shaft 550 stands so that the catch-arm 553 is out of engagement with the hook on the end of the arm 68$^c$; but when the pin 535 by striking lever 552 throws the arm 551 around it causes the catch-arm 553 to strike the hook end of arm 68$^c$ and crowd the same inwardly, so as to throw the detent 68$^b$ out of engagement with the ratchet 30, and the block 68$^b$ on pawl 66 by impinging against the end of the detent-arm on its back stroke causes said pawl to be thrown out of engagement with ratchet 30. In this position the pawl and detent are held locked, as shown in Fig. 22, while the pattern-shaft has been run down by the belt 29 until in its spiral descent the plate 565 on the end of the arm 563 in its last revolution sweeps around and gathering the pin 68$^d$ in its course draws the same inwardly and thus detaches the catch-arm 553 from engagement with the hook of the detent 68, whereupon spring 544 retracts and by drawing the arm 543 around causes the shaft 550 to be rotated in the direction to carry arm 553 into the proper position to commence a new stocking. The arm 563, with its plate 565, runs on past its engagement with pin 68$^d$, Fig. 22, and releasing that pin allows detent 68 and pawl 66 to assume their operative positions, when they, engaging the teeth of ratchet 30, stop its further revolution. It will then be found that pin 68$^d$ will be outside the path of revolution of plate 565 on arm 563, which thus clears it on its next upward movement.

*The reciprocating apparatus.*—In the formation of the heel and toe of the stocking the widening and narrowing are effected by reciprocating the needle-cylinder a revolution more or less for each course of stitches. This is accomplished by throwing the shifter-rod 170 back and forth by means presently described, whereby the double friction-cone 141 is alternately thrown into and out of engagement with the oppositely-running pulleys 140 and 143. By reference to Figs. 9, 13, 14, 15, 16, 17, and 18 the devices to effect these results may be seen. In Figs. 17 and 18 a portion of the bottom part of the needle-cylinder is shown, from which depends the oscillating lug 489. When the machine is running on plain knitting, the revolution of this lug is unobstructed; but when the straight knitting is completed and the rotation of rock-shaft 245 has thrown into action the heel-forming devices the arm 246, Fig. 13, forces the reversing-slide 175 toward the central shaft 54 and into the path of revolution of the lug 489 by means of the connection 179. The slide 175 is shown in front, side, back, and sectional elevations in Figs. 15, 16, 17, and 18. It consists of an arc grooved on its upper side, as at $c$, to receive the pin 179$^a$, which is connected with the bar 179. It moves with the sliding piece 175$^a$, which is fitted to slide in ways provided therefor in the top of the oscillating cam 174. (Shown in Fig. 15.) On the upper side of the slide is a raised projection or lug 175$^w$, which is adapted to engage with the oscillating lug 489 whenever the slide is thrown forward into its path by the arm 246. In Fig. 13 the position of lug 489 is shown in section. In practice the arm 246 acts to throw the slide 175 into the path of lug 489 when shaft 54 is at a point of its revolution which will bring lug 489 on the left side of the axis of said shaft when running in the direction for straight knitting, so that its further advance will bring it around into engagement with one corner of the projection 175$^w$ of slide 175. When such contact is effected, the cam 174 is forced around until the corner $a$ impinges against one of the friction-rolls 172 on the shifting rod 170, thus forcing the double-cone clutch 141 into engagement with that driving-pulley that will reverse the motion of the needle-cylinder. Thus the oscillation of the cam 174 is kept up until the rock-shaft 245 swings the arm 246 back, so as to withdraw the reversing-slide 175 back out of the path of the lug 489, at which moment the continuous knitting will be resumed. It is evident that after the cessation of the reciprocation of the needle-cylinder it is essential that the slideways of the cam 174 should be brought to rest in a position parallel with the axis of motion of the slide connection 179, so that no resistance will be offered to the next thrust of the arm 246.

*The straddlers.*—For this purpose the devices shown in Figs. 14, 15, 16, 17, and 18 are brought into action. They consist of two similar bars 176, termed "straddlers," which are each constructed with an arc at its rear end, which is adapted to fit and turn in an annular groove in the bottom of the sleeve-hub of 174, as seen in cross-section in Fig. 15. Their shape is shown in plan in Fig. 14, and they are counterparts of each other and when in position are connected by two retractile coil-springs 177, which take onto pins which pass through each piece, as shown. The free ends of the straddlers find bearing against a projection of the bracket 178, which is attached to the front side of the main standard and at its top carries a bearing through which the slide 179 plays. From the under side of the swinging or oscillating slide-piece 174 depends a pin 174$^a$, which reaches down between the straddlers. When the oscillating slide 174 swings either to the right or left, the pin 174$^a$ carries one or the other of the straddlers with it, and this action stretches the springs 177, and when the return swing is made the springs by their contraction draw the straddler back into its original position, so that its free end will bear against the bottom of the bracket 178. Oscillation of the slide in the opposite direction will produce a counterpart of the same movements in a similar way. When the slide is thrown out of action entirely, so that the needle-cylinder can resume its continuous knitting at the moment of reversal, the springs 177, being stretched to their utmost, exert their greatest force in a direction to draw each straddler around so that its free end will stop against the bracket 178. This puts the slide-ways of 174 in line with the line of movement of the connection 179.

*Devices for throwing out of action the mechanism which actuates the needles in plain knitting.*—When the plain knitting is progressing normally, the needle-raising cam 584, Fig. 64, is maintained in the position shown by the following-described means: Cam 584 is attached to a slide 583, which has a vertical movement in ways provided therefor in an opening in the cylinder 331. Lever 580 is pivoted on one of the columns 328, as seen in Fig. 39, and carries at its free end the stud 587, which projects from both sides of the lever, its inner projection connecting with slide 583, and appears in Figs. 38 and 39. On this stud revolves the cam-raising friction-roll 582. Attached to the under side of the plate 330 is the bracket-bearing 585, which affords guides for the shift-rod 586. This shift-rod carries rigidly attached to it the roll-fork 590 and the swinging unhooking-lever 589. It is moved in and out of position by means of the shifting lever 595, Figs. 5 and 38, and has a slot in which a pin that projects from said rod works. The free end of lever 595 is carried between the lugs $a$ and $b$ of connection 690, which has its reciprocating movement imparted to it from the oscillation of rock-shaft 245 through arm 246 and connection 305, as shown in Fig. 13. The fork takes into a circular groove in the hub of the roller 582 and by its hub is so connected with the unhooking-lever 589 that both will be simultaneously shipped as the work requires. The lever 589 has a pin 589$^a$, Fig. 86, which when the parts are assembled works in the hole $b$ of 588 by slipping back and forth through the same. In a slot in the rear part of the bracket 585 the suspender-catch 588 is pivoted on the shift-rod 586. The form of this catch is seen in Fig. 85. It has a notch 588$^c$ cut in its inner edge at such an elevation that when the stud 587 is elevated and 588 is swung under it it catches the end of lever 580, and the needle-raising cam 584 (with which the stud is connected) will be supported at its proper elevation to carry on the plain knitting properly. The hub of the cam-raising lever 580 has a pin 580$^a$, from which a retractile spring 591 is stretched to and connects with a hole 588$^d$ in the suspender-catch 588, and by this means the catch is prevented from swinging out of engagement with the lever 580 while the plain knitting is progressing. The cam 584 is raised and locked by the cam 411 passing under roll 582 and lifting it to a point where the spring 591 will draw the catch 588$^c$ under the end of lever 580. It is dropped by shipping the swinging lever 589 into the path of cam 411, which trips it and lets the stud fall, and as arm 580 descends its end, by crowding against the inclined edge of the catch 588, forces the same to one side, whereby the end of the unhooking-lever 589 is swung up out of the path of cam 411 as it passes around. The unhooking-arm and the holding-catch are connected by a pin fast in one and passing freely through a hole in the other.

The fashioning devices are thrown into action by the following means: By reference to Fig. 13 it will appear that the arm 246 has two stops $b$ and $a$, against which the lugs 522 and 523 on the wag-shafts 512 and 511 respectively strike when the arm 246 is swung around into their path, as seen in the figure. This combination of stops and lugs serves to hold all the fashioning apparatus in check during the straight or plain knitting, but the moment the rock-shaft 245 is turned by the means before described and swings around toward the standard 3 the wag-shafts are then both released and from that moment fall under the action of the springs 520, Fig. 70, lever 232, and the pins on the pattern-wheel 530. At the termination of the fashioning process the arm 246 is released by means hereinafter described, and under the influence of the retractile springs 249 is thrown around, so as to bring the stops 246$^b$ and 246$^a$ into position between lugs 522 and 523, thereby locking the fashioning devices in a dormant position.

*Of the fashioning-jacks and their uses.*—By reference to Fig. 59 it appears that the needle-cylinder is provided with two lengths of needle-grooves. Those on the right side of the figure are cut down only to the line 490$^h$, and of these there are two less than half of the whole number of needles. The remaining grooves are cut down through to the shoulder 490$^k$. A slight groove is cut on the cylinder at the line 490ʰ and the band 491 is fitted around the cylinder to rest therein. The top edge of this band forms a support for the bottoms of the needles to rest on in their descent, and it also forms a retaining-guide to hold in position the tops of the lifting-jacks. Referring to Fig. 36, which is a plan view of a section taken on the line Y* Y* of Fig. 59, the jacks 395, 396, and 397 appear in their respective positions. The jacks filling the grooves on the left-hand side of the cylinder (designated 397) are all of the form shown in Fig. 98, while all those on the right-hand side are of the form seen in Fig. 99. The outside jacket in the series on either hand is of the form shown in Fig. 100. All of the jacks are provided with race-stems 395ᵃ, 396ᵃ, and 397ᵃ, which run in the race which is made up of combinations of the parts 364, 365, 366, 367, 368, and 369. (Shown in Fig. 64.) Jacks 396 and 397 are each provided with a lifting-stem, (marked, respectively, 396ᶜ and 397ᵇ.) All are provided with a supporting-shoulder $d$ and with a minor supporting-ledge just beneath (marked $e$) on each of the detailed drawings of the jacks. These coöperate with the spring-band 398, Fig. 59, which acts to sustain the jacks in an elevated position whenever they are raised, so that the ledge $e$ comes above the band 398. When the jacks are out of action, their race-stems run under the bottoms of the cam 364 and the sliding cams 365 and 368, but when they are elevated for fashioning purposes (by means hereinafter described) the race-stems stand at an elevation to run on top of the jack-raising cam 364, which cam effects their upward movement, while the initial step of their depression is effected by means of cam 367 and the final step by means of one or the other of the sliding cams 365 or 368, according to which way the cylinder is running. The outside jacks 395 are brought into operation only once in the process of knitting a heel or toe of a stocking. This occurs after the back part of the heel has been formed by narrowing and before the widening to form the sole part of the heel has been commenced. Referring to Fig. 36, the right-hand jack 395 is first raised after the narrowing is completed. The next movement of the cylinder is with the sun, and at the completion of this movement both outside jacks 395 are raised. At the termination of the ensuing oscillation, which is the normal forward movement, the right-hand jack 395 is dropped out of action, and on the following reverse oscillation the left-hand jack 395 is dropped out of action. The regular widening to form the sole of the heel now proceeds. Thus a diagonal course of stitches is run in extending from the apex of the heel around to the ankle on one side, thence back to the apex and around to the ankle on the other side, and back to the starting-point at the apex. In doing this the outside jacks are raised once only. This is for the purpose of rendering the diagonal seam more elastic, and also for the additional purpose of more perfectly taking up the stitches of the heel along such diagonal line and casting them off before the sole part of the heel is knit. This method of knitting the heel possesses an advantage, closing up and obscuring small holes along the line of the seam, which otherwise would be formed and left in the finished goods and which detract from the strength and appearance of the finished stocking. The additional jack at either end of this diagonal course also carries such course up a little farther over the instep, thus rendering the heel still more elastic than it otherwise would be. The toe is knit in the same way and possesses the same advantages in these respects.

*Jack-slides and switch devices for working the same.*—The top plate 330, Fig. 64, is rigidly attached to the columns 328 and 329 and has the cylindrical portion 331 depending from its under side. On the interior of this tubular part the annular groove 331ⁿ is cut, in which is fitted the back ring 360, by means of the annular tongue 360ᵗ. This ring is permanently fixed in position and has attached to the central part the two V-shaped cam-faces 364 and 367, which constitute the two opposite walls of the jack-race, through which the race-stems of the jacks pass in the knitting process. The back ring 360 is vertically slotted, as shown at 360ʰ 360ʰ 360ʰ 360ʰ in Fig. 65, to form ways for the two jack-slides 365 and 368, which play vertically therein. The two pieces 366 and 369 form the outside guides for the slides. The slides are held in place and connected with their actuating members by the screws 362 and 363, which are firmly screwed into the back sides of the slides and have vertical play in oblong slots provided for them in the ring 360 and in the tube 331. The tube 331 is provided with an external annular groove 331ᵐ for the reception of the tongue 350ʷ on the interior of the switch-ring 350. This ring is fully shown in side view in Fig. 38, in back view in Fig. 39, and in horizontal section in Fig. 65. It is perforated with two opposing inclined slots 350ᵉ, in which the slide-pins 362 and 363 work. This switch-ring has a limited rotary reciprocating movement upon the tongue 350ʷ, and by means of the inclined slots working on pins 362 and 363 effects the elevation or depression of the jack-slides, one rising as the other falls. This reciprocation is accomplished by means of the vertical-shifting lugs 353 and 354, the details of which are shown in Figs. 82, 83, 84, and 87. These slides play vertically inside the guides 355, which are screwed to the exterior of the switch-ring, one on either side. A seat for the guide is provided on the switch-ring by milling away a flat place, and the same is attached by screws. The lugs 353 and 354 are counterparts of each other, except that they are rights and lefts. Their shape is seen in Fig. 84. Each consists of a plain flat piece of metal beveled at its lower end, as shown, so that on the back stroke of the switch-ring the lug can freely ride over the top of the driver 359, Fig. 38, which coöperates with it. On its inside it also has a cam-ledge $a$, Fig. 82, which is provided to coöperate with the plates 358, which are attached to the under side of the tubular section 331, as seen in inverted view in Fig. 87. In the process of reciprocation of the needle-cylinder in fashioning the driver 359 engages either of the lugs 353 or 354 and forces the switch-ring around, so that the leading end of the ledge 353$^a$ runs up onto the upper side of the plate 358 and leaves it there, while the driver passes under it and completes the remainder of its stroke. On its reverse reciprocation the top of driver 359 engages the beveled under end of the lug and simply lifts it without moving the switch-ring, after which it passes around and positively engages the other lug and turns the switch-ring sufficiently to carry the first lug off its support on plate 358, when it drops to the position it occupied before the action just described. The lug is drawn and held down by spring 357, which connects pin 353$^g$ with the stationary pin 355$^h$ on the guide 355. The driver 359 is attached to the top of the flange of the lower section of the needle-cylinder 485 and of course oscillates therewith.

The working position of the jack-slide is when it is at its depressed position, as shown at 365 in Fig. 64. It is maintained in this exact position by the terminals of the inclined slots 350$^c$, which are constructed in a horizontal plane, so that a slight movement of the switch-ring more or less to the right or left side of the proper stopping-point will not change the elevation of the slide, from all which it will be seen that when the race-stems of the jacks in their advancing course impinge against the incline of cam 364 they rise and the needles are raised, and when the stems impinge against the draw-down cam 367 they are drawn down and run under 365, thus completing their descent, when the shoulder $d$ of the jack rests on the top of the spring-band 398 ready for the next manipulation. This leaves the race-stems of the jacks on a plane just below the bottom of the raising-cam 364, so that they will pass freely under it when the cylinder is revolved. Switch-ring 350 is held in position on the cylinder and up to its work by means of a brake-pad 351, which consists of a piece of stiff spring metal fitted with two leather shoes to bear against the outside of the switch-ring, one of which is seen at 351$^a$ in Fig. 38 and is screwed to a small bracket which projects from the under edge of the tubular part 331 of the top plate 330.

*Means for elevating the jacks and supporting them.*—By referring to Figs. 36, 37, 38, 39, 40, 41, 42, 59, 60, 61, 62, and 63 the apparatus for raising the jacks from their dormant to their working positions can be seen. Fig. 59 shows the needle-cylinder in longitudinal section and discloses the shape and relative position of the lower section 485. This section has a broad flange at its top, which may be termed a "gallery," as it carries a number of devices connected with the jack raising and fashioning apparatus, much of which will be described farther on. Only such parts will be here alluded to as relate to the raising and lowering of the jacks. This gallery, which revolves with and as a part of the needle-cylinder, carries on its upper surface two hollow standards 450, in which the two plunger-slides 451 play, Fig. 62. These plunger-slides are attached to the under side of the lifting-plate 400, the form of which can be seen in inverted plan in Fig. 7 by means of the screws 452, Fig. 62. This lifting-plate has a vertical sliding movement in the hollow standards 450, which is imparted by the following-described means: Upon the upper side of the gallery 485 is fixed a small stand 460, Fig. 63. This stand constitutes a bearing for a small rock-shaft, which carries the two arms 462 and 463. Each of these arms carries a friction-roll. The outside one, 465, is designed to travel over the elevating-cam 459, which is adapted to slide on the top of the table, and the other, 467, is designed to work against the under side of the lifting-plate 400. The cam 459 has a sliding motion from front to rear to the extent of being thrown in and out of the path of the roll 465 as it passes around with the lifting-plate 400. This motion is imparted by the devices seen in Figs. 40, 41, and 42. When the vertical tripping-rod 321 rises at the termination of the plain knitting, its top end strikes against the under side of the latch connection 314, which, as it rises, carries up the end of the latch 305 by the hook $c$ at its end, whereby the connection between the latch connection 314 and the latch 305 is broken at 305$^a$, and the connection 314 being thus released comes under the influence of the retractile spring 457. This spring is attached at one end to the pin shown, which projects from the under side of the table, and at the other end to the short arm of the lever 315. This lever is attached to the rock-shaft 316, which is carried in the bracket 318, attached to the under side of the table, and its long arm is connected with the end of the latch connection 314. Rock-shaft 316 carries on its inner end an arm 316$^a$, at the end of which is the stud 316$^b$, which is fitted to work in a vertical slot in the side of the cam-slide 458. This cam-slide is attached to the under side of the lifting-cam 459 by means of the screw shown in dotted lines. It is fitted to slide forward and back in a mortise in the table, as seen in Fig. 42. When the latch connnection 314 is released by the means just described, the retraction of the spring 457 draws the cam 459 toward the center of the knitting-cylinder and into the path of the revolving friction-roll 465, and as a result at its next revolution it rides up onto and over the top of the same, carrying with it the roll 467, which by its elevation pushes up the lifting-plate 400 with all its attachments. After the release of latch connection 314, as above, facet 279 is brought against ledge 280ª, and a subsequent revolution of the needle-cylinder advances ratchet 30 one step, thereby carrying one or the other of the arms 562ª or 562ᵇ, as the case may be, one step farther still in contact with roll 274 of swinging arm 273. This movement swings rock-shaft 245 in the direction to throw arm 246, Fig. 13, toward the cylinder. This movement, through the ball-and-socket connection 247, forces the connection 305 in the same direction, thereby carrying pin 305ª, Fig. 40, forward under the notch 314ᵇ of latch connection 314, which falls by gravity, thus reëstablishing the connection between them. At the completion of the fashioning process, when the rock-shaft 245 acts to throw the fashioning parts out of action, the back swing of lever 246 throws cam 459 out of action. The devices which are immediately connected with the jacks, whereby they are raised, are the two fashioning-racks 401 and 405. These are shown in detail in Figs. 76 and 77 and in position in Figs. 36, 59, and 62. The under one of them 401, of which a plan and end view are seen in Fig. 77, has a concentric rib 401ᵈ on its under side, which is fitted to slide in a similar concentric groove in the upper side of the lifting-plate 400. It also has a concentric groove $f$ on its upper side, which is fitted to take in the corresponding rib 405ᵗ on the under side of the upper fashioning-rack 405, which latter is adapted to slide around upon the upper side of the under rack. A part of its interior edge, from $h$ to $k$, extends in under the wings $c$ of the fashioning-jacks 396, Fig. 62, so that when the lifting-plate is elevated, as before described, this inner edge will carry the jacks up with it. Rack 401 lifts the jacks on the right of the center of the lifting-plate. The extension-plate 409 is attached to the upper side of the rack 405 by the screws shown in Fig. 36 and extends in under the wings $b$ of jacks 397, as seen in Fig. 59. When the two racks are distended to their widest extent, as seen in Fig. 36, the raising of the lifting-plate will cause all the jacks, the wings of which overhang the fashioning-racks, to be simultaneously elevated. The extent of such elevation is just enough to carry the jacks up to a point where the shoulders $e\ e\ e$ of the jacks 396 and 397 will just surmount the spring-band 398, which will then by its elasticity spring into the gap in the edges of the jacks below the shoulders $e\ e\ e\ e$. When this takes place, they will be supported by the spring-band until after they have passed through the race between cams 364 and 367, when they are driven down by the action of the jack-slides 365 and 368, as before described.

The two outside jacks 395 on the right and left flanks of the series are only brought into play in the formation of the diagonal seam in the heel and toe of the stocking. The means provided to lift all the jacks simultaneously, so as to run in this diagonal course of stitches, consist of the two T-shaped pick-up plates 474, the forms of which are seen in Fig. 7 and their attachments shown in Figs. 59, 60, and 61. Each is attached to a slide 472 by screws which pass through the distance-pieces 476. The slide 472 is fitted to slide in the guide 471, which is attached to the under side of the lifting-plate 400. The front end of the pick-up plate is in the form of a cross-head which extends from the position of the heel of the fashioning-rack, when it is fed in to its innermost limit, around so as to take on the bottom of the outside jack 395. When the racks in the process of narrowing to form the back part of the heel are fed around toward the center of the machine, so that they overlap each other, about one-third of the narrowing-jacks on each side of the center of the heel will be left outside of the lifting action of the racks, and it is at this stage of the proceeding that the pick-up plates come into play. While the narrowing process is progressing, the pick-up slides are held back out of action by the retractile springs 477, Fig. 59, one end of which is attached to the pin 471ᶜ and the other to the pin 472ª, which is connected with the slide 472; but when the racks have reached the limit of their inward travel the pick-up slides are advanced by the following means: In the upper surface of the lifting-plate 400 a groove of the form shown in cross-section at $m$ in Fig. 62 and concentric with the needle-cylinder is turned or milled. In this groove the two rack-wedges 402 and 406 are fitted to slide. These wedges are shown in detail in Figs. 78, 79, 80, and 81. The wedge 406 is used in connection with the rack 405 and the wedge 402 with the rack 401. Wedge 406 has on its upper side a stud $a$, which is shouldered at its top end, where it comes up against the under side of the rack 405 and is bored and threaded to receive a screw 405ˢ, Fig. 36, by which it is fastened to the rack. On its under side there is a small pin 406ᵇ, which projects downwardly into the concentric groove 400ʷ, Figs. 60 and 62. The wedge 402 is similar in form to the other and is provided with a similar pin 402ᵇ, which also travels in the same concentric groove, but at its opposite end. The wedge 402 has a cross-ledge 402ª, which is fitted to set into the transverse groove or seat provided therefor in the under side of the rack 401. (Shown in the dotted lines in Fig. 77.) As the two racks are propelled toward each other by the pawls which work in the rack-teeth of their outer edges, as will be explained farther on, the two pins 402ᵇ and 406ᵇ will be carried around in the groove 400ʷ until they come in contact with the cam-ledges $c\ c$ of the pick-up levers 478 and 479, respectively, Fig. 60. These two pick-up levers are rights and lefts, one of which is shown in detail in Figs. 74 and 75. Each is slotted at one end, as shown at 478ᵇ, and has a raised projection at the opposite end, as seen at 478ᶜ, the inside face of which is beveled, so as to present a cam-face to the pins 402ᵇ and 406ᵇ when such pins meet them in their path of travel through the concentric groove 400ʷ. These pick-up levers are pivoted on pins 480 480, Figs. 7 and 60, and the forked ends work over the pins 472ᵃ, Figs. 59 and 60, which are connected with the pick-up slides 472. Thus when the levers 478 and 479 are oscillated by the pins 402ᵇ and 406ᵇ striking the cam-ledges 478ᶜ and 479ᶜ and forcing them outwardly the pick-up slides 472 will be shoved under the bottoms of the jacks, so that at the next revolution of the lifting-plate 400 all the jacks will be lifted together.

*Mechanism for operating the fashioning-racks.*—The two fashioning-racks are indented on their peripheries with teeth, as shown in Fig. 36, and are propelled in one direction or the other by means of pawls 427, which are attached to the bell-cranks 425, 429, 434, and 438. These are arranged in pairs. Those on the left, 425 and 429, act on the bottom fashioning-rack 401, while the other pair, 434 and 438, act on the rack 405. The oscillation of the bell-crank 429 propels the rack 401 from the position shown in the drawings around to the left in the process of narrowing the back part of the heel and in the formation of the bottom or sole part of the toe, and while this is going on the bell-crank 434 is doing like duty with the other rack 405. The opposite movements of the racks are effected by the oscillation of the bell-cranks 425 and 438, which act to drive the racks around to their original position. In connection with the racks a guard-ring 420 is provided, which is let into a circular groove in the top of the plate 400 and is held by the ears 421 and 422. That part of it which lies between the points of the pawls that work the upper rack is cut away, as seen at 420ʰ 420ʰ in Fig. 36. The terminals of this gap are beveled, as shown, so that the point of the pawl will just rest on the edge of the beveled part, as shown, when they are not in action. As the bell-crank swings, it pushes the point of the pawl off the beveled edge of the guard and lets it drop into the space between two teeth of the rack. A portion of the lower edge of the guard-ring is similarly cut away opposite the points of the pawls on the left-hand side of the ring, so as to let them come in contact with the teeth of the under rack in the same manner as the right-hand pawls connect with the upper rack, as above described. To hold the racks in position pending the oscillation of the bell-cranks, two spring-plugs 414, which work in the blocks 412 and 413, are provided. The details of these blocks and plugs are shown in Figs. 54 and 55. Each of the pawls is provided with a spring to hold it to its work, a detail of which is seen in Fig. 58. The back throw of the bell-cranks is limited by small stop-pins set in the plate 400 and designated 400ᵖ 400ᵖ 400ᵖ 400ᵖ, Fig. 36. Each pair of the bell-cranks on each side of the machine is given its back throw and kept distended by the flat distending-spring 442, which is wrapped around the screw-stud 443, each of its diverging arms bearing against one of the bell-cranks in such a way as to force it against the stop-pin.

The construction and operation of the bell-cranks will be readily understood by an inspection of Figs. 36, 38, 43, 44, 45, 46, 47, 48, 49, 50, 51, and 52. Each of them carries a pawl to work in one or the other of the racks 401 or 405, pivoted to the bell-crank, and is held up to its work by a spring, substantially as shown in Fig. 43, and each is pivoted on a stud-bolt, which passes through the plate 400 and is held on the under side by a nut. The two inside ones, 429 and 434, which act to work the racks from the outside toward the center of the series of narrowing-jacks, are centered on the stud-bolts like that seen in Fig. 57, while the others are pivoted on studs like that seen in Fig. 56. These are alike in all particulars, except in the length of the eccentric parts $a\,a$. The stud-bolts have an eccentric bearing $a\,a$ terminating in a shouldered head, which is slotted for the screw-driver as a means for effecting horizontal adjustment. This eccentric provision is made to take up any lost motion resulting from wear and is effected by first loosening the nut at the bottom and then turning the stud-bolt a little until the pawls of the bell-crank are brought into proper adjustment with regard to the rack-teeth when the nut is tightened. Each of the bell-cranks is equipped with a roll-carrying arm similar to that seen in Fig. 51. On the bell-cranks 425 and 438 this roll-carrying arm is attached to the upper side and on the other two cranks it is attached to the under side. The arms 426 and 439 swing on the pivots 446 and are connected at their inner ends by the retractile springs 437 to the pins $e\,e$ of the bell-cranks, while their projecting long arms in their backward throw find abutment against the lugs $d\,d$. The other two roll-carrying arms 430 and 435 have their inner extremities mutually connected by a common spring 447. The force of this spring is exerted to draw the outer ends of the arms against the pins $x\,x$ of the plate 400, which limit their throw in that direction. These pins form abutments for the roll-carrying arms 430 and 435 to bear against while the rolls are passing the crescent cams 506 and 510. All the arms carry friction-rolls $a\,a\,a\,a$, of which the two attached to the arms 426 and 439 move in the same plane as the upper cresent cam 506, Figs. 36 and 38, and the two attached to arms 430 and 435 co-act with the lower crescent cam 510 as they are carried around with the lifting-plate 400. These two cam-slides are arranged to be moved into and out of the path of the rolls as the lifting-plate is oscillated by means described farther on. The construction of the roll-carrying arms, springs, and stops is such that when the advancing rolls strike the edges of the cams as they move in one direction the impact will crowd the short arm of the bell-crank toward the cylinder, and will thereby propel the pawl and fashioning-rack upon which it works forward one or more notches, according as the cam-slide is moved in more or less, and as a result, the trailing ends of such rack will be withdrawn from under the bottoms of one or two of the fashioning-jacks, as the case may be, and they will be dropped out of action. On the return swing of the lifting-plate when the roll strikes the edge of the cam-slide, the roll-arm will swing around on its pivot until it runs off the edge of the cam, when the spring at its tail end will return to its former position.

*Devices to control the narrowing and widening in the formation of the heel and toe.*—Referring to Figs. 8, 13, 36, 38, and 94, two vertical parallel rock-shafts 511 and 512 are seen, which for convenience are called "wag-shafts." These may have a concurrent or intermittent oscillation in either direction, as may be necessary, by the means hereinafter described. These wag-shafts have bearings in the bracket 225 at their bottom, Fig. 94, and at their top in the stand 500 of Fig. 36. They carry at their tops the arms 513 and 516, and each of these arms at its outer end is provided with a small pin $a$, Fig. 8, which is adapted to work in a notch in the front edge of one or the other of the slides 507 or 508. The two arms are connected by two retractile springs 520. The swing of either of these arms toward the other is effected solely by the force of these springs. The slides 507 and 508 are alike and of the style shown in detail in Fig. 8. Each is fitted with a zigzag cam-slot $a$, having three planes $b$, $c$, and $d$. The stand 500 has an extension at its top, which is grooved for the reception of the bottom slide 509, and is covered by a cap 502, which is correspondingly grooved for the reception of the upper slide 505. The stand and cap are also transversely grooved to take in the cross-slides 507 and 508. In arranging these slides 508 is disposed, as seen in Fig. 8, so that its notch will take in the pin $a$ of the arm 516 of the wag-shaft 511, while the other slide 507 (which is simply a duplicate of slide 508 inverted and changed end for end) is adjusted so that it will take in the pin $a$ of the top slide 505 and be actuated by the arm 513. Each of the slides 507 and 509 is provided with a pin, which is fitted to work in one or the other of the slots in the cross-slides, as seen in Fig. 8 at 509$^a$. Each of the cam-slides 505 and 509 has a crescent-shaped cam 506 or 510, attached as shown in Fig. 36, the inner curve of which is struck from a center in front of the center of the needle-cylinder, so as to leave its central portion closer to the cylinder than its extremities in order that when the needle-cylinder revolves the rolls attached to the roller-arms of the bell-cranks 425, 429, 434, and 438 will impinge against the inner edges of such crescent cams, and thereby be forced toward the needle-cylinder, by which movement the pawls 427 are advanced against the teeth of the fashioning-racks, and the same are thereby intermittently rotated toward or from each other. The opposed contiguous faces of the slides 505 and 509 are rabbeted for the reception of the cross-slides, as shown. As each cam-slide has a pin which works in the zigzag slot in the cross-slide, it will be seen that as the cross-slide is moved in its slot to the extent of such slot it will effect the movement of the cam-slide equal to the space between $b$ and $d$ of the slide 508. (Seen in Fig. 8.) Each of the steps in the zigzag slot of the cross-slide represents a movement of the bell-crank of the fashioning devices equal to one tooth on the fashioning-racks, so that when the cross-slide is set in to its fullest extent and the rolls on the roll-carrying arms pass over it the bell-crank will propel the rack two steps, and as the teeth on the racks correspond in number to the number of needles in the cylinder it follows that a movement of the rack one tooth will leave one needle at the outside of the series out of action or a like movement in the opposite direction will throw one into action on one side of the stocking. When the lower slide is thrown into action, its work edge is in the same horizontal plane and in the path of the roll-carriers of the two inside bell-crank levers 429 and 434, which are the narrowing-levers. The upper slide coacts with the two outside levers 425 and 438 to effect the widening. As before stated, the forward movement of the slides is effected by the contractile action of the springs 520. The reverse motion is effected as follows: As before stated, the two wag-shafts find their bottom bearings in the bracket 225, which is attached to the back side of the back standard 3, as shown in Figs. 13, 93, and 94. This bracket has a double slideway milled fore and aft in its upper side of the form seen in end view in Fig. 94 for the reception of the pin-slides 226 and 229. An elongated slot is cut through its bottom, as seen in Fig. 93, for the lever 232 to play through. Above the bracket the arm 514 is attached to the shaft 512, and its end is connected by the link 518 with the upper pin-slide 229, as in Fig. 13. A similar arm 515 is attached to the shaft 511 below the bracket, which is connected by the link 519 with the bottom pin-slide 226. The two pin-slides are alike, and each is perforated with an elongated slot $b$, as seen in Fig. 104, in which the head of the lever 232 works, as shown in Fig. 93. Each is also provided with a striking-pin 228 or 231, which is designed to coact with the pins on the pattern-wheel 530, as seen in Fig. 93. When the top of lever 232 is thrown back toward the pattern-cylinder, the wag-shafts will be left free to turn in either direction, but under the stress of the two contractile springs 520, which unite the extremities of the arms 513 and 516 at their upper end. As such springs contract the two pin-slides are thrown toward the pattern-wheel until the striking-pins 228 and 231 strike the opposing pins 538 and 539 of the pattern-wheel. The pattern-pins 538 and 539 are of different lengths and are arranged and inserted in or omitted from the holes in the pattern-wheel upon the following principles: When in the course of the rotation of the pattern-wheel a long pin comes opposite the striking-pin of the pin-slide and the pin-slide is released and left free to move back against the pattern-pin of the wheel, it is stopped and held in that dormant position without moving the wag-shaft with which it is connected, and as a result the movements of the fashioning-racks, which depend on that wag-shaft, do not take place. When a short pattern-pin moves into opposition to a striking-pin and the pin-slide is released, it moves back until the end of the striking-pin impinges against the end of the short pattern-pin, and such movement is enough to rotate the wag-shaft with which it is connected sufficiently to cause one or the other of the cross-slides 505 or 509 to make a half-stroke, Fig. 8, and force the pin on the cam-slide, which works in the zigzag slot in the cross-slide, from one end of the slot to a position in the middle of the same, which will place the cam on the end of the cam-slide in a position where the revolution of the needle-cylinder will, through the impact of the rolls on the bell-cranks against such cam, effect an oscillation of the bell-cranks which will propel the fashioning-racks but one tooth or will widen or narrow the pattern but one needle. When a space in the series of pins and holes in the pattern-wheel is presented to the striking-pin, the contraction of the springs 520 will throw the pin-slide opposite such hole clear in to its extreme limit, thereby causing the cross-slide to throw the cam-slide forward, so that the pin $a$ on the cam-slide will stand in the step $d$ of the cross-slide and the crescent cam will be in position to throw the bell-cranks, which will move the fashioning-racks two teeth or throw two needles out of action on each side the cylinder. The pins in the pattern-wheel are so arranged that in no instance are two slides brought into action at the same time—that is to say, when a short pattern-pin is presented to the striking-pin of the pin-slide the other slide is stopped out of action by a long pattern-pin in the pattern-wheel directly over or under it. This will appear in Fig. 105, in which the scheme of a heel-pattern is laid out, the pins being arranged spirally instead of helically, so as to present the whole scheme to the eye at one view.

The crescent slides 506 and 510 are thrown out of action or drawn back by the oscillation of the lever 232, as shown in Figs. 19, 93, and 94. This we have termed a "slide-drawing lever," and its functions are to draw the pin-slides 226 and 229 back from their advanced positions, as determined by the action of the springs 520. This is done by a cam 243 on the center shaft 54, as seen in Figs. 19 and 93. This cam works against a friction-roll 237, pivoted on a roll-carrying arm 236, which arm is pivoted on the top side of the fork-slide 235 and is arranged to swing freely when the cam 243 hits it in one direction, and when it engages it in the opposite direction it swings against the lug $235^a$, so that the cam 243 in passing it forces it toward the standard 3, and as the fork-slide is attached at its opposite end to the bottom of the slide-drawing lever 232 the head $a$ of that lever, which works in the mortises of the pin-slides, draws both slides back to their extreme limit, as seen in the figure. The lever 232 is pivoted on the bracket 225 at 233, and for the purpose of keeping the roll-carrying arm 236 up to its position against the lug $235^a$ and also to establish and maintain a tendency to keep the fork-slide drawn back, so that cam 243 will pass the roll 237, a spring 242 is attached to a pin on the side of the lower arm of the lever 232 at $b$, and connects at its other end with pin $236^a$ of the roll-carrying arm 236. As the pin $232^b$ is a little above the pivot 234 the spring 242 subtends the angle formed by the lever and the fork-slide, and therefore tends to draw each toward the other. The force so exerted tends to keep the fork-slide back, so that the cam 243 can revolve without striking the roll 237. Cam 55 at the bottom of the central shaft 54 and the cam 243 are so adjusted with reference to each other that the concentric part of cam 243 will bear against the roll 237, and thereby will hold the pin-slides back from contact with the pins of the pattern-wheel, while the cam 55 is rotating the ratchet 30 around one tooth or sufficient to bring another pattern-pin into position opposite the pin-slide. The pitch of the helix of the pattern-drum on which the pattern-pins are set coincides with the pitch of the screw at the bottom of the pattern-shaft, and the number of such pins agrees with that of the teeth of the driving-ratchet 30 at the bottom of the pattern-shaft. In work the fashioning devices are not thrown into action until the leading hole or pin in the pattern series has risen until it has come opposite the striking-pin in the upper slide. This is necessary in order that both striking-pins of the slides will have provisions to resist the action of the springs 520 when the fashioning apparatus is thrown into action. In this machine the fashioning-pins are so arranged that the whole pattern is wrought by a single revolution of the pattern-shaft. The combination of the pattern-wheel, pin-slides, fork-slide, wag-shafts, cross-slides, crescent cams, bell-cranks, and fashioning-racks is such that their adjustment and action are dependent upon the relative arrangement of the fashioning-pins in the pattern-wheel—that is to say, if a long pin is presented to either of the strike-pins of the pin-slides no narrowing or no widening function (as the case may be, depending on whether the crescent 506 or the crescent 510 be kept out of action by said long pin) will be performed, and if a short pin is presented to the lower striking-pin the fashioning-racks will be correspondingly advanced toward each other one needle's distance or the fabric will be narrowed just that amount, and if an interval between two pattern-pins or a hole is brought into opposition to that pin the fabric will be correspondingly narrowed to the extent of two needles on each edge of the pattern. If, on the contrary, a short pin be presented to the upper striking-pin a reciprocation of the cylinder will correspondingly widen the fabric the breadth of one needle, while if a hole is brought opposite it will be correspondingly widened the breadth of two needles. In other words, the steps before described will be reversed.

*Construction and operation of the pattern-wheel.*—The details of the pattern-wheel are fully shown in Figs. 70, 71, 72, and 73. Fig. 71 exhibits most of the details of the wheel. It consists of two short cylinders 530 and 532, which have their adjacent ends fitted to each other on a helical line which coincides with the pitch of the elevating-screw 26 at the bottom of the pattern-shaft. The upper section 530 is fitted to the pattern-shaft and has a long hub which extends downwardly and has a thread $c\ c$ cut on it of the same pitch as that of screw 26. The lower section 532 has a hub bored to slip over the threaded hub of 530, as seen in Fig. 71. The interior of this hub is recessed to take in the binding-key 533, which has a projection to fit and follow the space between the threads $c\ c$ of the inclosed hub of the upper section. This key is set up by the set-screw 537. By loosening this set-screw and turning the lower section of the wheel the distance between the two sections is regulated, and this interval answers to the distance between the heel and toe sections of the stocking. In those machines where a single solid cylinder perforated with a continuous helical series of holes is employed and the distance between the heel and toe is to be changed some or all the fashioning-pins of either the heel or toe pattern must be taken out and set anew to obtain the desired change; but by the division of the cylinder itself and connecting the two members by a helical connection agreeing in pitch and direction with the arrangement of pins on the surface much trouble and liability to mistake, as well as inconvenience, is avoided. Each section of the pattern-wheel is perforated with a helical row of screw-holes extending at least twice around the circumference of the cylinder and spaced to coincide with the number of the teeth on the ratchet 30 at the bottom of the pattern-shaft by which the same is driven, so that as the ratchet is propelled one notch by the pawl 66 the cylinder will advance so as to present the pattern-pin successively to the striking-pin of the pin-slides. For the purpose of effecting the widening and narrowing by a definite number of needles at each step pins of different lengths are provided, as shown. These pins have threaded stems, which are screwed into the holes in the surface of the cylinder according to a preconceived design. In this instance the pegging up of the pattern-cylinder agrees with the design seen in Fig. 106 and the scheme shown in Fig. 105. This design and scheme apply only to the heel and is carried out in the arrangement of the pins in the upper section of the pattern-wheel 530, arranging them according to the scheme shown in Fig. 105. Commencing on the division-line $a\ a\ c\ c$ of that figure and reading to the right the pins are omitted from the first tier of holes. Then two short pins are inserted in the next two successive holes in the lower row of holes or in the holes which, as the wheel revolves, will come opposite the lower striking-pin 228, which is the pin that controls the action of the narrowing-slides, as has been explained before. As each pin represents two courses of stitches, or one across and back again, it follows that two narrowings and four courses of stitches across the heel-section will be knit, (represented by the first two narrowed courses in the scheme in Fig. 106.) Then follows a blank or an interval in the helical row of pins over which is a long pin, and as this blank permits the slide 226 to be thrown out to its extreme limit of action it will throw the crescent slide 510 out to the extreme limit of its throw or so that the slide-pin $509^a$, Fig. 8, will rest in the step $508^d$ of the cross-slide 508. When in this position, the bell-cranks 429 and 434, Fig. 36, will propel the narrowing-racks two teeth or steps toward each other. Thus the two short courses of stitches next seen in the scheme are produced. Next follows a long pin in the series and over it is a short pin which coacts with the upper striking-pin 231 and through means before described determines the action of the bell-cranks 425 and 438, whereby the fabric is widened at each margin one needle, as seen in the scheme. This arrangement of pins is repeated to the extent of six narrowings and widenings, the course of the knitting vacillating between the upper and lower rows of pins, as indicated by the zigzag line, until all the special courses of stitches requisite to give the heel its proper shape and fullness are run in, when a series of short pins follows, which represents a series of narrowings by a single needle each until the wheel has made within one hole of half a revolution. Then occurs an interval in the narrowing series of pins. This is for the purpose of causing the racks to be moved a distance of two teeth each in order to better work the pick-up slides 474 beneath them. At this stage of the work, or when the narrowing-racks have been worked around so that the pins $a\ a$ on the under sides of the blocks 402 and 406, which are attached to the trailing ends of the racks, impinge against the bevel-faces $c\ c$ of the levers 478 and 479, Figs. 60, 70, and 75, which is timed to occur when the next to the last narrowing movement of the racks takes place, the last narrowing movement forces them against said faces, thereby effecting an oscillation of the levers 478 and 479 on their fulcrum-pivots 480, and by this means causing the other end to act on the studs $472^{a}$ of the slides 472, to which the pick-up slides are connected, as shown in Figs. 7 and 59, and by such action the pick-up slides are thrown under the bottom of the narrowed jacks, so that when the lifting-plate 400 is next elevated as the roll 465 next passes over the lifting-cam 459 all the jacks will be lifted, and as a consequence all the needles will be thrown into action. Two reciprocations of the needle-cylinder will then run in a double course of stitches from the terminus of the last narrowed course at the apex of the heel around to one needle beyond the needle from which the narrowing first commenced on the one side of the heel, thence across back to the corresponding point on the opposite side of the heel, and thence back to the apex of the heel again. In this operation the pattern-wheel will have advanced two steps and will have passed the center of the design at the line $d\ d\ e\ e$ of Fig. 105. Then a series of short pins corresponding in number to the series just preceding it, but arranged opposite the upper striking-pin 231 of the widening-slide 229, comes into play, and the pattern is widened out needle by needle until the point is reached where the special courses are introduced. From this point the pattern-pins are arranged on the wheel opposite the upper or widening slide, but in inverse order as they were at the commencement of the pattern, to shape the narrowed portion of the heel. Thus one revolution of the pattern-wheel serves to regulate the knitting of the heel part of the stocking. The scheme of pins shown in Fig. 105 may be identified with the work shown in Fig. 106, as follows: In Fig. 106 the vertical lines represent the needles and the transverse line the yarn as wrought into successive courses of stitches. Assuming that rotation of the needle-cylinder has ceased with the feed-thread delivering to the needles at a point near the arrow at the top of Fig. 106 and the first short pin next on the right of $b\ b$, Fig. 105, is opposite the bottom pin-slide, as before described, the coöperation of that pin and slide with the narrowing apparatus will be to drop one needle out of action and end this course of stitches at $a^5$. On the return reciprocation there will be a like action of the narrowing apparatus and the course will end at $e^5$. This reciprocation having, through the pawl 66 and ratchet 30, advanced the pattern-wheel one step, the next short pin is opposed to the pin-slide, when the next reciprocation of the cylinder by the same means drops out another needle on each side of the pattern and as a result terminates the next two courses at $b^5$ and $f^5$ on the left and right, respectively. Then the third hole in the design in which there is no pin is presented to the bottom pin-slide, when as a result of a reciprocation two needles on each side drop out of action, terminating the next two courses at $c^5$ and $g^5$, respectively. Here the scheme shifts, as indicated by the zigzag line in Fig. 105, to a short pin opposite the upper pin-slide, when the next reciprocation widens out the fabric by lengthening out the next two courses one needle on each side and terminating them at $d^5$ and $h^5$, respectively. Thus the pattern progresses by alternate narrowing and widening to the points $i^5\ i^5$, which correspond with the termination of the first zigzag section of the line between the pins in Fig. 106. Thence the pattern proceeds by regular narrowing to the course marked $j^5\ j^5$, when the pick-up slides are thrown into action, and the two diagonal heel courses between $k^5$ and $l^5$ are run in as a result of the absence of a pin on either side of the line $d\ d$ $e\ e$ of Fig. 105, as before described. The knitting of the lower half of the pattern is simply an inversion of the procedure carried out in knitting the upper half. As the pattern-wheel completes its revolution at the finish of the widening and the last pin in the design has passed the striking-pin of the pattern-slides its further rotation by contact of arm $561^b$ against the unhooking-arm 287 throws the latter around against the pin $p$ of the hook 286, detaches said hook from its engagement with the end of the locking-arm 270, and thereby leaves the springs 249 free to contract and swing the rock-shaft 245 around to the position it occupied at the commencement of the stocking. This movement of the rock-shaft 245, through the swing imparted to the weight-tripping arm 250, Figs. 20 and 25, and the connection 255, 256, 260, and 264, throws the weight 105 over toward the left-hand side of the machine, and lug $c$ on its back side, striking the short arm of lever 115, changes the speed, and the lug $105^a$, striking the top of the lever 100, through it imparts an impulse to the friction-roll 93, which at this stage of the case stands on the left of the axis of ratchet 90 and just under the lever 100 sufficient to impel it forward, so that the clawker 82 will catch a tooth and thus put ratchet 90 in process of rotation again for the purpose of resetting the weight 105 in its upright locked position preparatory to the next change of speed. All the various groups of devices which were brought into action to fashion the heel are thrown out of action by the swing of the rock-shaft 245, and the mechanism to do the plain knitting is brought into play again. The process of knitting the tubular part of the foot begins and proceeds in the same manner as the knitting of the leg until the desired length has been reached. This is determined by the vertical distance between the heel-stop arm $561^b$ and the toe-start arm $562^a$ as they are arranged on the pattern-shaft, as seen in Fig. 2, and it coincides with the interval between the upper and lower section of the pattern-wheel. These arms are fitted to be adjusted at any elevation on the shell 35 by loosening the clamp-screw by which they are tightened up and moving them around spirally on the shell until the proper point is reached and then tightening the screw. When the pattern-shaft in the process of knitting the foot rises to where the toe-start arm 562$^a$ will engage the swing-lever 273, it will throw it around until it engages the arm 280, Fig. 21, when by crowding this around the rock-shaft 245 will be turned, the plain-knitting mechanism will be thrown out of action, and the formation of the toe will be commenced. During this part of the process the lower half of the pattern-wheel will come into action in combination with the same parts as were employed in shaping the heel, as above described.

The arms 562$^b$, 561$^b$, 562$^a$, and 561$^a$ act successively in the order named to stop the plain-knitting and start the fashioning-knitting apparatus as follows: The plain knitting of the leg will progress until the screw-shaft 35 in its spiral ascent carries arm 562$^b$ around against the swinging arm 273, and by forcing it around throws out of action the plain-knitting devices, as elsewhere explained. A revolution of shaft 35 suffices to accomplish the formation of the heel when arm 561$^b$ strikes latch 287, Fig. 20, and by forcing it around releases the apparatus, elsewhere explained, which throws the fashioning devices out of action and restores to action the plain-knitting machinery, when the formation of the tubular part of the foot commences. This proceeds until arm 562$^a$ engages swinging arm 273 and again stops the plain and starts the fashioning devices, when after the formation of the toe the arm 561$^a$ strikes the latch 287 and throws the fashioning-gear out of action and a few courses of stitches are added to the finish of the toe, immediately after which pin 535 of the stopping-arm 534 engages the stopping devices and releases shaft 35, so that it can be run back to its original starting position by the band 29, driven from the hub of one of the driving-pulleys, as shown in Figs. 1 and 3. The lower section of the pattern-wheel is pegged up after the scheme shown in Fig. 108, and the fashioning apparatus is brought into action when the pins at $n\ n$ are opposite the pin-slides and are thrown out at the completion of the narrowing or when the pins $p\ p$ pass the pin-slides by reason of the arm 561$^a$ engaging the latch 287 and throwing it around, thereby releasing shaft 245, by the revolution of which the plain-knitting gear at the same time is thrown into action. The extra courses of stitches run in beyond the finishing course over the top of the toe are raveled out when the toe of the stocking is closed and finished. These extra courses are put in and temporarily left until the stocking is to be closed up and finished, so as to enable the yarn of the stitches which are to be united in the closing up to crimp and set in stitch shape for facilitating the closing-up process, which is subsequently done by hand or on a machine. At this stage of the work the pattern-shaft 37 will have ascended in its spiral course until the stopping-pin 535 of the arm 534, Fig. 70, engages the jointed extension 552 of the upper tripping-arm 551, to which it is pivoted by pin 551$^a$. This arm 551 projects from a hub attached to the top of tripping-shaft 550. Thus constructed, when the stop-pin 535 strikes extension 552, as above stated, and carries it forward its jointed end swings the free end of arm 551 around, whereby tripping-shaft 550 is rotated, and as it turns it swings the end of the catch-arm 553, Figs. 22 and 94, against the beveled end $e$ of the detent-lever 68, and by forcing it back throws its opposite end 68$^b$ out of engagement with ratchet 30, and at the same moment spring 69, which is stronger than spring 67, is brought to bear against the inside edge of pawl 66, but on account of the hooking shape of the teeth of the ratchet 30 the pawl will not let go until it makes a back stroke, when the beveled face 66$^b$ will ride up onto the front end of the detent 68$^b$ and will thus positively disengage the end of the pawl from the ratchet-teeth. This is necessary, because otherwise when the detent is disengaged the action of belt 29, which runs constantly, would be to run the ratchet back against the pawl and the hooking nature of the teeth would hug the end of the pawl down to its engagement. At the same moment the end of the catch-arm locks behind the catch of the detent-arm and holds it. The plate 66$^a$ at the point of pawl 66 rides on the upper surface of ratchet 30 and serves to prevent the point of the pawl from sagging and to maintain fair engagement between it and the ratchet. The piece 66$^b$ operates as a positive block to prevent the pawl from being accidentally or otherwise forced into engagement with the ratchet when the pattern-shaft is running down. The shaft 540 carrying arm 543, by reason of its coupled connection with shaft 550 through pin 540$^g$, is rotated at the same time as shaft 550, so that its extremity 543$^a$ is withdrawn from under ledge $e$ of the stop-drop 193, which under the impulse of gravity and spring 195 descends and its tapering point 193$^c$ enters between the cheeks $w\ w$ of the stop-clamp 180, Figs. 88, 89, and 91, thus separating the driven clutch from the driving-pulley, so that its motion ceases.

*Devices for resetting the machine.*—The stocking being completed and all the operative parts of the machine being thus thrown out of action, the pattern-shaft is returned to its starting position through the action of belt 29. This belt runs in groove $g$ of the hub of driving-pulley 143, Fig. 10, and runs under the guiding-pulleys 301 of arm 300 at the base of the machine around the grooved pulley 30ª of the ratchet 30. When the machine is knitting, this belt slips on the driver and its tension, under the influence of the driving-pulley, acts as a brake on the ratchet 30 by maintaining a constant tendency to run the ratchet backward. This counteracts any momentum set up by the propulsive action of the pawl 66 on the ratchet 30 and is also utilized to run the pattern-shaft down on its screw to its normal starting position. The parts stand, as seen in Fig. 22, when this movement is commenced and it is terminated by the claw-plate 565 on the end of the setting-arm 563, in its last revolution passing on the outside of the pin 68ᵇ, and as 565 is set at an angle, so as to gather toward its axis of revolution it draws the catch 68ᶜ out of engagement with the catch-arm 553 and releases it, as well as releasing the detent-lever 68, so that after the setting-arm has passed the pin 68ᵈ all resistance to the action of spring 67 is removed and, asserting its normal force, it draws the pawl 66 into engagement with the ratchet 30 and also forces the detent-arm 68ᵇ around into working position again, thus leaving the machine set ready to knit a new stocking.

We claim—

1. The combination with the driving-shaft, of a driven clutch member adapted to slide but not to turn thereon, a driving clutch member fitted to both slide and turn thereon, a tubular journal-bearing for said shaft adjacent to the driving clutch member having a longitudinal movement in its seat, connected with said driving member by appropriate connections, and mechanism connected with said bearing for imparting to it its appropriate longitudinal movement.

2. The combination with the main driving-shaft of a small cone-clutch pulley adapted to slide thereon for fast speed, and two larger cone-clutch pulleys having no sliding movement for slower speed, all fitted to rotate freely on the shaft when unclutched, a sliding double cone-clutch between the larger pulleys, a sliding cone-clutch which coacts with the small clutch-pulley, mechanism substantially as shown, for engaging and disengaging the small pulley with its driven cone-clutch and independent mechanism, substantially as shown, for making and breaking such engagement between the double cone-clutch and either or both of the larger pulleys, as may be desired.

3. The combination of shaft 130, pulleys 140 and 143, clutch-cones 141 and 144, and a common shifter-rod for shifting them, with pulley 145, and means connected therewith for imparting to it an independent shifting movement into or out of engagement with clutch 144, substantially in the manner described and for the purposes set forth.

4. The combination with the driving-shaft 130 and the bracket 122, of the journal-bush 123, having the helical slot 123ª, pin 138 in bracket 122, sliding pulley 145, and bush-arm 124 rigidly attached to the bush and loosely to the hub of the pulley, substantially in the manner described and for the purposes set forth.

5. The combination of the provisions shown for effecting the rotation of journal-bush 123, consisting of said bush, the shifting-lever 115, rod 207, rock-shaft 208, connection 215 218, and arm 124 connected with said bush, when arranged to operate substantially in the manner described and for the purpose set forth.

6. A rotatable needle-cylinder carrying needles and fashioning-jacks and having a flange or similar appurtenance which revolves therewith, in combination with fashioning devices mounted on the said flange for coöperation with said jacks, and pattern mechanism mounted on the frame of the machine or other independent basis having operative connection with said fashioning devices for governing the action of the needles during the knitting of the heel or toe of the stocking.

7. The combination of a reciprocating needle-cylinder equipped with needles and fashioning-jacks, provided with a gallery which revolves therewith, a lifting-plate above said gallery and mounted thereon on vertical slides, devices connected with said lifting-plate for throwing the fashioning-jacks in and out of action, a lifting device mounted on the gallery for elevating said lifting-plate, and a movable device connected with the stationary part of the machine adapted to be moved into and out of the path of rotation of said lifting device, as a provision for actuating the same.

8. A reciprocating needle-cylinder carrying in its grooves a series of shanked needles and under that portion of said needles in said grooves upon which the heel and toe is fashioned, a series of needle-lifting jacks, said series being divided on the median line into two sections which fashion respectively the right and left sides of heel and toe, and an extra jack on each flank of the fashioning series in combination with lifting mechanism having two overlapping devices substantially as shown, which are adapted to lift the fashioning-jacks, and having means for imparting to such devices, a step-by-step movement from the flanks of the series toward the center and back again, the said mechanism having also a pair of pick-up devices, and means whereby the latter may be thrown into position to raise all those jacks dropped out of action by the jack-lifting devices aforesaid, together with said extra jacks.

9. A reciprocating needle-cylinder carrying in its grooves a series of shank-needles, and under that portion of said needles in said grooves upon which the heel and toe is fashioned, a series of needle-lifting jacks, and an extra jack on either side of the series, said series being divided in the middle into two sections which fashion respectively the right and left sides of the heel and toe, in combination with a needle-actuating cam, a V-shaped jack-actuating cam opposite the intake of the feed-thread, flanked on each side by a jack-depressing cam and devices connected therewith as shown, for imparting to said depressing-cams alternately, movement into and out of the path of the actuating-shanks of the jacks, and a pair of pick-up lifting devices adapted to be brought into action when the heel or toe fashioning has advanced to its narrowest limit at the apex of the heel or toe, and to raise all the fashioning and extra jacks theretofore dropped out of or not brought into action in the narrowing process, together with devices substantially as shown, for carrying and lifting said pick-up devices.

10. The combination of the described needle-cylinder, needles and needle-shank race provided opposite the point of intake of the feed-thread, with the V-shaped drop-cam and means connected with said cam for depressing or dropping it below the path of travel of the needle-shanks, a set of shank needle-raising jacks, a jack-shank race provided with a V-shaped cam opposite the point of intake of the feed-thread and flanked on either side by a draw-down cam, and means connected with said cams for imparting to them alternately a vertical reciprocating movement, said race being located in a plane above the plane occupied by the jack-shanks in their idle position, and means connected with said jacks adapted to lift them into operative position with reference to said jack-shank race.

11. The combination of a grooved needle-cylinder, a series of needle-actuating jacks provided with protuberant supporting-shoulders on their outside edges adjacent to the supporting-band, and a band for confining said jacks in their grooves and supporting them when raised, by means of such shoulders.

12. The combination in a cylinder stocking-machine, of a cylinder and cams for knitting the tubular parts of the leg and foot, devices consisting of needles, and jacks for operating said needles substantially as shown, for forming the rear and sole parts of the heel by narrowing and widening respectively, with an extra needle and jack on each flank of the narrowing series, and mechanism substantially as shown, to throw into action at the termination of the narrowing all the idle and extra jacks to the extent of at least one course of stitches, whereby the diagonal course of stitches which was left on the needles during the narrowing process, is cast off, and a new course of stitches is run in extending at least one needle beyond the widest limits of the fashioned parts.

13. An oscillating needle-cylinder equipped with a series of needles and needle-actuating jacks for fashioning a part of the tubular fabric to be produced, a pair of overlapping concentric lifting-slides, which coöperate with and lift said jacks, and means connected with them for imparting to them a lifting movement, a pattern-cylinder provided with devices for determining the action of said slides, and mechanism, interposed between the pattern-cylinder and the jack-lifting slides, and coöperating with each, for imparting to said slides their appropriate movements around the cylinder.

14. The combination with the needle-cylinder carrying needles and shank needle-raising jacks, of the lifting-plate 400, carrying the overlapping racks 401 and 405, pick-up slides 474, and means substantially as shown, connected with said lifting-plate for raising the same, substantially as described and for the purposes set forth.

15. A rotating needle-cylinder provided with needles and a series of jacks, of cams for actuating said needles and jacks for fashioning purposes, in combination with mechanism adapted to convert the rotating motion of the cylinder into reciprocating motion and concentric reciprocating, narrowing and widening slides adapted to coöperate with said jacks to fashion the heel and toe.

16. The combination of arm 629, pivot-shaft 617, spring 626, tension-nut 625, binding-screw and pinch-spring 621, and a suitable head or standard on which the same are mounted.

17. The combination of the swinging thread-carrying arm provided with the pincer-fingers, and means substantially as shown, for opening and closing said fingers, with the thread-guide at or near the point of delivery of the feed-thread to the needles open on its upper side.

18. The combination of a swinging thread-carrying arm fitted with a pair of pincer-fingers at its free end and having an initial rising motion away from, and a returning, falling motion toward the pincer-opener, and means for actuating said arm, with an opening blade pivoted so as to have an edgewise, vertical movement between said pincer-fingers and in the path of their movement.

19. The combination with the swinging thread-carrying arm, of the fixed and the pivoted shear-blades arranged athwart the path of travel of the extra thread, and means substantially as shown, connected with the pivoted blade and lying in the path of movement of the thread-carrying arm for such arm to impinge against and adapted to sever the thread.

20. The combination of the fixed and movable shear-blades, the shearing-elbow, the spring connected therewith adapted to open the blades, with the swinging thread-carrying arm.

21. The combination of the swinging thread-carrying arm, armed with a device for holding the end of a thread, with a thread-guide open on the side toward the thread-carrying arm, located at the point of delivery of the thread to the needles.

22. The combination of a cylindrical rod, a sphere centrally bored to receive said rod and adapted to turn and slide thereon, a guide for said sphere to slide in, consisting of a slot in suitable material, the opposed internal walls of which are parallel and concave to fit said sphere, and means for actuating said rod.

23. The combination of the actuating-lever, stationary guide and the thread-carrying arm pivoted on a swivel at one end, and carrying a pair of pincer-fingers at the other, provided with two ball-slides of the character described, one of which is fitted to work in a concave-edged guide-slot in the actuating-lever, whereby said arm is swung, and the other in a similar guide-slot of the stationary guide which, in connection with the actuating-lever, is adapted to impart to the arm its appropriate rising and falling movements.

24. The combination with the cam-slotted ring 335, of the circumferentially-adjustable stop-pin $336^h$, and the stop-pin $330^k$.

25. The combination of the cam-slotted ring 335, circumferentially-adjustable stop-pin $336^h$, stationary stop-pin $330^k$, and knuckle-spring 346, substantially as shown and for the purpose specified.

26. The combination of devices, consisting of the shifting-rod 170, carrying forks 183 and 190, knuckle-stud 185, lever 186, and spring 188, substantially as specified.

27. The combination of the shifter-rod 170 provided with the knuckle 185, with the shifting-lever carrying knuckle 186 having the bevel faces $f$, $g$, and spring 188, substantially as specified.

28. The combination of the shifter-rod 170, carrying the clamp 180, drop-stop 193, with spring 194 and starting-lever 196, substantially as specified.

29. The combination of the stop-clamp 180 on the shifting-rod 170, with the stop-drop 193 having wedge-shaped terminal $c$, at its bottom end which is adapted to work between cheeks on the clamp.

30. A shifting rod or bar connected with the stopping devices of a machine, provided with two cheeks or opposed abutments, in combination with a slide having a wedge-shaped end which is fitted to enter between said cheeks and by the action of the wedge-faces on the cheeks to force the rod to a stop at a position where the machine is inoperative.

31. A pattern-cylinder provided with a series of fashioning-pins extending practically twice around the same in a helical direction, and means connected therewith for producing a coincident helical rotary movement, in combination with a widening-slide and a narrowing-slide adapted to coöperate with said pins, a series of jacks and needles and narrowing and widening appliances which coöperate with the fashioning jacks and needles to form a heel or toe of a stocking.

32. A pattern device for fashioning heels and toes of stockings, composed of two cylindrical members, one of which carries the devices for determining the fashion of the heel, and the other the devices for determining the fashion of the toe, said devices being arranged helically around the surface of said cylinders, one of said members constituting the driving and the other the driven member, one of said members having a helical adjustment with reference to the other, as a provision for adjusting the interval between said members; and means for imparting to the whole combination a rotating helical movement; the pitch and direction of said helical arrangement of pins and the adjustment between the members agreeing with the helical movement of the said combination.

33. A pattern-wheel having a helical row of holes for pattern-pins, and means for imparting to it a helical movement, in combination with the fashioning-needles and a series of long and short pins, the pin-slides and means for imparting to them a reciprocating movement toward and away from said pattern-pins, and mechanism, substantially as shown, interposed between the said slides and the fashioning-needles for dropping them out of or throwing them into action for narrowing or widening purposes.

34. The combination with the needle-cylinder shaft carrying the ratchet-driving cam, and pattern-shaft carrying a ratchet-wheel, of the ratchet-driving elbow and pawl to work in said ratchet, a swinging arm carrying a friction-roll against which said cam works, a stop on one side of said arm, and means connected with said arm to cause it normally to swing toward said stop.

35. The combination with the pattern-shaft ratchet, of the ratchet-driving elbow and pawl, the detent-lever having detent at one end to work in the teeth of the ratchet, a spring attached to the detent-lever adapted to strike against the pawl to throw it out of engagement with the ratchet when the detent is forced out of engagement with the ratchet, and a retractile spring connecting said detent and pawl.

36. The combination with the pattern-shaft, carrying the ratchet-setting arm and claw-plate, of the detent-lever with tailpiece, claw-pin and arm-catch.

37. The combination with the screw-stud on which the pattern-shaft turns, of said pattern-shaft provided with a helical groove of same pitch and direction as the screw-stud on which it runs, and one or more arms clamped about said shaft and provided with a guide-pin to follow said grooves.

38. The combination with the needle-cylinder, needles and needle-raising jacks, of a fixed jack-shank race having ascending and descending inclines opposite the intake of the feed-thread, and on either side of said inclines a cam-face, independent of said jack-shank race, means connected therewith for alternately throwing the same into and out of the orbit of travel of the jack-shanks, and adapted to draw down said shanks to a plane below that of the inclined part of said race opposite the intake of the feed-thread.

39. The combination with the needle-cylinder, needles and needle-raising jacks, of the slides 365 and 368, the rotary reciprocating ring 350 having diagonally-inclined slots to work on pins connected with said slides, the shifting lugs 353 and 354, driver 359 appurtenant to some part of the needle-cylinder, means connected with said shifting lugs for breaking engagement with the driver at each limit of its reciprocation, and means substantially as shown, for imparting to said needle-cylinder proper, reciprocating motions.

40. The combination of the draw-down ring 342, provided with the pins 340, with the tubular structure 331, vertically slotted for said pins, and ring 335 having inclined slots in which said pins move, and adapted to slide partially around said tubular part.

41. The combination of the fashioning-racks, narrowing bell-cranks and pawls to work said racks, with the crescent cam with which said narrowing bell-cranks coöperate, said crescent cam being adapted to be moved into or out of position to coöperate with the bell-cranks.

42. The combination of the fashioning-racks, widening bell-cranks and pawls to work said racks, with the crescent cam with which said widening bell-cranks coöperate, said crescent cam being adapted to be moved into and out of position to coöperate with the bell-cranks.

43. The combination with the fashioning-racks, of the narrowing and widening bell-cranks and pawls, crescent cams with which said bell-cranks coöperate, and means substantially as shown, for throwing said crescent cams alternately into and out of working position, substantially as described and for the purposes set forth.

44. The combination of the needle-cylinder provided with the striking-lug 489, and the loose arm 174 on the shaft 54, with the sliding arc 175 provided with the lug 175$^w$, and provisions, substantially as shown, for sliding said lug into and out of the orbit of revolution of the striking-lug 489, substantially as described and for the purposes set forth.

45. The combination with the shifter-rod 170, carrying the two contact-rolls 172, of the needle-cylinder having lug 489, central shaft 54, sleeve with the arm 174 mounted thereon, slide 175 having striking-lug against which lug 489 impinges, and means connected with said slide for actuating the same, and means connected with shaft 54 for driving the same.

46. The combination of sleeve 174 mounted on the central shaft provided with the pin 174$^a$, with the two straddling levers 176 connected with the springs 177, each lever having one end fitted to turn upon the said sleeve and the other to strike against a fixed abutment, said pin 174$^a$ being interposed between them.

47. The pawl 66, belt 29 connecting pulley 143 with ratchet-pulley 30, in combination with said pulleys, said belt being adapted to drive ratchet 30 against pawl 66 and strained so as to act as a brake on the ratchet-shaft, as a provision for absorbing the forward momentum of said shaft and its appurtenances in plain knitting, and for driving the pattern-shaft to its original position in setting the machine preparatory to commencing the knitting of a new stocking.

48. The combination of starting-handle 196, stop-drop 193, provided with lug $e$, with arm 543 and means connected therewith for swinging it into and out of position to support or release said stop-drop.

49. The combination of the stop-drop provided with devices for moving the shifter-rod, with the shifter-rod and means connected therewith with which the stop-drop coöperates for throwing the rod in either direction.

50. The combination of the lever 186 having the oppositely-inclined faces $f$ and $g$, with the shifter-rod 170 provided with the knuckle-stud 185 and means connected therewith for maintaining constant operative contact between one or the other of said inclined faces, and said knuckle-stud.

51. The combination of the stop-drop and devices attached to the shifting-rod with which it coöperates for breaking clutch engagement, the shifting-rod, provided with a knuckle-stud, the clutch-tightening lever provided with the described inclined planes which coact with said knuckle, and means connected with said lever and knuckle for maintaining operative contact between them.

52. The combination with the stop-drop 193 provided with a lifting-lug and wedge-shaped end, of the starting-handle and shifter-rod provided with lugs or cheeks with which said wedge-shaped end coacts, and provisions, substantially as shown for actuating the same.

53. The wedge-shaped stop-drop provided with a supporting lug or shoulder, in combination with the shifting-rod having the described cheeks with which said stop-drop coacts, and a supporting and releasing lever adapted to coöperate with said supporting lug or shoulder, and means connected with said lever for actuating the same.

54. The combination of the starting-handle 196, the push-rod 199, rock-shaft 540 provided with arm 541 with which said push-rod connects, and the locking-arm 543.

55. The combination with ring 335 provided with the circumferentially-adjustable handle 336 and a contact-pin, of a stop lug or pin connected with some fixed part of the machine against which said contact-pin in the ring, impinges when the ring is revolved in one direction, as a means for determining the length of the stitches.

56. The combination with the race-shifting ring 350 of the slides 353, 354 having inclined transverse ribs on their insides, plates 358 with which said ribs coact, springs 357 and means connected with the cylinder for effecting alternate driving contact with said slides.

57. The pattern-cylinder composed of two sections transversely divided, one section provided with a hub of sufficient length to take on the hub of the other section, the former hub being threaded as shown, and the latter hub being provided with a gib-piece fitted to follow the channel between the threads of the former, and a set-screw connected with said gib-piece whereby the same may be confined in any position of adjustment.

58. The combination of a circular arc 175 fitted to slide in a seat projecting from the sleeve 174 and connected with the swinging arm 246, with the said sleeve and arm and means connected with each respectively for imparting to them their appropriate movements.

59. The rock-shaft 245 carrying the swinging arm 273 and the fixed arm 280, the swinging arm being adapted to impinge against the fixed arm when forced around by an arm on the pattern-shaft, in combination with the latter arm and shaft, as a means of rotating said rock-shaft at the proper time.

60. The hook 286, swing-catch 287 pivoted on a common axis, pin $p$ on hook 286 with which catch 287 engages in one direction, in combination with the arms 561 on the pattern-shaft, and arm 270 on the rock-shaft 245.

61. The combination with the arm 270, shaft 245 and the tripping-shaft 550 provided with an actuating-handle under manual control, of connection 555 and hook 286 connected substantially as shown, as a means for disengaging at will said hook from arm 270 of the rock-shaft 245.

62. The combination with the tripping-arm 550 provided with an actuating-handle under manual control, of arm 553, detent-lever 68, and pawl 66, as a means for releasing the pattern-shaft at will, as and for the purposes specified.

63. The combination with cam 459 of shaft 245, arm 273 and means associated therewith for swinging the same, bell-crank 324, rod 321, catch 305, latch 314, lever 315 and spring 457, for the purpose specified.

64. The combination of the needle-cylinder carrying the lug 489, shifter-rod 170, carrying impact-rolls 172, needle-cylinder shaft 54 carrying cam 174, slide 175 provided with the striking-lug 175$^w$ and means substantially as described, connected with said slide, for throwing it into operative position.

65. The combination of slide 175 and rock-shaft 245 actuated by the springs 249 and connections between said slide and rock-shaft, as a provision for switching the machine from fashioning to plain work, whereby said slide is withdrawn from its operative position during the reciprocation of the cylinder during the fashioning process.

66. The combination of the shifting-rod 170, carrying knuckle 185, with shifting-lever carrying knuckle 186, said rod and lever being connected with each other by the retractile spring 188, said spring being attached and arranged to operate substantially in the manner described and for the purposes specified.

67. The belt 29 in combination with the pulley on the pattern-shaft and a driving-pulley geared to run in a direction opposite to the normal working direction of the pattern-shaft, as a means of running down the pattern-shaft by positive motion, after the machine proper is stopped.

68. The combination of the rock-shaft 462, carrying rollers 465 and 467 connected with and adapted to reciprocate with the needle-cylinder with cam 459 and lifting-plate 400 as a means for raising and lowering said plate and its equipments at each reciprocation of the needle-cylinder.

69. The combination of ratchet 30, driving-pawl 66, detent-pawl 68, spring 67 connecting said pawls, spring 69 attached to the detent-pawl adapted to impinge against and exert upon pawl 66 a stronger tendency toward breaking its working engagement with the ratchet than spring 67 exerts to maintain it, and means connected with the pattern-shaft for effecting disengagement of the detent-pawl from the ratchet.

70. The combination with the pin-slides 226 and 229 and cam 243 on the center shaft, of the oscillating lever 232, fork-slide 235 carrying the swing-bar 236 with roll 237 attached and fitted to swing away from said cam when rotating in one direction, substantially in the manner described and for the purpose set forth.

71. The contractile spring 242, connected at one end to the lower end of oscillating lever 232, and at the other to the tailpiece of swing-bar 236, in combination with said lever and slide 235, whereby its contraction mutually acts to return both lever and arm to their dormant positions.

72. The retractile spring 46 attached at one end to the detent 85 mounted on slide 80, and at the other end to the tailpiece of the swing-bar 48 mounted on lever 43, whereby said spring performs the triple duty of holding detent 85, of throwing swing-bar 48, back against stop 43$^b$, and of swing-lever 43 and all its appurtenances back to its idle position after cam 55 has acted on it to propel the ratchet 30, in combination with said detent, arm and lever, cam 55 and ratchet 30.

73. The combination with the needle-raising cam 584 having stud on which is pivoted roll 582, of the suspender-catch 588, swing-lever 589, arm 580, spring 591 connecting said arm with the suspender-catch, and cam 411 for engaging said lever and for elevating said roll.

74. The suspender-catch 588 terminating at its lower end in the bent form shown, combined with the sliding swing-lever 589 by means of the sliding connection as shown, cam 411 and lever 580 adapted in its falling movement to crowd said catch back to the extent of carrying the swing-lever out of the path of cam 411.

75. The fashioning-racks fitted to actuate the pick-up levers and means for moving them upon each other, the pick-up slides, levers for actuating the same, and means, substantially as shown, for retracting the slides.

76. The combination of the friction brake-pad 351, attached to the cylinder 331, with the cam-shifting ring 350.

77. The combination of the compound lever consisting of the arms 551 and 552, pivoted together and mounted substantially as shown, with rock-shaft 550 carrying arm 553 and a striking pin or lug 535, connected with the pattern-shaft.

78. The combination with the pattern-shaft carrying the actuating-arms $562^a$ and $562^b$, of the swinging arm 273 having facet $c$, lifting-elbow 324, the speed-shifting devices, and means substantially as shown, interposed between said elbow and the latter devices, for bringing them into action.

79. In a stocking-machine, the combination with the mechanism for fashioning the back and sole portions of the heel by narrowing and widening respectively, of mechanism for knitting in at intervals between the regular narrowed or widened courses of stitches of the fashioned parts of the heel, of supplemental courses of stitches which are each shorter than the next course on the size toward the apex of the heel.

In testimony whereof we have hereto subscribed our names, at the village of Bennington, in the State of Vermont, this 11th day of June, A. D. 1890.

FRANK LASHER.
CHAS. S. BEACH.

In presence of—
FRANKLIN SCOTT,
JOHN C. STEVENS.